United States Patent
Kim et al.

(10) Patent No.: US 9,204,423 B2
(45) Date of Patent: Dec. 1, 2015

(54) APPARATUS AND METHOD FOR DISPLAYING AN EVENT IN A WIRELESS TERMINAL

(71) Applicant: Samsung Electronics Co., Ltd., Gyeonggi-do (KR)

(72) Inventors: Jae-Ho Kim, Gyeonggi-do (KR); Sung-Pil Kim, Daegu (KR); Sang-Min Park, Gwangju-si (KR); Jeong-Wook Seo, Daegu (KR); Hyun-Ji Kim, Daegu (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 194 days.

(21) Appl. No.: 13/915,042

(22) Filed: Jun. 11, 2013

(65) Prior Publication Data

US 2013/0273977 A1  Oct. 17, 2013

Related U.S. Application Data

(63) Continuation of application No. 11/240,643, filed on Oct. 3, 2005, now Pat. No. 8,463,244.

(30) Foreign Application Priority Data

| Oct. 1, 2004 | (KR) | ...................... | 10-2004-0078470 |
| May 13, 2005 | (KR) | ...................... | 10-2005-0040169 |
| Sep. 29, 2005 | (KR) | ...................... | 10-2005-0091344 |

(51) Int. Cl.
*H04H 40/00* (2009.01)
*H04W 68/02* (2009.01)
*H04M 1/725* (2006.01)

(52) U.S. Cl.
CPC .......... *H04W 68/02* (2013.01); *H04M 1/72544* (2013.01); *H04M 1/72563* (2013.01)

(58) Field of Classification Search
CPC .......... G06F 17/3064; G06F 17/30749; G06F 17/30867; H04L 47/28; H04W 4/12; H04W 4/14; H04W 4/16; H04W 76/005; H04M 1/72552
USPC ...................... 455/3.06, 234.2, 566; 345/473
See application file for complete search history.

(56) References Cited

U.S. PATENT DOCUMENTS

| 5,884,029 | A | 3/1999 | Brush, II et al. |
| 6,499,021 | B1 | 12/2002 | Abu-Hakima |
| 7,069,003 | B2 | 6/2006 | Lehikoinen et al. |
| 7,159,008 | B1 | 1/2007 | Wies et al. |
| 2001/0046853 | A1 | 11/2001 | Aoyama et al. |
| 2003/0071847 | A1 | 4/2003 | Vacquie |
| 2004/0029696 | A1 | 2/2004 | Mackel et al. |
| 2004/0179039 | A1 | 9/2004 | Blattner et al. |
| 2005/0041580 | A1 | 2/2005 | Petrovykh |
| 2005/0108233 | A1 | 5/2005 | Metsatahti et al. |

FOREIGN PATENT DOCUMENTS

| DE | 10106072 A1 | 8/2002 |
| JP | 2002-222264 A | 8/2002 |
| JP | 2003-143257 A | 5/2003 |
| KR | 10-2003-0031685 A | 4/2003 |
| KR | 10-2004-0022391 A | 3/2004 |
| KR | 10-2004-0040601 A | 5/2004 |
| KR | 10-2005-0005648 A | 1/2005 |
| KR | 10-2005-0025288 A | 3/2005 |

*Primary Examiner* — Tu X Nguyen
(74) *Attorney, Agent, or Firm* — Cha & Reiter, LLC

(57) ABSTRACT

A display apparatus for use in a wireless terminal is provided. A memory stores user interface (UI) data for cases mapped to events occurring in the wireless terminal. A controller collects the events occurring in the wireless terminal. The controller selects at least one executable case for the collected events. The controller selects UI data including a character image for the at least one selected executable case from the memory and outputs the selected UI data. A display unit displays the UI data.

20 Claims, 42 Drawing Sheets

APPARATUS AND METHOD FOR DISPLAYING AN EVENT IN A WIRELESS TERMINAL

CROSS REFERENCE TO RELATED APPLICATIONS

The present application is a Continuation of U.S. patent application Ser. No. 11/240,643, filed on Oct. 3, 2005, which claims priority to an application entitled "Apparatus and Method for Displaying an Event in a Wireless Terminal" filed in the Korean Intellectual Property Office on Oct. 1, 2004 and assigned Serial No. 10-2004-0078470, and an application entitled "Apparatus and Method for Displaying an Event in a Wireless Terminal" filed in the Korean Intellectual Property Office on May 13, 2005 and assigned Serial No. 10-2005-0040169 and an application entitled "Apparatus and Method for Displaying an Event in a Wireless Terminal" filed in the Korean Intellectual Property Office on Sep. 29, 2005 and assigned Serial No. 10-2005-0091344, the contents of which are hereby incorporated by reference and priority thereto for common subject matter is hereby claimed.

BACKGROUND OF THE INVENTION

1. Field of the Invention

The present invention generally relates to an agent apparatus and method for use in a wireless terminal, and more particularly to an apparatus and method for implementing an agent function.

2. Description of the Related Art

Conventionally, a wireless terminal means a portable device carried by a user, and its representative device is a wireless phone. The wireless phone can serve various supplementary functions as well as a basic phone function. Wireless phones with the supplementary functions may be a camcorder phone with a camera, a television (TV) phone through which TV can be watched, a Moving Picture Experts Group (MPEG) layer 3 (MP3) through which an MP3 music file can be listened to, and so on. That is, it is a trend that products with supplementary functions capable of processing multimedia data are widely used as the current wireless phones.

The wireless terminals capable of processing the multimedia data conventionally include a liquid crystal display (LCD), and various display methods for displaying the multimedia data are being developed. The wireless terminals are being developed such that various types of user data can be displayed. Currently, user data displayed in the wireless terminals are generally configured by visual image data such as photo data, character images, animations, and so on. Avatar image data is included in the user data, and wireless terminals using the avatar image data are being developed.

SUMMARY OF THE INVENTION

It is, therefore, an object of the present invention to provide an apparatus and method that can express event occurrence using a character agent function in a wireless terminal.

It is another object of the present invention to provide an apparatus and method that can analyze events occurring in a wireless terminal and select and express an optimal user interface (UI) character for the events.

It is another object of the present invention to provide an apparatus and method that can analyze events occurring in a wireless terminal, select a plurality of user interfaces (UIs) associated with the occurred events, and express data associated with the selected UIs.

It is another object of the present invention to provide an apparatus and method that can analyze events occurring in a wireless terminal, select a plurality of user interfaces (UIs) associated with the occurred events, set and arrange expression priorities, and express character information of the UIs according to the arranged priorities.

It is another object of the present invention to provide an apparatus and method that can select a plurality of user interfaces (UIs) registered for the occurred events after analyzing events associated with the wireless terminal and timer events, set and arrange expression priorities of the selected UIs, and express character information of the UIs according to the arranged priorities.

It is another object of the present invention to provide an apparatus and method that can express an event in a character agent at the time of event occurrence in a wireless terminal, and can bring up a character by changing a character quotient according to an occurred event and a result of processing.

It is another object of the present invention to provide an apparatus and method that can display an event occurring in a wireless terminal using an artificial intelligence (AI) agent system.

It is another object of the present invention to provide an apparatus and method that can set at least one user interface (UI) after analyzing an event occurring in a wireless terminal and can display data of the set UI in the form of a character image and text.

It is another object of the present invention to provide an apparatus and method that can set at least one user interface (UI) after analyzing an event occurring in a wireless terminal and can display data of the set UI using a character image, text, an icon for displaying a type of the event, and so on.

It is another object of the present invention to provide an apparatus and method that can set at least one user interface (UI) after analyzing an event occurring in a wireless terminal and can display data of the set UI using a character image, text, an icon for displaying a type of the event, a background image for displaying a time of day, and so on.

It is another object of the present invention to provide an apparatus and method that can set at least one user interface (UI) after analyzing an event occurring in a wireless terminal and can display data of the set UI using an avatar image for expressing an emotion state according to associated event processing, text, an icon for displaying a type of the event, a background image for displaying a time of day, and so on.

It is another object of the present invention to provide an apparatus and method that can set at least one user interface (UI) after analyzing an event occurring in a wireless terminal, display a character image, text and a menu requiring the user's feedback when the set UI requires a user's feedback, display and store a result according to the user's feedback, and apply the feedback result to the next event.

It is yet another object of the present invention to provide an apparatus and method that can set at least one user interface (UI) according to an event occurring in a wireless terminal, display data of the set UI using an avatar image for expressing an emotion state and text for recommending a setup operation according to an event, express and store a result according to a user's feedback using an avatar image and text, and apply the feedback result to the next event.

In accordance with an embodiment of the present invention, the above and other objects of the present invention can be achieved by a display apparatus for use in a wireless terminal, comprising: a memory for storing user interface (UI) data for cases mapped to events occurring in the wireless terminal; a controller for collecting the events occurring in the wireless terminal, selecting at least one executable case for the collected events, selecting UI data for the at least one selected executable case from the memory, and outputting the selected UI data, the UI data comprising a character image; and a display unit for displaying the UI data.

The controller comprises: an event collector for collecting an event occurring in the wireless terminal and generating an event message; an agent controller for selecting at least one case mapped to the event message, setting a highest priority case for the occurred event among the at least one selected case, and selecting a UI mapped to the set case; and an agent UI expression part for performing a control operation such that data mapped to the set UI is displayed on the display unit.

The agent UI expression part generates feedback information selected by a user according to the displayed UI data and displays UI data based on the feedback information, and the agent UI expression part stores the user feedback information and uses the stored information in a next event.

The agent controller comprises: a blackboard for storing the collected event and a fed-back event message; a plurality of specialists for storing UI identifiers (IDs) mapped to the cases for the events; a supervisor for accessing data of specialists registered in a list for the events in the blackboard and selecting a specialist of a highest priority; and a specialist manager, provided with a specialist list based on each event of the wireless terminal, for storing a received event message in the blackboard when the event is received, selecting specialists mapped to the event from the specialist list to notify the supervisor of the selected specialists, sending a UI ID of the specialist selected by the supervisor to the agent UI expression part, and storing a user feedback event message in the blackboard when the message is received.

The event collector comprises: detectors for detecting call, message, schedule, and system events of the wireless terminal; and an event collection manager for analyzing an event detected by the detectors, generating an event message comprising a type of the occurred event, an occurrence time, and an event ID, and sending the generated event message to the agent controller.

The agent UI expression part comprises: UIs, corresponding to the number of UI IDs, for detecting the user's feedback; and an avatar UI manager for accessing UI data mapped to a UI ID in the memory to display the UI data on the display unit and generating a user feedback message to deliver the generated message to the agent controller when the user inputs feedback information.

The agent controller comprises: a blackboard for storing the collected event and a fed-back event message; a plurality of specialists for storing UI identifiers (IDs) mapped to the cases for the events; a supervisor for setting and arranging expression priorities of at least two specialists when notification of the at least two specialists registered for the occurred event is given; and a specialist manager, provided with a specialist list based on each event of the wireless terminal, for storing a received event message in the blackboard when the event is received, selecting specialists mapped to the event from the specialist list to notify the supervisor of the selected specialists, sending a UI ID of the specialist selected by the supervisor to the agent UI expression part according to the arranged priorities, and storing a user feedback event message in the blackboard when the message is received.

The agent controller further comprises at least one timer processor, the timer processor allowing a specialist to set a timer and notifying the specialist manager that the timer has been set at a set time, and the specialist manager operates the specialist setting the timer at a time of timer notification and sends a UI ID of an associated specialist to the agent UI expression part.

The supervisor computes designated priorities and user preferences for specialists, sets and arranges expression priorities of specialists associated with an event, and notifies the specialist manager of the arranged priorities.

The UI data requiring the feedback comprises first UI data to be displayed at a time of event occurrence and second UI data for displaying a result of the user's feedback. The first UI data comprises: a character image for displaying an emotion state based on the occurred event; text data based on the event; and button list data for inputting the user feedback information according to the text data. The second UI data comprises: a character image for displaying an emotion state based on the result of the user's feedback; and text data based on the result of the user's feedback.

In accordance with another embodiment of the present invention, the above and other objects of the present invention can also be achieved by a method for displaying an event occurring in a wireless terminal, comprising the steps of: collecting events occurring in the wireless terminal; selecting at least one executable case for the collected events, and selecting user interface (UI) data for the at least one selected executable case, the UI data comprising a character image; and displaying the UI data.

DETAILED DESCRIPTION OF THE PREFERRED EMBODIMENTS

Figure 1:
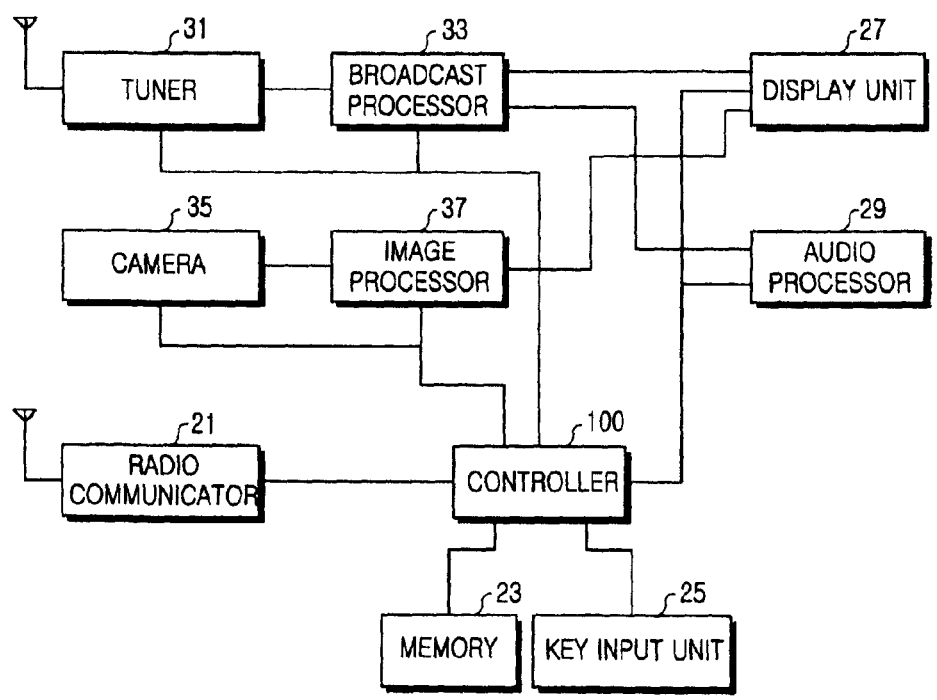
FIG. 1 illustrates a structure of a wireless terminal in accordance with an embodiment of the present invention.

Preferred embodiments of the present invention will be described in detail herein below with reference to the accompanying drawings. In the drawings, the same or similar elements are denoted by the same reference numerals even though they are depicted in different drawings.

In the following description, specific details such as types of events, information necessary for expressing an agent, and so on are provided for a better understanding of the present invention. Those skilled in the art will appreciate that the present invention can be easily implemented through various modifications without the specific details.

FIG. 1 illustrates a structure of a wireless terminal in accordance with an embodiment of the present invention.

Referring to FIG. 1, a radio communicator 21 performs a wireless communication function of the wireless terminal. The radio communicator 21 includes an RF transmitter for up converting and amplifying a frequency of a signal to be transmitted, an RF receiver for low noise amplifying a received signal and down converting a frequency of the received signal, and so on.

A key input unit 25 is provided with keys for inputting number and letter information and function keys for setting various functions. Moreover, the key input unit 25 is provided with keys for controlling a character agent on an event-by-event basis in accordance with an embodiment of the present invention.

A memory 23 can be configured by program and data memories. The program memory stores programs for processing a call of the wireless terminal and programs for controlling agent expression for events occurring in accordance with an embodiment of the present invention. The data memory performs a function for temporarily storing data generated while the programs are executed. Moreover, the data memory is provided with a character memory for storing character images for agent expression in accordance with an embodiment of the present invention. The character memory can operate with a file system, and can have an index of a character-by-character memory (or file system). The character memory can be configured in various forms for enabling operations, facial expressions, and object representations of character components. Character information can be stored in the character memory according to forms capable of performing agent expression.

The controller 100 performs a function for controlling the overall operation of the wireless terminal. Moreover, the controller 100 is provided with a modulator-demodulator (MODEM) for modulating/demodulating a signal and a coder-decoder (CODEC) for coding/decoding a signal, thereby performing a function for coding and modulating a signal to be transmitted and a function for demodulating and decoding a received signal. Here, the controller 100 may be a mobile station modem (MSM) chip. A data processor is independently configured to separate the MODEM and the CODEC from the controller 100. The data processor can be placed between the radio communicator 21 and the controller 100. Moreover, the controller 100 controls an operation of communication mode, camera mode, and broadcasting reception mode in response to the user's mode selection.

In accordance with an embodiment of the present invention, the controller 100 collects an event according to the operation of the wireless terminal, controls an agent according to the collected event, and expresses a result of processing and a state of the event using an agent. Here, the agent expression can be displayed after an associated character is selected from the memory 23.

At the time of the user's camera mode selection, a camera 35 is started by the controller 100 and generates an image capture signal in the camera mode. An image processor 37 scales the image capture signal from the camera 35 according to a size of a display unit 27 in the camera mode, and encodes and stores the image capture signal in storage mode according to a set scheme. In mode for reproducing received or stored image data, the image processor 37 performs a function for decoding encoded image data. In the camera mode, the image processor 37 controls the display unit 27 to display an image signal.

In the broadcasting reception mode, a tuner 31 selects and receives a broadcast signal of a channel set in the controller 100. A broadcast processor 33 demodulates and decodes the broadcast signal of the selected channel, and outputs the demodulated and decoded image signal to the display unit 27. An audio signal is output from an audio processor 29. Here, the broadcast signal is a digital broadcast signal, and may be a satellite broadcast signal or a terrestrial broadcast signal.

Under control of the controller 100, the display unit 27 can display menus according to the operation of the wireless terminal. When an event occurs, the display unit 27 displays an associated event state using a character under control of a selected agent mapped to the event. Moreover, the display unit 27 displays an image signal output from the image processor 37 or the broadcast processor 33 in the camera mode or the broadcasting reception mode.

Under the control of the controller 100, the audio processor 29 processes an audio signal generated in the communication mode. Under the control of the image processor 37, the audio processor 29 processes an audio signal generated during an image capture operation in the camera mode. The audio processor 29 processes a broadcast audio signal received under the control of the broadcast processor 33 in the broadcasting reception mode.

A structure for processing the camera signal and/or broadcast signal can be omitted from the wireless terminal with the above-described structure. In this case, a character agent function for an event can be performed in accordance with an embodiment of the present invention. In the following description, it is assumed that the character is an avatar. Accordingly, character agent control for an event of the wireless terminal will be described as avatar agent control, but can be equally applied for all images as well as the avatar.

Figure 2:
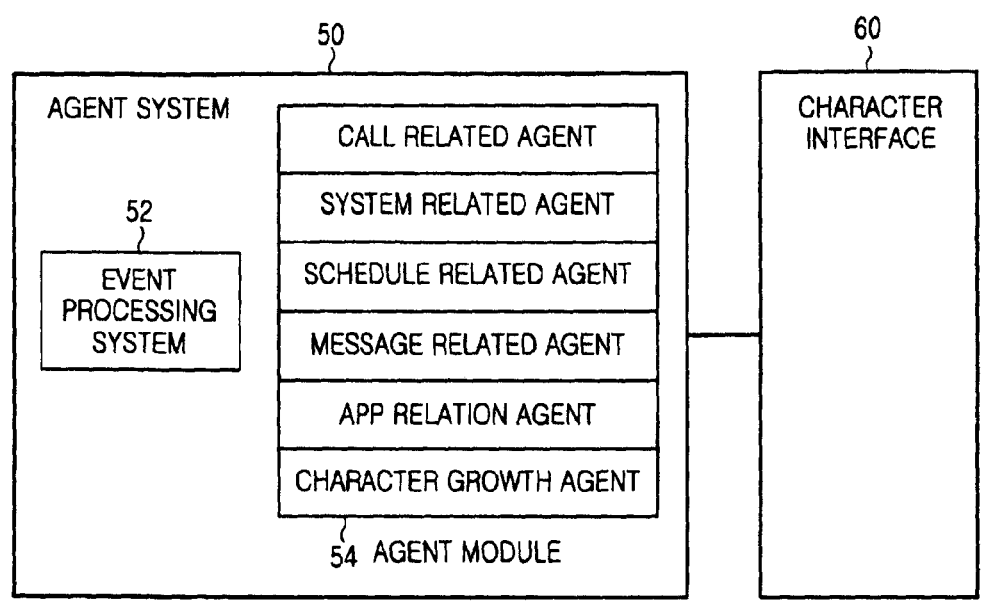
FIG. 2 illustrates a structure of an agent system with a character agent function in accordance with an embodiment of the present invention.

The present invention provides a user of the wireless terminal with a useful function through a character interface on the basis of an artificial agent system, and can bring up a character using the wireless terminal. FIG. 2 illustrates a structure of an agent system with a character agent function in accordance with an embodiment of the present invention.

Referring to FIG. 2, the wireless terminal is provided with a character agent system 50 and a character interface 60 in accordance with an embodiment of the present invention. The character agent system 50 is configured by an event processing system 52 and an agent module 54. Here, the agent module 54 serves as a module for providing various useful functions, and has a structure in which a function is easily added and deleted because the functions are independent. That is, the agent module is obtained by grouping a call related agent, system related agent, schedule related agent, message related agent, application related agent, character growth related agent, and so on as illustrated in FIG. 2. The agent module may include a camera related agent, digital broadcast related agent, global positioning system (GPS) related agent, and so on in addition to the above-described agents. As described above, the grouped agents are separated and modularized according to a detailed function. When the agent system 50 detects various events occurring in the wireless terminal and transfers the occurred events to necessary functions, many situations are synthesized in an associated function and the system is notified of the presence of an associated function operation. The agent system 50 operates functions suitable for the current situation according to the priority. In this case, the agent system 50 receives feedback information through the character interface 60 such that an associated function can be operated in various schemes according to the user's preference.

The character quotient is updated according to various events occurring in the wireless terminal, an agent function, and the user's feedback. Also, many applications capable of using the character quotient affect the character quotient. As the character quotient is varied, a character is varied. As the time is elapsed, the appearance in which the character is brought up can be viewed. Here, the character growth and variation correspond to character growth. In accordance with an embodiment of the present invention, a function for bringing up a character on the basis of an artificial intelligence (AI) agent is introduced into the wireless terminal, such that it can provide a character agent system which is different from a terminal for expressing the conventional character growth (e.g., Tamagotchi) and character function In accordance with the embodiment of the present invention, the above-described character agent system provides use convenience and pleasure to wireless terminal users. A function for providing the use convenience and pleasure in the wireless terminal is referred to as a use case or case. This will be described in more detail.

Figure 3:
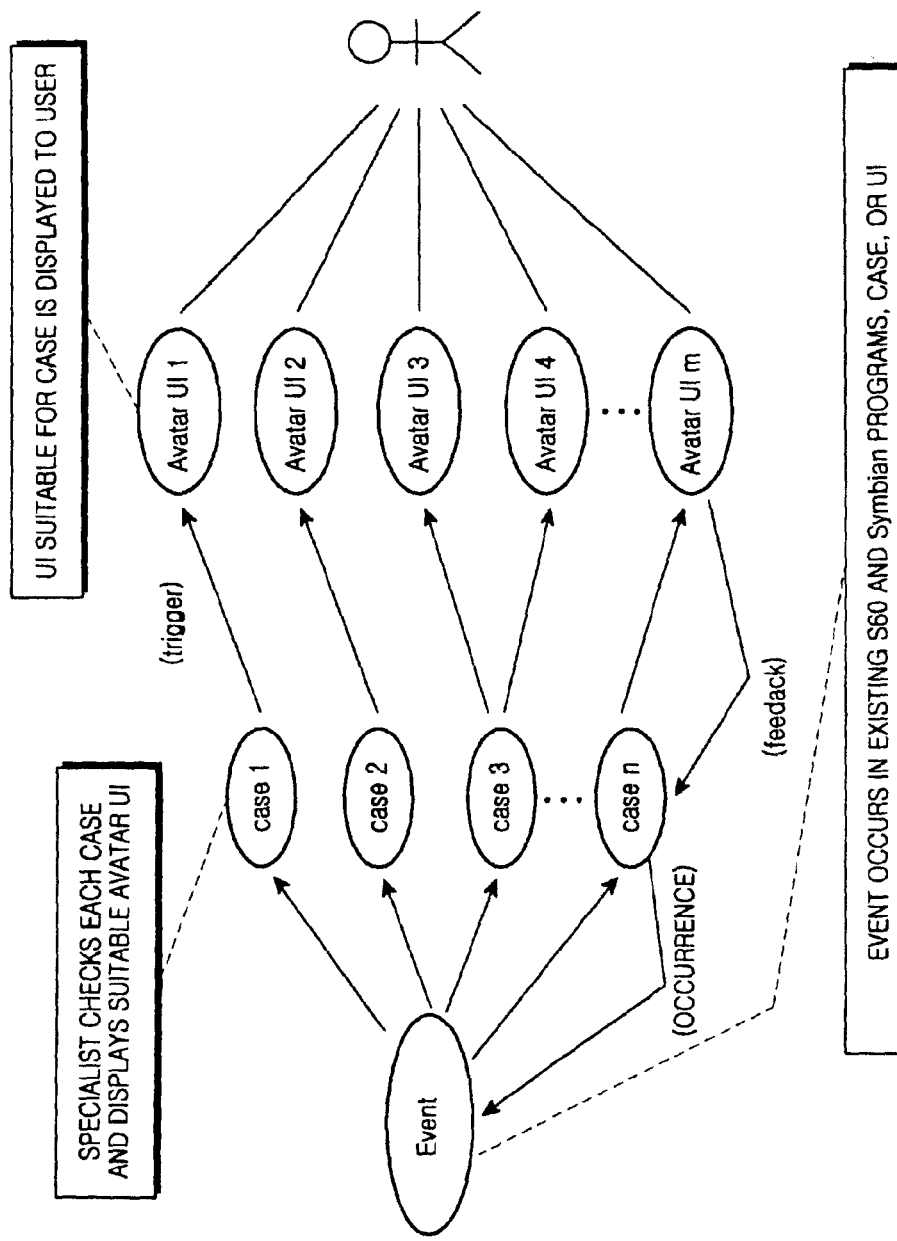
FIG. 3 illustrates a case diagram of the agent system with the character agent function in accordance with an embodiment of the present invention.

In accordance with the embodiment of the present invention, the character agent system includes a use case diagram and a package diagram. According to the use case diagram, an event occurring in the character agent system is transferred to cases. The most suitable case is only displayed through a UI. Then, the wireless terminal user generates feedback information for the system through selection for recommendations shown through a character. FIG. 3 illustrates a case diagram of the agent system with the character agent function in accordance with an embodiment of the present invention.

Figure 4:
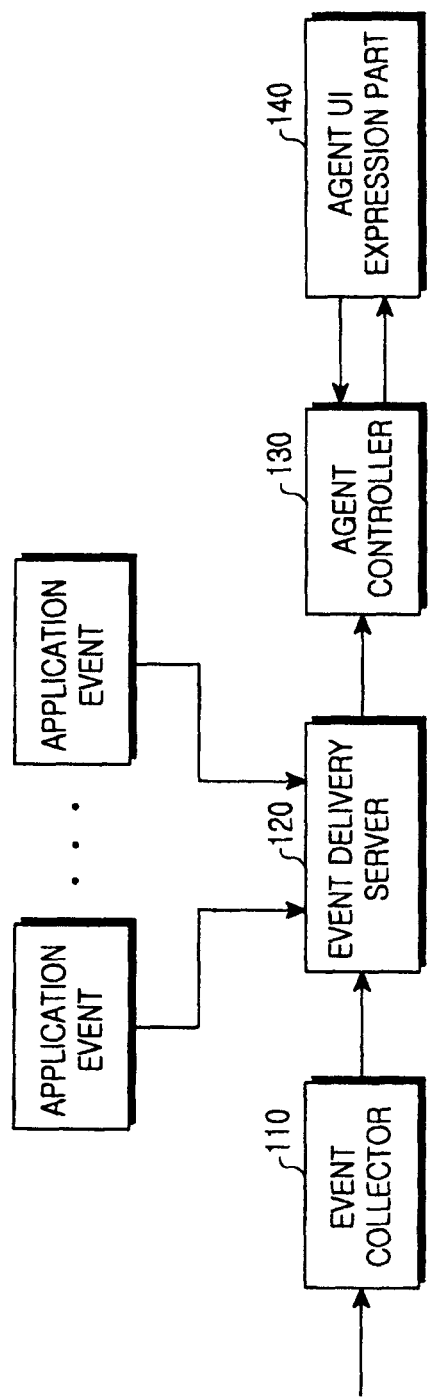
FIG. 4 illustrates a controller of the wireless terminal in accordance with an embodiment of the present invention.

Moreover, the package diagram is a diagram in which the character agent system is divided into three parts of an event collector, an agent controller, and an agent UI expression part or four parts of an event collector, an event delivery server, an agent controller, and an agent UI expression part. Here, the event collector collects events of the wireless terminal for operating a character agent. The event delivery server delivers the collected events to the agent controller. The agent controller analyzes the delivered events, refers to its data, and controls the agent UI expression part to express a character. At this time, the event delivery server performs a function for delivering the events collected by the event collector to the agent controller, and performs a function for receiving, from the character agent system, an event incapable of being received through the event collector and delivering the received event to the agent controller. Accordingly, the event delivery server can be omitted in case of the character agent system for collecting all events through the event collector. The package diagram of the character agent system is illustrated in FIG. 4.

Here, the character may be a human, animal, or plant character. In the following description of the present invention, it is assumed that the character is an avatar.

FIG. 3 illustrates an example in which the agent system of the wireless terminal analyzes occurred events and controls and displays associated avatar UIs in accordance with an embodiment of the present invention.

Referring to FIG. 3, the event can arbitrarily occur in a program of the wireless terminal and can occur in a case and avatar UI. When the event occurs, specialists check a case for the occurred event and express the occurred event using a suitable avatar UI when the event is suitable for an associated case as a result of the checking. That is, when the event occurs, specialists mapped to an identifier (ID) of the occurred event analyze a case for the occurred event. A specialist with the closest relation to the event is selected, and an avatar UI of the selected specialist is expressed.

FIG. 4 illustrates a structure for expressing events occurring in the wireless terminal with a character agent system using an agent function in accordance with an embodiment of the present invention. The structure may be an internal structure of the controller 100.

Referring to FIG. 4, an event collector 110 performs a function for collecting events occurring in the wireless terminal. Here, the events include all events of the wireless terminal such as a communication event of the wireless terminal, an event independently occurring in the wireless terminal, an event occurring according to the user's request, and an event occurring when a multimedia function of the wireless terminal is performed. That is, the events collected by the event collector 110 are events defined in the wireless terminal. The event collector 110 extracts information necessary for an occurred event when the event occurs, generates an event message, and outputs the event message to the event delivery server 120.

The event delivery server 120 performs a function for delivering the event message received from the event collector 110 to an associated client. In accordance with an embodiment of the present invention, it is assumed that the event message is delivered only to the agent controller 130. When a different component makes an event message delivery request, the event message can be delivered to the different component. Moreover, the event delivery server 120 receives user-defined events undefined in the wireless terminal as well as the events received from the event collector 100 and delivers the received events to the agent controller 130. Here, the above-described events are referred to as the application events. The application events may occur in games, other application programs, and web service programs.

When receiving an event message from the event delivery server 120, the agent controller 130 stores the received event message in an internal buffer, and analyzes the event message to set a UI such that an associated character agent can be expressed. Here, the event delivered from the event delivery server 120 may be events of the wireless terminal (e.g., events received from the event collector 100) and application events. In the following, a description is focused on the agent expression for an event received from the event collector 110. The agent controller 130 is provided with a plurality of specialists. The agent controller 130 controls these specialists, selects a specialist mapped to an occurred event, and performs an agent control function. When an event is received, the agent controller 130 notifies suitable specialists of event occurrence according to the received event, and sends a UI request to the agent UI expression part 140 such that agent expression of the finally selected specialist can be displayed. In response to feedback information of the user received from the agent UI expression part 140, the user feedback information for an associated event is processed.

The agent UI expression part 140 displays the character expression for an associated event according to agent UI information output from the agent controller 130. At this time, the agent UI expression part 140 manages a plurality of avatars to be displayed on the display unit 27. The agent controller 130 performs a control operation such that an avatar mapped to requested UI information can be displayed. When the user generates the feedback information in a state in which the avatar has been displayed according to the occurred event, the agent UI expression part 140 sends the received feedback information to the agent controller 130.

When only the events of the wireless terminal received from the event collector 110 are processed in the structure of FIG. 4, the event delivery server 120 can be omitted as described above.

When the event occurs, the event collector 110 extracts information necessary for an event as shown in Table 1 and generates an event message with suitable parameters. Then, the agent controller 130 suitably changes the received event message, stores the changed event message in the internal buffer, and controls an agent according to the event message and parameters.

TABLE 1

| Event Type | Occurrence Time | Parameter 1 | - - - | Parameter n |
|---|---|---|---|---|

For example, when an event of "AP_CONTAC_ADD" occurs in a procedure for processing the event message, the event collector 110 generates an event message of (AP_SMS_SEND, 2004-09-06 14:00, 65) as shown in Table 2. In the event message, "65" means that an ID of No. 65 has been generated in a message database. When the agent controller 130 receives the event message as shown in Table 2, the event is "AP_SMD_SEND". Accordingly, an ID is retrieved from the message database. When the ID of No. 65 is mapped to a name of "James bond" and a phone number of "016-432-3792", the agent controller 130 stores the event message in the internal buffer as shown in Table 3.

TABLE 2

| Event Type | Occurrence Time | Parameter 1 (ID) |
|---|---|---|
| AP_SMS_SEND | 2004-09-06 14:00 | 65 |

TABLE 3

| Event Type | Occurrence Time | Parameter 1 | Parameter 1 (ID) |
|---|---|---|---|
| AP_SMS_SEND | 2004-09-06 14:00 | James bond | 016-432-3792 |

Here, the internal buffer of the agent controller 130 is referred to as the blackboard.

Now, the operation of the event collector 110, the event delivery server 120, the agent controller 130, and the agent UI expression part 14 will be described in more detail.

Figure 5:
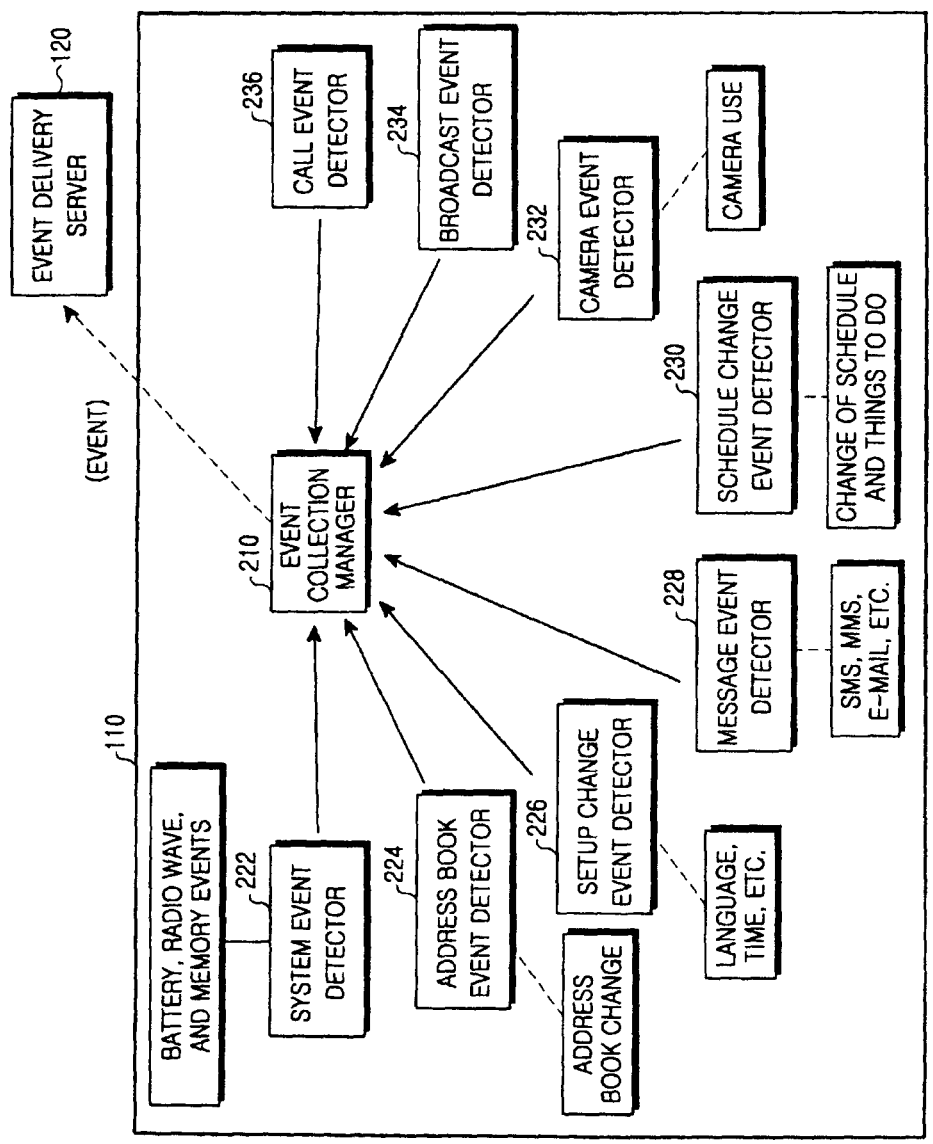
FIG. 5 illustrates a structure of an event collector of FIG. 4.

FIG. 5 illustrates a structure of the event collector 110 of FIG. 4. The event collector 110 performs a function for collecting all events occurring in the wireless terminal. The collected events are processed in the agent controller 130 to be described below, such that an avatar UI can be displayed.

Referring to FIG. 5, the event collector 110 is configured by a plurality of event detectors 222 to 236 and an event collection manager 21 for collecting events detected from the event detectors 222 to 236, generating an event message, and delivering the generate event message to the event delivery server 120.

The system event detector 222 detects the occurrence of a system event according to a state of a battery, and a state of the wireless terminal associated with a communication environment (or radio wave problem), a memory, etc. The address book event detector 224 detects a change of an address book according to the user's manipulation. The setup event detector 226 detects an event for changing setup information of the wireless terminal such as a language and time. The message event detector 228 detects the occurrence of a message event such as a short message service (SMS), a multimedia messaging service (MMS), an e-mail, and so on. The schedule change event detector 230 detects schedule and alarm events such as schedule, reservation, alarm, and so on. The camera event detector 232 detects an event associated with the operation of the camera when the camera is mounted to the wireless terminal. The broadcast event detector 234 detects an event associated with broadcasting reception in case of the wireless terminal provided with a broadcast receiver (e.g., a digital broadcast receiver (for digital multimedia broadcasting (DMB), digital video broadcasting (DVB), or etc.), a general broadcast receiver, or etc.). Here, the broadcasting can include digital broadcasting such as digital terrestrial and satellite broadcasting and the conventional analog broadcasting. The call event detector 236 detects an event associated with a call of the wireless terminal (e.g., an incoming call, outgoing call, missed call, or rejection).

The events detected in the event detectors 222 to 236 are applied to an event collection manager 210. The event collection manager 210 identifies the received events, and generates an event message configured by an event type, occurrence time, and ID. In this case, the event message may be one of messages with the format as shown in Table 1. The message is applied to the event delivery server 120.

As described above, the event collector 110 is configured by the plurality of event detectors 222 to 236, and the event collection manger 210 for collecting events detected by the detectors 222 to 236 and generating an event message such that the agent controller 130 can perform a control operation. An example in which the eight event detectors have been configured has been illustrated in accordance with an embodiment of the present invention, but an increased number of event detectors can be provided. The camera event detector 232 and/or the broadcast event detector 234 can be provided or omitted according to a mounted device.

Figure 6:
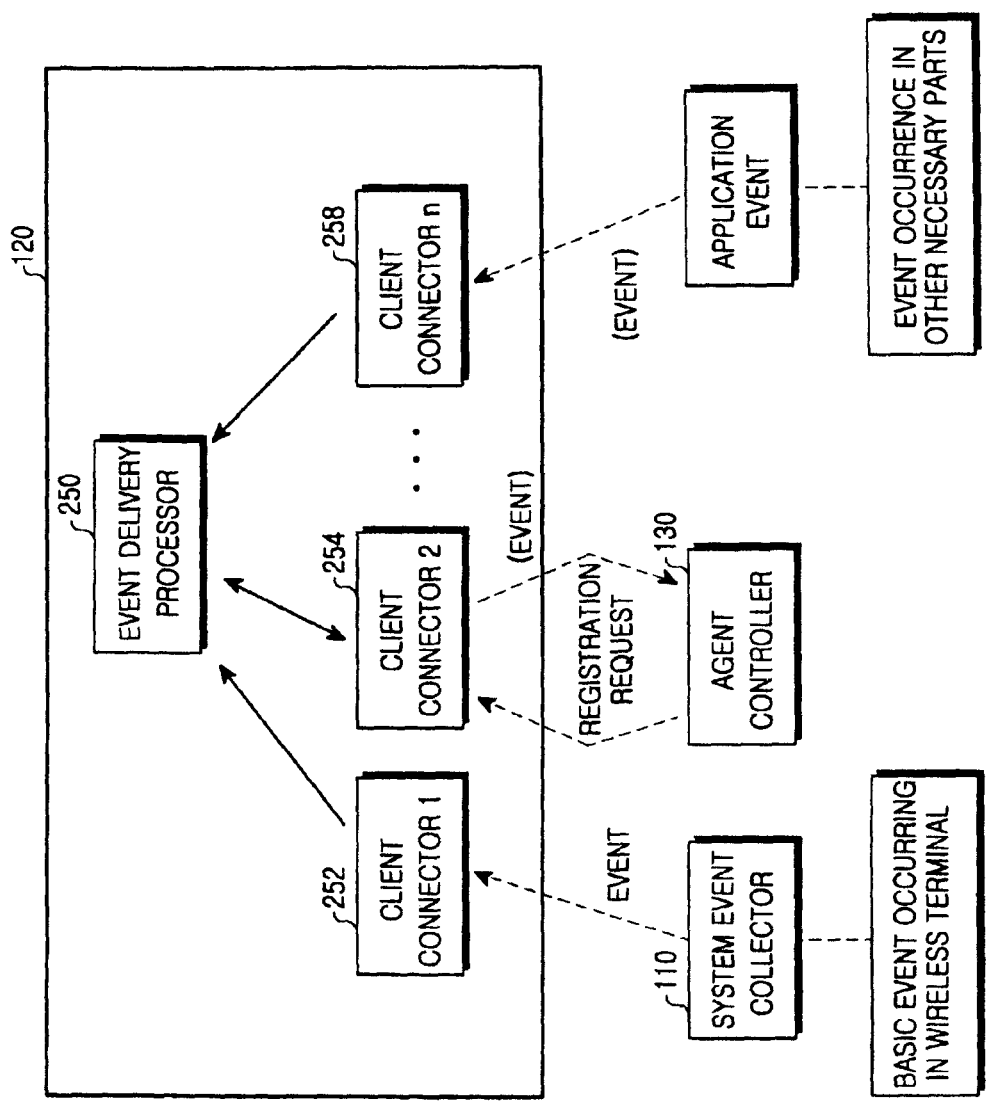
FIG. 6 illustrates a structure of an event delivery server of FIG. 4.

FIG. 6 illustrates a structure of the event delivery server 120 of FIG. 4. The event delivery server 120 delivers a received event to a desired client.

Referring to FIG. 6, the event delivery server 120 is configured by a plurality of client connectors 252 to 258 and an event delivery processor 250, connected to the client connectors 252 to 258, for receiving and delivering an event message. A device desiring to receive the event message (e.g., the agent controller 130 as illustrated in FIG. 6) must send an event message delivery request to the event delivery server 120. In an embodiment of the present invention, it is assumed that the agent controller 130 makes an event message delivery request as illustrated in FIG. 6.

In FIG. 6, the event collector 110 is connected to the first client connector 252. The client connector 252 performs a function for delivering the event message collected by the event collector 110 to the event delivery processor 250. In this case, an event message generated from the event collector 110 is information about an event occurring in the wireless terminal as described above.

The agent controller 130 is connected to the second client connector 254. In this case, the agent controller 130 sends an event message delivery request to the event delivery server 120 to receive an event message generated from the event collector 110. The second client connector 254 sends the event message delivery request to the event delivery processor 250. The event delivery processor 250 registers the event message delivery request and then prepares to send the received event message to the agent controller 130. In this case, when the first client connector 252 or the n-th client connector 259 receives the event message, the event delivery processor 250 delivers the received event message to the second client connector 254 and the second client connector 254 sends the received event message to the agent controller 130. That is, the event delivery server 120 performs a function for delivering the received event message to the agent controller 130 making the event message delivery request.

The n-th client connector 258 may be a plurality of connectors. The n-th client connector 258 performs a function for receiving application events except the events generated from the event collector 110. In this case, the events capable of being received by the n-th client connector 258 serve as events undefined in the wireless terminal as described above, and may be events generated by games, other application programs, and web service programs.

As described above, the event delivery server 120 performs a function for receiving all events occurring in the wireless terminal and delivering the received events to the agent controller 130 making an event delivery request. In an embodiment of the present invention, it is assumed that only the agent controller 130 makes an event delivery request. However, when a different agent controller is further provided and an event delivery request is made, the agent delivery server 120 can analyze a received message and distribute or deliver the received event message to an associated agent controller.

Figure 7:
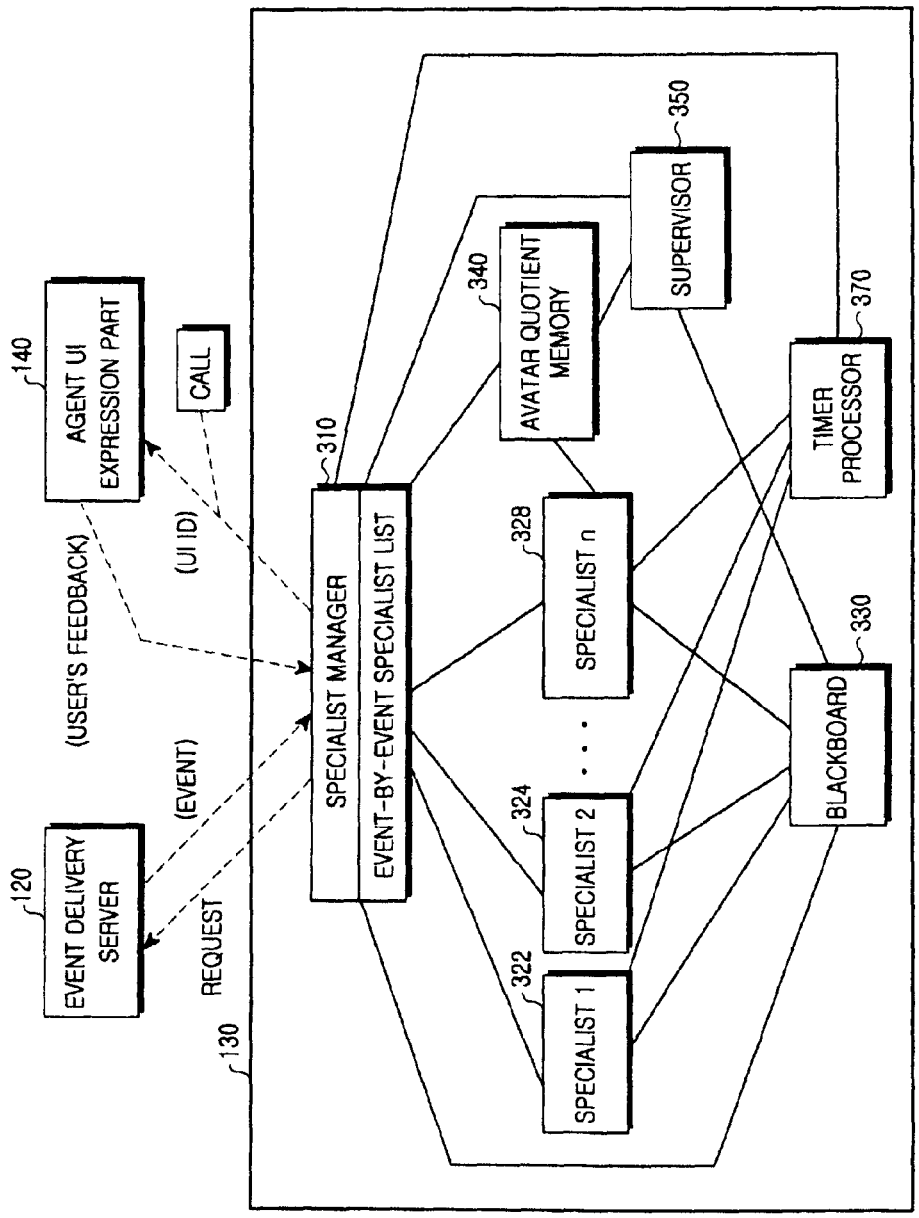
FIG. 7 illustrates a structure of an agent controller of FIG. 4.

FIG. 7 illustrates a structure of the agent controller 130 of FIG. 4. The agent controller 130 manages specialists, sets a UI ID for the finally selected specialist, and provides an indication of the set UI ID to the agent UI expression part 140. The agent controller 130 operates according to the user's feedback information based on a displayed avatar UI.

Referring to FIG. 7, the agent controller 130 stores an event message delivered from the event delivery server 120 in an internal buffer (or blackboard) 330, sets a UI ID from a specialist mapped to the event, and outputs the set UI ID to the agent UI expression part 140. When the user generates feedback information according to an avatar agent function displayed by the agent UI expression part 140, the agent UI expression part 140 receives the feedback information and performs an agent control operation according to the user feedback information. To perform the above-described function, the agent controller 130 is provided with a plurality of specialists 322 to 328 with agent UI IDs, the blackboard 330 for storing information of event messages, a supervisor 350 for selecting at least one specialist when an occurred event is associated with a plurality of specialists, an avatar quotient memory 340 for managing an avatar quotient according to the occurred event, a timer processor 370 for enabling the specialists 322 to 328 to perform a specific action at a specific time, a specialist manager 310 for selecting associated specialists from a list of event-by-event specialists at the time of event occurrence and controlling an agent according to an event, and so on.

After a description of the components of the agent controller 130, the operation of the agent controller 130 will be described. The agent controller 130 is provided with an agent engine serving as a core part for operating a character agent system. Here, the agent engine is a blackboard 330, a timer processor 370, and a supervisor 350, and includes codes for organically connecting the blackboard 330, the timer processor 370, and the supervisor 350 to the specialists 322 to 328.

First, the specialists 322 to 328 are specialists for addressing problems and have specialty for defined parts. Each of the specialists 322 to 328 refers to the blackboard 330 to find out a solution and makes efforts such that it can be finally selected.

The specialists 322 to 328 are substantial task processors operated by the agent engine. One specialist processes one case or use case. Accordingly, when 50 cases are processed, 50 specialists are required. Because an additional specialist exists to maintain the system, the number of specialists needs to be more than the number of cases to be processed. Each of the specialists 322 to 328 is provided with an algorithm suitable for a task to be processed. Codes must be implemented with a predetermined standard such that they are called and processed by the agent engine. In an embodiment of the present invention, it is assumed that a specialist interface uses an MSspecialist interface as shown in Table 4. The specialists 322 to 328 access the blackboard 330 and read or write information. The specialists 322 to 328 can set a desired operation time using the timer processor and can change the set time.

TABLE 4

<>
Mspecialist

ConstructL (CBlackboard*. MEventSender*)
+ReleaseL ( )
+GetInfo ( ): TInfo
+DetermineActivated (TAPEvent): TAnswer
+DetermineActivated (aAlarmId: TUint32. aData: const TDesC16&): TAnswer TABLE 4-continued <>
Mspecialist +Activated (aFeedback: TUserFeedback. AData: const TUint8*)
+GetUIInfo (TUIId&. TIndex&. TTokens&)
+HandleTimeChangedL (aError: TInt)

Table 4 shows a specialist interface, and defines a function to be implemented by the specialists 322 to 328. When an event occurs, an operation form of an associated specialist is determined through DetermineActivated ( ) of Table 4. When an operation time is reached, GetUIInfo ( ) is called by the engine. After information necessary for UI expression is provided, action according to the user's selection is performed in ActvateL ( ).

In an embodiment of the present invention, the specialists 322 to 328 must be provided which are more than or equal to the number of cases or use cases. Table 5 shows an example of cases in accordance with an embodiment of the present invention.

TABLE 5

| ID_OLD | ID | Use Case | Class | Action according to user's selection | Necessary info | Example of UI text |
|---|---|---|---|---|---|---|
| 29 | APP00 | Recommend the execution of program when a pattern for running an app is detected at a specific time. | APP | {SYS00} | AP_APP_START | Would you like to run [Program] same as usual? |
| 30 | APP01 | Recommend morning call setup before the user goes to sleep. | APP | [Yes] Morning call setup [No] No | APP_MORNINGCALL_ADD | It's time to set up a morning call. Would you like to set up it now? |
| 38 | APP02 | Recommend the execution of the next predicted program after an application program is stopped. | APP | {SYS00} | AP_APP_START AP_APP_EXIT | Usually you continue with [Program], would you like to use it today, also? |
| 41 | APP03 | Recommend use of a Help menu when an app is used for the first time. | APP | [Yes] Help of associated APP [No] No | AP_APP_START | [Program] is used for the first time. Would you like to see a Help menu? |
| 44 | APP04 | Recommend use of an app not recently used. | APP | {SYS00} | AP_APP_START | You have seldom used [Program] recently. Would you like to use it? |
| 45 | APP05 | Recommend use of an app not totally used. | APP | {SYS00} | AP_APP_START | You have almost not used [Program]. Would you like to use it? |
| 36 | AVA00 | A suitable comment is expressed according to a change of a status quotient of an avatar. | AVATAR | — | AP_AVATAR_STATUS_CHANGED | Expression differs according to status. |
| 48 | AVA01 | Ask a user about satisfaction for an avatar, change an emotion quotient, and affect the number of times of occurrence of an agent. | AVATAR | [Very satisfied] [Satisfied] [Normal] [Dissatisfied] | — | Are you satisfied with [Avatar]? |
| 51 | AVA02 | Control avatar growth mode and show a result of the control. | AVATAR | — | AP_AVATAR_STATUS_CHANGED | At last, [Avatar] grew up. |

TABLE 5-continued

| ID_OLD | ID | Use Case | Class | Action according to user's selection | Necessary info | Example of UI text |
|---|---|---|---|---|---|---|
| 18 | AVA03 | Synthesize an avatar quotient and many situations, display an avatar sometimes, and allow the avatar to make a bow to the user. | AVATAR | — | — | Beautiful day! |
| 24 | AVA04 | Show changed avatar quotients during four recent days every night. | AVATAR | — | — | [Avatar] grew this much. |
| 2 | CL00 | Recommend phone number registration in an address book when a phone number is not registered in a contact list after a phone call is made. | CALL | {Msg02} | AP_PHONE_SEND AP_PHONE_ANSWER | Would you like to add [Number] of a call you just received to the contact list? |
| 3 | CL01 | Recommend registration in an auto-reject list when a call is received from an undesired phone number. When the undesired phone number is registered in the auto-rejection list, its phone call is automatically rejected. | CALL | [Yes] Registration in the reject list [No] No/ [OK] No [Release] Deletion in the reject list | AP_PHONE_REJECT AP_PHONE_RING | You have received a call from [Name/Phone Number]. Would you like to ignore it as before? |
| 9 | CL02 | Make the praise when a call duration time is long. | CALL | [Yes] [Really?] [Cut it off] | AP_PHONE_SEND AP_PHONE_ANSWER | You made a long call with [Name]. I think you had many talks with [Name]? |
| 11 | CL03 | Recommend phone call transmission to a specific number when a pattern for sending the phone call is detected at a specific time. | CALL | [Yes] Calling [No] No | AP_PHONE_DIAL | Don't you have to call [Name] today? Would you like to make contact with [Name] now? |
| 13 | CL04 | Recommend phone call transmission when the number of incoming calls from a specific number is large but the number of outgoing calls to the specific number is small. | CALL | | AP_PHONE_ANSWER AP_PHONE_SEND | You have received many calls from [Name]. Would you like to make a phone call today? |
| 4 | CM00 | Recommend group designation when contact is often made with a person of a specific number. | CALL/MESSAGE | [Yes] Group setup [No] No | AP_PHONE_SEND AP_PHONE_ANSWER AP_SMS_SEND AP_SMS_READ AP_MMS_SEND AP_MMS_READ | You have often made contact with [Name]. Would you like to set up a relation? |
| 5 | CM01 | Make the praise when contact is often made with a person of a specific number | CALL/MESSAGE | [Yes] [Really?] [Cut it off] | {CM00} | You have often made contact with [Name] recently. It seems that you have a special relation to [Name]. |
| 6 | CM02 | Recommend group designation for a number when contact is continuously made but a group is not designated. | CALL/MESSAGE | {CM00} | {CM00} | A relation to [Name] is not setup. Would you like to set up a relation to [Name] at this time? |

TABLE 5-continued

| ID_OLD | ID | Use Case | Class | Action according to user's selection | Necessary info | Example of UI text |
|---|---|---|---|---|---|---|
| 7 | CM03 | Recommend contact with a person with whom contact has not been made recently. | CALL/MESSAGE | {SCH09} | {CM00} | You have not made contact with [Name] recently. Would you like to call [Name] for greeting? |
| 8 | CM04 | Find a person with whom contact has not been made totally and recommend contact. | CALL/MESSAGE | {SCH09} | — | You have not made contact with [Name]. Would you like to call [Name]? |
| 10 | CM05 | Select one person with whom contact has not been made for a long time from persons belonging to a group and recommend contact. | CALL/MESSAGE | {SCH09} | — | You have not made contact with [Name] of [Group]. Would you like to call [Name]? |
| 39 | CM06 | Show a call duration time and the number of messages during this week on Saturday, compare information of this week with that of last week, and show an increased/decreased number of calls (pattern analysis). | CALL/MESSAGE | — | — | (A call duration time and the number of messages are shown.) The number of calls/messages has been increased/decreased this week as compared with last week. |
| 40 | CM07 | Show a call duration time and the number of messages during this week at the end of the month, and show the increased/decreased number of calls as compared with that of a previous week. | CALL/MESSAGE | | | (The number of calls and the number of messages are shown.) The number of calls/messages has been increased/decreased this month as compared with last month. |
| 17 | ML00 | Recommend registration in a spam list when a received mail (containing a name, address, title, or content) is not continuously read/automatically sort the mail when it is present in the spam list and give notification of the spam mail. | MAIL | [View] View an item or Inbox [View later] No [Rejection registration] View an item or spam box [Release] Deletion in spam list | AP_MAIL_RECEIVE | You have received a mail from [Name/Address]. Would do you like to ignore or delete it as before? |
| 47 | ML02 | Recommend mail arrangement or check when many unread mails are in an inbox. | MAIL | [Yes] Inbox [No] No | AP_MAIL_RECEIVE | There are many unread mails. Would you like to check them? |
| 12 | MGS00 | Recommend message transmission to a specific number when a pattern for sending the message is detected at a specific time. | MESSAGE | [Yes] Message creation screen + called number [No] No | AP_SMS_SEND | Don't you have to send a message to [Name] today? May I send the message to [Name] now? |
| 14 | MSG01 | Recommend message transmission when the number of received messages from a specific number is large but the number of transmitted calls | MESSAGE | {MSG00} | AP_SMS_SEND AP_SMS_RECEIVE | You have received many messages from [Name]. Would you like to make a phone call today? |

TABLE 5-continued

| ID_OLD | ID | Use Case | Class | Action according to user's selection | Necessary info | Example of UI text |
|---|---|---|---|---|---|---|
| 15 | MSG02 | to the specific number is small. Recommend addition to a contact list when a message is not in the contact list after being received and transmitted. | MESSAGE | [Yes] Add to a contact list [No] No | AP_SMS_SEND AP_SMS_READ | Would you like to add this [Number] to the contact list? |
| 16 | MSG03 | Recommend registration of a message of an unidentified person or number in an auto-delete list/automatically delete the message when it is in the auto-delete list. | | [View] View an item or Inbox [View later] No [Rejection registration] Registration in the auto-delete list/ [No] No [Release] Deletion in the auto-delete list | AP_SMS_RECEIVE AP_MMS_RECEIVE | You have not continuously checked a message from [Name or Number]. Another message has been received from [Name or Number]. How do you process it? |
| 46 | MSG04 | Recommend mail arrangement or check when many unread messages are in an inbox. | MESSAGE | [Yes] Inbox (ViewChange) [No] No | AP_SMS_RECEIVE AP_MMS_RECEIVE | There are many unread mails. Would you like to check them? |
| 50 | MSG05 | Recommend use of MMS when the number of MMS uses is small. | MESSAGE | [Yes] MMS creation screen [No] No | AP_MSG_NEW | Would you like to use MMS to send a cool message? |
| 0 | MSG06 | CBM process | MESSAGE | | | |
| 19 | SCH00 | Recommend schedule registration and check while giving notification of a holiday before one week or day. | SCHEDULE | [Yes] Month View (ViewChange) [No] No | — | Master, there is one week left until Holiday]./ Master, tomorrow is [Holiday]. |
| 20 | SCH01 | Recommend schedule registration and check while giving notification of an anniversary before one week or day. | SCHEDULE | {SCH00} | AP_CALENDAR_ADD AP_CALENDAR_DEL AP_CALENDAR_EDIT | Master, there is one week or day left until [Anniversary]. |
| 21 | SCH02 | Recommend the registration and check of a weekend schedule on Thursday. | SCHEDULE | [Yes] Month View Saturday selection [No] No | — | Master, how do you spend your weekend? Would you like to register a schedule? |
| 23 | SCH03 | Recommend a change to a suitable profile when a schedule starts and ends. | SCHEDULE | {SYS06} | {SCH01} | [Schedule] starts. Would you like to make a change to meeting mode? [Schedule] ends. Would you like to make a change to normal mode? |
| 26 | SCH05 | Recommend the registration of a thing to do when a schedule ends. | SCHEDULE | [Register a thing to do] Creation of a new thing to do [Register a schedule] Month View [Memo] New memo [No Thanks] No | {SCH01} | Did you perform a schedule? What do you do? |
| 27 | SCH06 | Recommend that the user check a total schedule at a designated time. | SCHEDULE | [Yes] Day View [No] No | — | Would you like to check a schedule?/ A schedule is absent (when it is absent). |

TABLE 5-continued

| ID_OLD | ID | Use Case | Class | Action according to user's selection | Necessary info | Example of UI text |
|---|---|---|---|---|---|---|
| 28 | SCH07 | Recommend that the user register a schedule at a designated time. | SCHEDULE | [Yes] Month View [No] No | — | Would you like to register a schedule? |
| 49 | SCH08 | Recommend A/S every 6 months after a phone is booted. | SCHEDULE | [Yes] A/S info display [No] No | — | Master, do you have something inconvenient during use of the phone? Would you like to check A/S info? |
| 22 | SCH09 | Identify a birthday (anniversary) and give notification of the birthday (anniversary) on the day. | SCHEDULE | [Connect call] Call connection [Send message] Message creation screen + called number [No] No | Phone Book Data | [Name], special day! |
| 33 | SCH10 | Ask if a thing to do has been completed at night if it is still undone. | SCHEDULE | [Yes] To-do list (ViewChange) [No] No | — | A thing to do has not been completed. Would you like to check it? |
| 34 | SCH11 | Ask if a thing to do has been completed if it is still undone at morning. | SCHEDULE | {TD00} | — | There remains a thing that should be done yesterday. Would you like to check it? |
| 1 | SYS00 | Recommend a specific program according to status quotient when the user does not actively use the phone. | SYSTEM | [Yes] APP execution [No] No | AP_SMS_SEND AP_MMS_SEND AP_MAIL_SEND AP_RING_SOUND_CHANGED AP_RING_MODE_CHANGED AP_THEME_CHANGED AP_PHONE_SEND AP_CONTACT_ADD AP_CONTACT_EDIT AP_CONTACT_DEL AP_CONTACT_GROUP_ADD AP_CONTACT_GROUP_EDIT AP_CONTACT_GROUP_DEL AP_CALENDAR_ADD AP_CALENDAR_EDIT AP_CALENDAR_DEL AP_TODO_ADD AP_TODO_EDIT AP_TODO_DEL AP_MORNINGCALL_ADD | {Expression according to status}, would you like to run [Program] with me? |
| 25 | SYS01 | Recommend a change to ring mode when it is predicted at a predetermined time. | SYSTEM | {SYS06} | AP_RING_MODE_CHANGED | Would you like to make a change to [Vibrate/Ring] mode as usual? |
| 31 | SYS02 | Notify when a battery is full. | SYSTEM | — | AP_BATTERY_FULL | Wow! I'm so energetic now. Master, thank you. |
| 32 | SYS03 | Notify when a battery is low. | SYTEM | — | AP_BATTERY_LOW | I'm so hungry. Could you please charge me now? |
| 35 | SYS04 | Give notification of radio wave status when radio waves are not received normally. | SYSTEM | — | AP_NETWORK_LOW | Radio waves are not received. Where is here? |
| 37 | SYS05 | Notify when the remaining capacity of a memory is low. | SYSTEM | — | AP_MEMORY_LOW | Wow! My head is complex. Please delete memory data. |
| 42 | SYS06 | Recommend a change of a ring sound if it is old. | SYSTEM | [Yes] Profile list | AP_RING_SOUND_CHANGED | Master, the same ring sound has been used for [Months]. |

TABLE 5-continued

| ID_OLD | ID | Use Case | Class | Action according to user's selection | Necessary info | Example of UI text |
|---|---|---|---|---|---|---|
| | | | | [No] No | | Would you like to change the ring sound? |
| 43 | SYS07 | Recommend a background image change if the theme has been changed a long time ago. | SYSTEM | [Yes] Theme list [No] No | AP_THEME_CHANGED | Master, the same background image has been used for [Months]. Would you like to change the background image? |
| G1 | GPS00 | Give notification of a schedule along with a map before a predetermined time if a position is designated in the schedule. | GPS | | | You have ** schedule at ** place at ** hour ** Minute. It is at a distance of ** km from here. |
| G2 | GPS01 | Give notification of a schedule if the user is located at a designated place in a sate in which a position is designated in the schedule. | GPS | | GPS location information | Here, you have a ** schedule at ** hour: ** minute. |
| G3 | GPS02 | Notify when a different action is taken in a state in which a pattern of a motion path at a specific time is stored. | GPS | | GPS location information | Today, you go to a place different from usual. Where do you go? |
| G4 | GPS03 | Register friends and share their information. | GPS | | GPS location information | The current location of Mr./Mrs./Miss. ** is at a ** place. (Mr./Mrs./Miss. ** is near. Would you like to check it?) |
| G5 | GPS04 | Notify when an action out of a normal pattern is taken in a state in which a pattern of a motion path of the other side is shared according to agreement. | GPS | | GPS location information | Mr./Mrs./Miss. ** is at a ** place different from usual. |
| G6 | GPS05 | Recommend registration of a position and schedule in case of a pattern in which the user periodically stays in a predetermined area for a predetermine time or more. | GPS | | GPS location information | I think you often visit here, and this is a special place. Would you like to register it? |
| G7 | GPS06 | Recommend view of a GPS screen when the user exits his/her main residential district. | GPS | | GPS location information | Where is here? I think you have never been here before. May I show you the way? |
| G8 | GPS07 | Recommend photographing when the user exits his/her main residential district and stays during 30 or more minutes. | GPS | | GPS location information | Do you have something to do here? Would you like to take an anniversary picture? |

TABLE 5-continued

| ID_OLD | ID | Use Case | Class | Action according to user's selection | Necessary info | Example of UI text |
|---|---|---|---|---|---|---|
| G9 | GPS08 | Recommend a profile change when it is determined that a profile state in a predetermined area is different. | | | GPS location information/ Profile | Here, you always made a change to **. Would you like to make a change to ** today also? |
| G10 | GPS09 | Display near restaurants at mealtime. | | | GPS location information | Would you like to search near restaurants? |
| C1 | CMR00 | Combine a taken picture with an avatar image. | Camera | | Picture taking | Please include me in this picture. |
| C2 | CMR01 | Recommend picture taking using a camera at a specific time on an anniversary. | Camera | | Schedule registration | Would you like to take a picture for ** day as a memento? |
| C3 | CMR02 | Recommend MMS transmission after taking a picture using a camera. | Camera | | Picture taking | Would you like to send a photo to your friend? |
| C4 | CMR03 | Recommend image edition after taking a picture using a camera. | Camera | | Picture taking | Would you like to edit your photo? |
| M1 | MBL00 | Wireless game using Bluetooth or Infrared (and using an avatar quotient and an image) | Mobile | | Bluetooth info | |
| M2 | MBL01 | Use of Bluetooth: find accessible equipment when the user makes selection or the avatar determines that the user stays for a long time here, and give its notification. | Mobile | | Bluetooth info | A Bluetooth communication module for home has been detected. Would you like to connect it? |
| M3 | MBL02 | Use of Bluetooth: an avatar notifies when a registered friend is near. | Mobile | | Bluetooth info | Mr./Mrs./Miss. ** is located near you. Would you like to call Mr./ Mrs./Miss. **? |
| D1 | DMB00 | Shows today's broadcast schedule at a time designated by the user. | Digital broadcasting | | — | This is today's broadcast schedule. Would you like to check it? |
| D2 | DMB01 | Notify when an associated broadcast time is reached if a favorite broadcast list is registered. | Digital broadcasting | | — | It is a starting time of ** program. Would you like to watch a broadcast? |
| D3 | DMB02 | Notify when an associated broadcast time is reached if the user's favorite channel is detected at a specific time. | Digital broadcasting | | EPS info | It is a starting time of ** program. Would you like to watch a broadcast? |
| D4 | DMB03 | Give notification of associated program info if a specific word (of special, memorial, etc.) is found from a broadcast schedule. | Digital broadcasting | | EPS info | [Special/ Memorial/...] There is ** program info. Would you like to check it? |
| D5 | DMB04 | Give notification a predetermined time before a program of an associated genre | Digital broadcasting | | EPS info Interest list | [Culture/ Documentary/ Comedy/ Drama/...] It is a starting |

TABLE 5-continued

| ID_OLD | ID | Use Case | Class | Action according to user's selection | Necessary info | Example of UI text |
|---|---|---|---|---|---|---|
| | | starts according to a program genre designated by the user in an interest list. | | | | time of ** program. Would you like to watch a broadcast? |
| D6 | DMB05 | Identify a type of a program mainly watched by the user and give notification a predetermined time before an associated program starts. | Digital broadcasting | | EPS info Interest list | It is a starting time of ** program. Would you like to watch a broadcast? |
| D7 | DMB06 | Set ratings for limiting broadcast reception and prevent a broadcast of more than a parental rating set by the user from being watched. | Digital broadcasting | | EPS info | A person under the age of 15/19 cannot watch this program. |
| D8 | DMB07 | Periodically analyze a watching pattern and shows a result of the analysis (in a unit of a week/month). | Digital broadcasting | | EPS info | An amount of time spent watching a digital broadcast this week/month is a total of **. The amount of time spent watching the digital broadcast has been increased this week as compared with last week/month. (A graph indicating an time amount is shown according to broadcast genres of [Documentary/Drama/News/Events/Comedy/Music]) |
| D9 | DMB08 | Recommend registration in an interest list when an identical program is watched three or more times. | Digital broadcasting | | EPS info | I think you often watches ** program. Would you like to add it to the interest list? |

Second, the blackboard 330 is a working environment or information space for communication between the specialists 322 to 328. Basically, the specialists 322 to 328 can use or record information if needed. Advantages of a pattern of the blackboard 330 are as follows. First, many specialists 322 to 328 of different types can be easily integrated. Second, the specialists 322 to 328 can be independently modularized and developed because they seldom affect each other. Third, flexibility is provided for many variations (such as a change of a specialist algorithm or an addition of a new specialist).

As described above, the blackboard 330 serves a working environment or information space and supports a convenient and flexible information search. This can be designed in a tuple space adopted in a relational database or Linda, Jini and Java object spaces.

The specialists 322 to 328 require past records. For example, a specialist for automatically recommending a phone call transmission when a phone call transmission pattern is detected at a specific time will be described. A recommendation time can be computed when many past phone call transmissions are identified. In a state in which an event of the phone call transmission is recorded, the event can be retrieved from a database called the blackboard 330 if needed. In the wireless terminal with the character agent function, all the specialists 322 to 328 share the single blackboard 330. Of course, the agent engine also uses the blackboard 330. The agent engine must record an event occurring in the blackboard 330 and must record feedback information of the user. Each of the specialists 322 to 328 refers to the blackboard 330 to determine its own action and records specific information to the blackboard 330. Because the blackboard 330 is shared, all records recorded by different specialists can be referred to. Table 6 shows the blackboard 330.

TABLE 6

CBlackboard

-iDatabase: RDbDatabase
+iAgentAlarm: CAgentAlarm*
+static NewL ( ): *CBlackboard
+GetDatabase ( ): RDbDatabase&
+Insert (TAPEvent)
+Insert (TAPEvent. TInt)
+Insert (TAPEvent. TInt. TDesC16&)
+Insert (TSpecialistId. TUserFeedback)
+GetAgentAlarm ( ): CAgentAlarm*
+RemoveFutureDataL ( )

The blackboard 330 can record event information through Insert ( ) and provides an additional Insert ( ) such that additional information accompanying the event can be stored. Insert ( ) in which IDs of the specialists 322 to 328 are used as the first factor is a function for recording feedback information of the user. The specialists 322 to 328 can access and search the blackboard 330 through GetDatabase ( ).

Third, the timer processor 370 will be described. The timer processor 370 performs a function for operating the specialists 322 to 328. The specialists 322 to 328 are woke up by events occurring in the agent system, but require a timer to take a specific action at a specific time. A determination time of the specialists 322 to 328 may be different from an action time, i.e., a time when a character UI is expressed and viewed by the user. That is, a certain specialist may completely depend on the timer processor 370. For example, the SCH06 specialist (for a case for recommending that the user check a total schedule at a designated time) in cases shown in Table 5 is a specialist to be periodically executed everyday, and is a specialist completely depending on the timer processor 370. However, many specialists using the timer processor 370 require events occurring in the wireless terminal. When the event occurs, the specialist determines if a character UI will be expressed. When the specialist determines that the character UI is suitable to be displayed at a specific day and time (or month, day, and time), or again makes a determination after a specific time is elapsed, it calls a determination function using the timer processor 370. In an embodiment of the present invention, the wireless terminal with the character agent system uses one timer processor 370 to reduce system load as illustrated in FIG. 7. A request for timing (year, month, day, hour, minute, and second) for waking up each specialist is stored in the blackboard 330. The timer processor 370 performs processing for the time mapped to the earliest request of stored requests. When the request time is reached and then an alarm is operated, an associated request is deleted from the blackboard 330. Then, a request for the earliest alarm is set in the timer processor 370.

The specialist is responsible for using the timer processor 370. That is, the specialists 322 to 328 can set a time in the timer processor 370. When the setup time is unnecessary, a set time must be deleted or changed. When the set time is reached, the timer processor 370 is operated, such that the specialist setting the timer calls the second DetermineActivated ( ) from the specialist interface as shown in Table 4. The remaining process is performed in the same order as the operation order for other events.

The time change phenomenon is an element making the timer processor 370 complex. It is assumed that a timer has been set such that a certain specialist is operated after one week and that the user has changed the date of the wireless terminal to that before one year. When the timer processor 370 does not process a time change, it will be operated after one year and one week. The blackboard 330 accumulates records of a later date than the changed date. The wireless terminal with the character agent system can detect a changed time, but cannot detect a time before the change. The engine deletes future records according to a time change incapable of being predicted and simultaneously notifies all the specialists 322 to 328 that a time change has been made through a specialist function of HandleTimeChanged ( ). The specialists 322 to 328 cope with the time change. Table 7 shows the action of the specialists 322 to 328 according to the time change.

TABLE 7

| Class No. | No. | Function |
| --- | --- | --- |
| APP00 | 29 | (1) If a date is changed to one week before the set timer date, a timer is maintained. (2) Otherwise, the timer is deleted. |
| APP01 | 30 | (1) If a date is changed to one week before the set timer date, a timer is maintained. (2) Otherwise, the timer is deleted. |
| APP02 | 38 | — |
| APP03 | 41 | — |
| APP04 | 44 | (1) If a date is changed to one week before the set timer date, a timer is maintained. (2) Otherwise, the timer is deleted. |
| APP05 | 45 | (No implementation) |
| AVA00 | 36 | — |
| AVA01 | 48 | (1) If a date is changed to 30 days before the timer date, a timer is maintained. (2) Otherwise, the timer is newly set based on a changed time. |
| AVA02 | 51 | — |
| AVA03 | 18 | (1) When going to the past from the set timer, a changed time and the set timer are compared, and the set timer is maintained if their year, month, day, and time are identical. a new timer based on the changed time is compared with a previous timer, and the previous timer is maintained if their year, month, day, and time are identical. the previous timer is deleted in a case different from the above cases and the timer is set to a new time based on the changed time. (2) When going to the future from the set timer, the set timer is deleted and the new timer is set based on a changed time. |
| AVA04 | 24 | All timers are deleted, schedule information stored in an agenda server is retrieved, and a new timer is set based on a changed time. |
| CL00 | 2 | — |
| CL01 | 3 | — |
| CL02 | 9 | — |
| CL03 | 11 | (1) If a date is changed to one week before the set timer date, a timer is maintained. (2) Otherwise, the timer is deleted. |
| CL04 | 13 | (1) If a date is changed to 3 days before the set timer date, a timer is maintained. (2) Otherwise, the timer is deleted. |
| CM00 | 4 | — |
| CM01 | 5 | — |
| CM02 | 6 | — |
| CM03 | 7 | (1) If a date is changed to one week before the set timer date, a timer is maintained. (2) Otherwise, the timer is deleted. |
| CM04 | 8 | (No implementation) |
| CM05 | 10 | (No implementation) |
| CM06 | 39 | When a new timer based on a changed time and an existing timer are compared, the existing timer is maintained if they are the same as each other and a time of the existing timer is changed to that of the new timer if they are different from each other. |
| CM07 | 40 | When a new timer based on a changed time and an existing timer are compared, the existing timer is maintained if they are the same as each other and a time of the existing timer is changed to that of the new timer if they are different from each other. |

TABLE 7-continued

| Class No. | No. | Function |
|---|---|---|
| ML00 | 17 | — |
| ML02 | 47 | — |
| MSG00 | 12 | (1) If a date is changed to one week before the set timer date, a timer is maintained.<br>(2) Otherwise, the timer is deleted. |
| MSG01 | 14 | (1) If a date is changed to 3 days before the set timer date, a timer is maintained.<br>(2) Otherwise, the timer is deleted. |
| MSG02 | 15 | — |
| MSG03 | 16 | — |
| MSG04 | 46 | — |
| MSG05 | 50 | — |
| MSG06 | 0 | — |
| SCH00 | 19 | All timers are deleted and a timer based on a changed time is set. |
| SCH01 | 20 | All timers are deleted, anniversary day information stored in an agenda server is retrieved, and a timer based on a changed time is set. |
| SCH02 | 21 | When a new timer based on a changed time and an existing timer are compared, the existing timer is maintained if they are the same as each other and a time of the existing timer is changed to that of the new timer if they are different from each other. |
| SCH03 | 23 | All timers are deleted, schedule information stored in an agenda server is retrieved, and a new timer is set based on a changed time. |
| SCH05 | 26 | All timers are deleted, schedule information stored in an agenda server is retrieved, and a new timer is set based on a changed time. |
| SCH06 | 27 | When a new timer based on a changed time and an existing timer are compared, the existing timer is maintained if they are the same as each other and a time of the existing timer is changed to that of the new timer if they are different from each other. |
| SCH07 | 28 | When a new timer based on a changed time and an existing timer are compared, the existing timer is maintained if they are the same as each other and a time of the existing timer is changed to that of the new timer if they are different from each other. |
| SCH08 | 49 | (1) If a date is changed to 6 months before the set timer date, a timer is maintained.<br>(2) Others |
| SCH00 | 19 | All timers are deleted and a timer based on a changed time is set. |
| SCH01 | 20 | All timers are deleted, anniversary day information stored in an agenda server is retrieved, and a timer based on a changed time is set. |
| SCH02 | 21 | When a new timer based on a changed time and an existing timer are compared, the existing timer is maintained if they are the same as each other and a time of the existing timer is changed to that of the new timer if they are different from each other. |
| SCH03 | 23 | All timers are deleted, schedule information stored in an agenda server is retrieved, and a new timer is set based on a changed time. |
| SCH05 | 26 | All timers are deleted, schedule information stored in an agenda server is retrieved, and a new timer is set based on a changed time. |
| SCH06 | 27 | When a new timer based on a changed time and an existing timer are compared, the existing timer is maintained if they are the same as each other and a time of the existing timer is changed to that of the new timer if they are different from each other. |
| SCH07 | 28 | When a new timer based on a changed time and an existing timer are compared, the existing timer is maintained if they are the same as each other and a time of the existing timer is changed to that of the new timer if they are different from each other. |
| SCH08 | 49 | (1) If a date is changed to 6 months before the set timer date, a timer is maintained.<br>(2) Otherwise, the existing timer is deleted and a new timer is set based on a changed time. |
| SCH09 | 22 | When a new timer based on a changed time and an existing timer are compared, the existing timer is maintained if they are the same as each other and a time of the existing timer is changed to that of the new timer if they are different from each other. |
| SCH10 | 33 | When a new timer based on a changed time and an existing timer are compared, the existing timer is maintained if they are the same as each other and a time of the existing timer is changed to that of the new timer if they are different from each other. |
| SCH11 | 34 | When a new timer based on a changed time and an existing timer are compared, the existing timer is maintained if they are the same as each other and a time of the existing timer is changed to that of the new timer if they are different from each other. |
|  | 1 | (1) When going to the past, a timer is maintained if a new date is set to within two weeks before a date of the set timer. Otherwise, the date is set to two weeks after a new date. |
|  | 1 | (1) When going to the past, a timer is maintained if a new date is set to within two weeks before a date of the set timer. Otherwise, the date is set to two weeks after a new date.<br>(2) When going to the future, a timer is maintained if a new date is set to the future from a date of the set timer, and the date is set to two weeks after a new date if it is changed to a date after the set timer date. |
| SYS01 | 25 | (1) If a date is changed to one week before the set timer date, a timer is maintained.<br>(2) Otherwise, the timer is deleted. |
| SYS02 | 31 | — |
| SYS03 | 32 | — |
| SYS04 | 35 | — |
| SYS05 | 37 | — |
| SYS06 | 42 | (1) If a date is changed to 4 weeks before the timer date, a timer is maintained.<br>(2) Otherwise, the timer is newly set based on a changed time. |
| SYS07 | 43 | (1) If a date is changed to 4 weeks before the timer date, a timer is maintained.<br>(2) Otherwise, the timer is newly set based on a changed time. |

The operation of the timer processor 370 will be described. Among the specialists 322 to 328, specialists requiring or not requiring a timer are present. In this case, the specialists requiring the timer set, change, or delete a timer in the timer processor 370 as described above. When the specialist sets a timer in the timer processor 370, the timer processor 370 notifies the specialist manager 310 that the timer has been set. The specialist manager 310 operates a specialist setting the timer and performs a control operation such that a UI of an associated specialist can be expressed within a set time.

Fourth, the supervisor 350 synthetically determines user preference information and a current situation associated with the blackboard 330 and its own specialists 322 to 328 and selects a specialist for expression. At this time, the supervisor 350 can select the most suitable specialist from the specialists when selecting a specialist for expressing the character UI. When the number of specialists for expressing the character UI is multiple, all specialists can be displayed.

The operation of the supervisor 350 when the specialists express the character UI as in the latter will be described.

When an event occurs, the engine is notified of an action pattern through a determination function of a specialist. The action pattern is divided into three patterns of "No Action", "Action for displaying a UI now", and "Action for deletion in a queue during waiting for expression" or "Action for hiding when a UI is currently being expressed". Many specialists may simultaneously notify the engine of the action pattern of "Action for displaying a UI now". In this case, the engine needs to adjust the specialists in a competition relation.

Because the specialist cannot know the presence of a different specialist, it only performs an expression or hiding operation, etc. Accordingly, when specialists for expressing a character UI are delivered to the supervisor 350, the supervisor 350 arranges specialists desiring to express a character in the following algorithm.

An algorithm of the supervisor 350 has three rules. First, a basically designated priority is set to be highest. Second, the user preference is reflected. Third, all specialists must be able to express a character UI (i.e., the specialist must not be hungry).

The algorithm of the supervisor 350 will be described. Assuming that a basically designated priority is p1 (p1≥0) and the user preference for an associated specialist is p2, a priority for expressing a character UI of the specialist (hereinafter, referred to as a UI expression priority) is computed as follows.

$$p = (1/(p1+1)) * p2,$$

where $$p2 = \frac{1 - (r(0)*f(0) + (r(1)*f(1) + \ldots + r(k-1)*f(k-1))}{(g(0) + g(1) + \ldots + g(k+1))},$$

k can be set to 14, $$r(i) = xi/(xi + yi) \quad \text{if } xi + yi > 0$$
$$= 0 \quad \text{if } xi + yi = 0,$$

$$f(i) = \frac{1}{(1 + 2\log_k(i+1))},$$

$$g(i) = 1 \quad \text{if } xi + yi > 0$$
$$= 0 \quad \text{if } xi + yi = 0,$$

r(i)=a ratio relating to a negative opinion of a user on the i-th day before the current day, f(i)=a reduction factor of a negative opinion of a user on the i-th day before the current day, g(i)=the number of acceptances or rejections on the i-th day before the current day, xi=the number of times when the user rejected the specialist on the i-th day before the current day, and yi=the number of times when the user accepted the specialist on the i-th day before the current day.

Figure 8A:
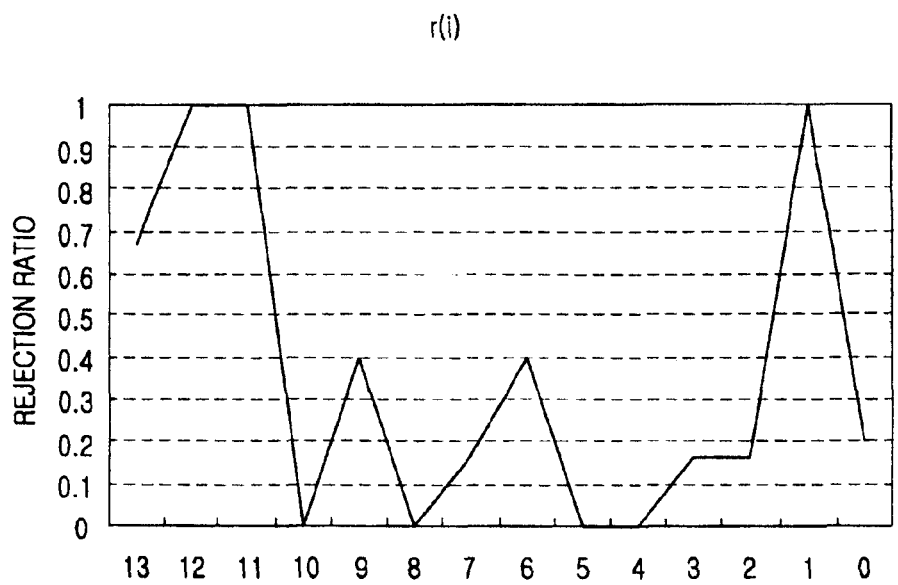
FIG. 8A illustrates an example of a rejection related curve in an algorithm of a supervisor in accordance with an embodiment of the present invention.
Figure 8B:
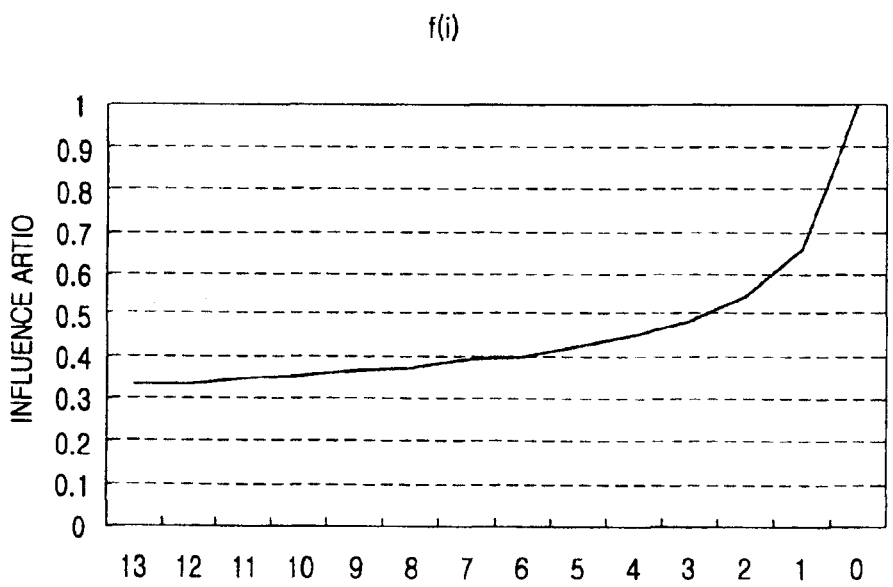
FIG. 8B illustrates an example of computing a reduction factor f of a negative opinion in the algorithm of the supervisor.
Figure 8C:
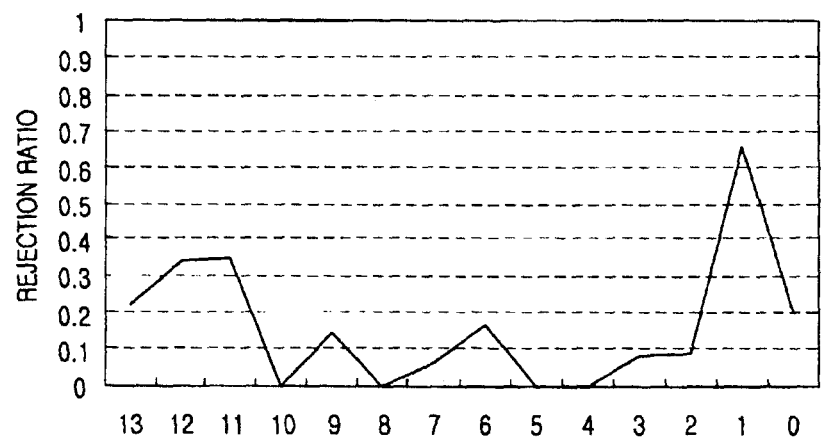
FIG. 8C illustrates an example of a corrected rejection related curve in the algorithm of the supervisor.

The reason why k is set to 14 will be described. A rejection level in which the user rejected the specialist 14 days ago is computed in a ratio of r(i). When the user completely rejected the specialist 14 days ago, the rejection ratio is 1. As a period of time has been elapsed, r(13)=1/(1=2)=0.33. If the user desires to change a slope of the curve according to time, k needs to be changed. Table 8 shows an example of algorithm computation of the supervisor 350 when it is assumed that k=14. FIG. 8A illustrates an example of a rejection related curve in the algorithm of the supervisor 350 in accordance with an embodiment of the present invention. FIG. 8B illustrates an example of computing a reduction factor f of a negative opinion in the algorithm of the supervisor 350. FIG. 8C illustrates an example of a corrected rejection related curve in the algorithm of the supervisor 350.

TABLE 8

| No. | Class No. | Priority | Limited time (minutes) |
|---|---|---|---|
| 0 | MSG06 | 0 | 10 |
| 1 | SYS00 | 2 | 30 |
| 2 | CL00 | 0 | 10 |

TABLE 8-continued

| No. | Class No. | Priority | Limited time (minutes) |
|---|---|---|---|
| 3 | CL01 | 0 | 10 |
| 4 | CM00 | 1 | 10 |
| 5 | CM01 | 1 | 10 |
| 6 | CM02 | 1 | 10 |
| 7 | CM03 | 2 | No |
| 8 | CM04 | 2 | No |
| 9 | CL02 | 1 | 10 |
| 10 | CM05 | 2 | No |
| 11 | CL03 | 2 | 30 |
| 12 | MSG00 | 2 | 30 |
| 13 | CL04 | 2 | No |
| 14 | MSG01 | 2 | No |
| 15 | MSG02 | 1 | 10 |
| 16 | MSG03 | 2 | 30 |
| 27 | SCH06 | 1 | 10 |
| 28 | SCH07 | 1 | 10 |
| 29 | APP00 | 1 | 10 |
| 30 | APP01 | 1 | 10 |
| 31 | SYS02 | 0 | 10 |
| 32 | SYS03 | 0 | 10 |
| 33 | TD00 | 1 | 10 |
| 34 | TD01 | 1 | 10 |
| 35 | SYS04 | 0 | 10 |
| 36 | AVA00 | 2 | 30 |
| 37 | SYS05 | 0 | 10 |
| 38 | APP02 | 1 | 10 |
| 39 | CM06 | 2 | No |
| 40 | CM07 | 2 | No |
| 41 | APP03 | 1 | 10 |
| 42 | SYS06 | 2 | No |
| 43 | SYS07 | 2 | No |

An example of a rejection related curve illustrated in FIG. 8A expresses the 'r' value in the algorithm computation of the supervisor 350 shown in Table 8 and shows the number of rejections on a date-by-date basis. FIG. 8B illustrates a curve indicating a level in which the user preference is reflected on the date-by-date basis in the 'f' computation of the algorithm of the supervisor 350. It can be found that a stronger user preference is reflected on an earlier date. The rejection related curve corrected in the algorithm of the supervisor 350 in FIG. 8C indicates the number of rejections computed along with the user preference reflected on the date-by-date basis. A final computation result is reproduced from these values. In an above example, a ratio in which the user prefers an associated specialist is computed as 0.79012323. On the basis of this ratio value and a basically designated priority of an associated specialist, a final UI expression priority is computed.

The supervisor 250 sends, to the engine (or specialist manager), a list of specialists arranged according to computed UI expression priorities. At this time, the supervisor 350 can exclude a specialist with an excessively low UI expression priority. Even though 10 specialists have been selected as candidates, the number of specialists for expressing an actual character UI may be less than 10. Even though a specialist with the excessively low UI expression priority is excluded, the specialist excluded for a long time must have an opportunity to express a character UI according to Rule 3 of the algorithm of the supervisor 350.

Figure 9:
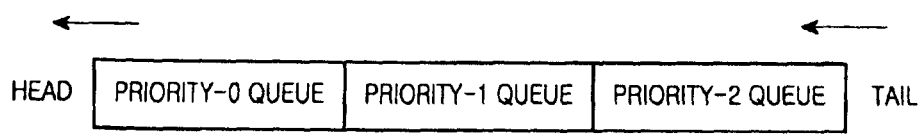
FIG. 9 illustrates a structure of a priority queue for storing specialists arranged in order of expression priorities set by computation of the supervisor in accordance with an embodiment of the present invention.

FIG. 9 illustrates a priority queue for storing specialists arranged according to UI expression priorities set by computation of the supervisor 350. As illustrated in FIG. 9, all specialists are assigned one of the following three UI expression priorities, respectively. First, a specialist of the $0^{th}$ priority is a specialist for expressing a character UI even when the wireless terminal is being used. A specialist of the $1^{st}$ priority is a specialist appearing even when the wireless terminal is being used and a specialist waiting while another specialist is expressing a character list or in a waiting state. A specialist of the $2^{nd}$ priority waits without expressing any character UI while the wireless terminal is being used. Table 9 is a basic priority allocation table for the specialists 322 to 328.

TABLE 9

| i | Acceptance | Rejection | r(i) = Rejection/ (Acceptance + Rejection) | f(i) = 1/(1 + 2 log$_k$ (i + 1)) | r(i)*f(i) | Sum of r(i)*f(i) |
|---|---|---|---|---|---|---|
| 13 | 1 | 2 | 0.666666667 | 0.333333333 | 0.222222 | 2.30864442 |
| 12 | 0 | 2 | 1 | 0.339692658 | 0.339693 | |
| 11 | 0 | 1 | 1 | 0.346839558 | 0.34684 | Sum of g(i) |
| 10 | 1 | 0 | 0 | 0.354957811 | 0 | 11 |
| 9 | 3 | 2 | 0.4 | 0.364297963 | 0.145719 | |
| 8 | 4 | 0 | 0 | 0.375212184 | 0 | |
| 7 | 5 | 1 | 0.166666667 | 0.388214249 | 0.064702 | |
| 6 | 3 | 2 | 0.4 | 0.404089233 | 0.161636 | |
| 5 | 0 | 0 | 0 | 0.424110082 | 0 | |
| 4 | 0 | 0 | 0 | 0.450509977 | 0 | |
| 3 | 5 | 1 | 0.166666667 | 0.48766259 | 0.081277 | |
| 2 | 10 | 2 | 0.166666667 | 0.54567897 | 0.090946 | |
| 1 | 0 | 3 | 1 | 0.655609132 | 0.655609 | P2 |
| 0 | 4 | 1 | 0.2 | 1 | 0.2 | 0.79012323 |

When the wireless terminal does not express a character UI, the priority queue of FIG. 9 is empty. In case of Priority 0, a new specialist is added before the priority queue. Specialists of UI Expression Priorities 1 and 2 are added after a specialist waiting in Priority 0. Accordingly, the specialists of UI Expression Priorities 1 and 2 do not affect the character UI expression of the current specialist. However, the specialist of UI Expression Priority 0 stops the character UI currently being expressed and expresses its own character UI. Accordingly, a new specialist of Priority 0 can hide the character UI currently being expressed and express its own character UI. The specialist of the $1^{st}$ priority can hide the character UI expression of the specialist of the $2^{nd}$ priority and express its own character UI. When an identical UI is currently being expressed or the waiting state is entered, the character UIs of the $1^{st}$ and $2^{nd}$ priorities must wait their turns for character UI expression. When the user's input is present or no input is present for a predetermined time, the character UI is automatically deleted from the priority queue. At this time, the first item of the priority queue with the structure of FIG. 9 is deleted and a character UI of the next specialist is expressed. UI Expression Priority 2 must not be expressed in a state in which the wireless terminal is being used. Using a method operating after a predetermined time is elapsed when an inactivation related function provided in the wireless terminal is used or the user presses a key, a character UI must be expressed after an inactivation time of the system is detected.

The specialists have the limited time in which the character UI is expressed along with the UI expression priority as shown in Table 9. After the limited time is elapsed, the character UI is not meaningful. For example, the effect of the recommendation for a specific operation at a specific time is lost after a predetermined time is elapsed.

After the basically designated priority and the user preference are computed, a specialist of the highest priority is selected and a character UI of the selected specialist can be expressed. This method corresponds to the former of the methods for selecting a specialist.

Fifth, the avatar quotient memory 340 performs a function for containing an avatar quotient changed according to an occurred event and the user's action based on the occurred event. In accordance with an embodiment of the present invention, the wireless terminal provides its user with a useful function through an avatar interface based on the AI agent system and can bring up an avatar through use of the wireless terminal. The agent system detects various events occurring in the wireless terminal and delivers the detected events to the respective functions. Then, many situations are synthetically considered in an associated function and the system is notified of the presence of an associated function operation. The agent controller 130 selects one or more specialists most suitable for the current situation and prepares an operation. Feedback information is received from the user through an avatar interface such that an associated function can be operated in various ways according to the user preference.

An internal quotient of an avatar is varied according to various event and agent functions occurring in the wireless terminal and the feedback information of the user. Also, many application events capable of using the avatar quotient affect the avatar quotient. As the internal quotient is varied, an avatar interface is varied. As a period of time is elapsed, the appearance in which the avatar is brought up is viewed. This is a growth concept of the avatar. In accordance with an embodiment of the present invention, the avatar growth is introduced into the wireless terminal based on the AI agent system. For this, the wireless terminal recommends and reports many actions for the user on the basis of various events occurring in the wireless terminal. Accordingly, the user can use the terminal more effectively and enjoyably. On the basis of these events and the user's feedback action, the avatar quotient is varied.

The operation of the agent controller 130 with the above-described structure will be described with reference to FIG. 7. When an event is received from the event delivery server 120, the specialist manager 310 stores event information in an associated event storage area of the blackboard 330. At this time, the event information delivered from the event delivery server 120 has the format as shown in Table 1. When an event message as shown in Table 1 is received, the specialist manager 310 refers to the received event message and parameters, replaces the parameters with necessary information or further adds necessary parameters, and stores the event message and the necessary information in the blackboard 330. Then, the specialist manager 310 refers to the internal event-by-event specialist list, selects specialists associated with the received event from the specialists 322 to 328, and delivers the received event message. At this time, the specialists 322 to 328 are provided with an identifier (ID) of an avatar UI for agent expression when they are finally selected according to a necessary event and the supervisor 350.

At least two specialists may be mapped to one event. In this case, one specialist is selected such that a character UI can be expressed in accordance with an embodiment of the present invention. Also, at least two specialists are selected such that a character UI of each specialist can be expressed. When one specialist is selected to express a character UI, the specialist manager 310 requests that the supervisor 350 select the most suitable specialist. Then, the supervisor 350 analyzes data of the blackboard 330, a basically designated priority according to an event, and a user preference for the specialist, thereby selecting the most suitable specialist. When the supervisor 350 selects a specialist according to the received event, the specialist manager 310 sends, to the selected specialist, an avatar UI ID request for agent expression. When the UI ID is received from the specialist, the received ID is sent to the agent UI expression part 140.

When multiple specialists are selected to express a character UI, the specialist manager 310 notifies the supervisor 350 of specialists for expressing a character UI associated with an event. Then, the supervisor 350 refers to the priority allocation table as shown in Table 9, refers to a basically designated priority, and reflects a user preference for an associated specialist. Then, the supervisor 350 notifies the specialist manager 310 of a list of specialists arranged according to set priorities while performing the procedure. UI expression priorities of the specialists arranged as described above are stored in the priority queue as illustrated in FIG. 9. When the supervisor 350 selects specialists according to the received event, the specialist manager 310 sends, to an associated specialist, an avatar UI ID request for character UI expression according to the UI expression priorities of the selected specialists while identifying the priority queue. When the UI ID is received from the specialist, the received UI ID is sent to the agent UI expression part 140.

A procedure for selecting specialists associated with an event occurred as described above and expressing a character UI will be described. First, when an event (including an event collected by the event collector 110 or an event by a timer) is input, the specialist manager 310 identifies specialists registered for the input event from a list of event-by-event specialists and then notifies associated specialists of the input event. When the number of specialists associated with the input event is multiple, an inquiry is sent to the supervisor 350. Then, the supervisor 350 analyzes a designated priority and a user preference, sets UI expression priorities of specialists for expressing a character UI, orders the priorities, and notifies the specialist manager 310 of the ordered priorities. According to the ordering, the specialist manager 310 arranges the specialists in a priority buffer and performs a control operation to sequentially operate the specialists according to the ordered priorities and express a UI of an associated specialist.

According to the event occurrence and processing result in an embodiment of the present invention, a quotient of an avatar UI is changed and avatar growth is controlled. The avatar quotient can be changed when the specialists send a change request to the avatar quotient memory 340.

Figure 10:
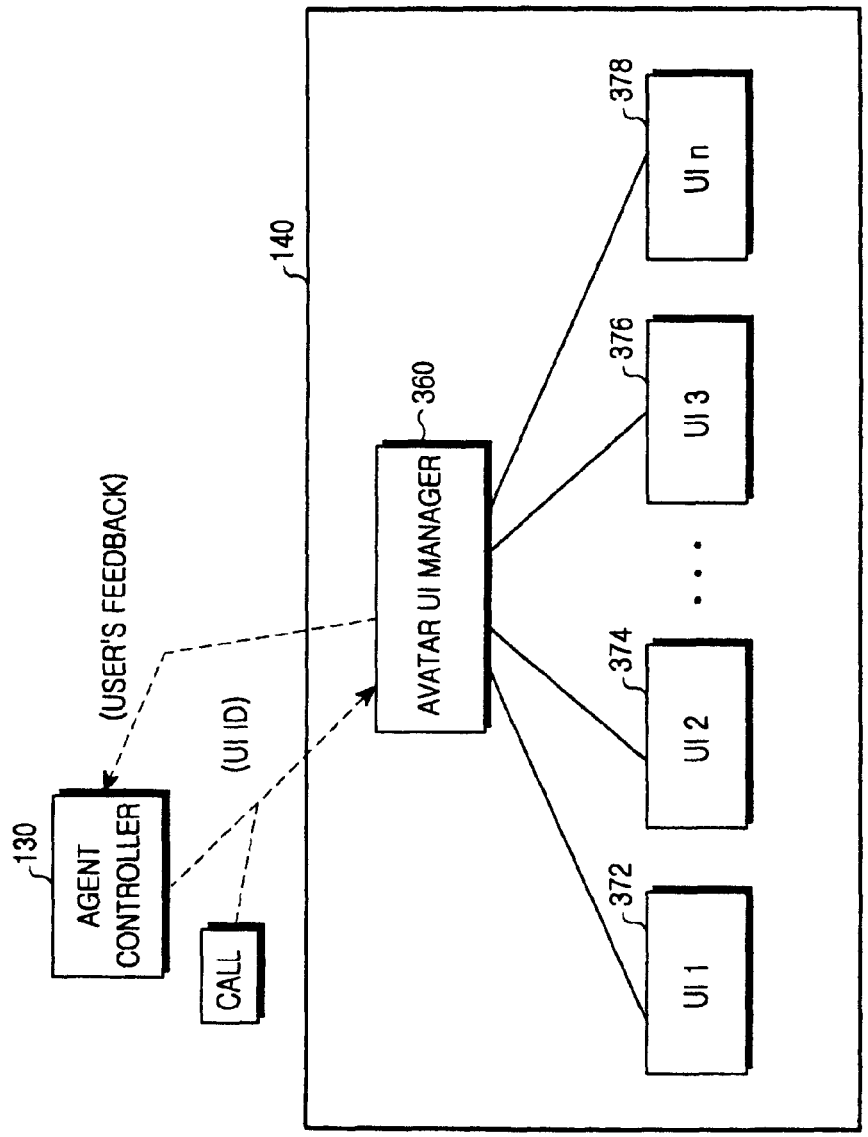
FIG. 10 illustrates a structure of an agent UI expression part of FIG. 4.

The agent UI expression part 140 receiving the above-described avatar UI ID has the structure as illustrated in FIG. 10. The agent UI expression part 140 manages a plurality of avatar UIs to be displayed to the user of the wireless terminal and performs an operation for displaying, to the user, an avatar UI mapped to a UI ID requested by the agent controller 130.

The wireless terminal with the character agent system uses a character as a UI. Here, it is assumed that the character is an avatar. Because the character UI is configured independent of the agent engine, the character UI can be used. Along with the character UI, various forms such as text, audio, and so on can be implemented. Table 10 shows a UI interface of the agent UI expression part 140.

TABLE 10

<>
MagentExpression

+SetFeedbackController
(MAgentFeedback*aFeedbackController)( )
+Show (aUIId: TUIId. aSubIndex. ConstRTokens&): void
+Hide ( )

The UI must be implemented with MAgentExpression as shown in Table 10. In Table 10, Show ( ) is used to show a UI, and Hide ( ) is used to hide a UI. The engine must designate a class to receive a feedback input for a UI through SetFeedbackController.

When the wireless terminal with an AI agent function uses a character UI in accordance with an embodiment of the present invention, the character can attract interest of the user using an avatar model. The avatar model can bring up the character according to use of the wireless terminal. In this case, the growth of the character (e.g., avatar) depends on time and use of the user's device. For example, the character is brought up as a period of time is elapsed. According to a method in which the user uses a device, a character quotient is variously changed and features of the character can be differently expressed.

Referring to FIG. 10, the agent UI expression part 140 is configured by an avatar UI manager 360 and a plurality of UIs 372 to 378 corresponding to avatar UIs. Here, the UIs 372 to 378 are avatar data to be actually displayed. The avatar UIs are avatars according to event avatar growth mode and steps of the mode and avatars set according to an avatar quotient.

Therefore, when the agent controller 130 receives an avatar UI ID, the avatar UI manager 360 selects a UI mapped to the avatar UI ID, and operates the avatar UI. The avatar UI is displayed on the display unit 27. In this case, the avatar UI can be displayed along with avatar UI text, voice, or music as well as an avatar UI image. When an event occurs, the user can identify an avatar image and text of an event according to the avatar growth mode and the avatar quotient in the avatar UI through the display unit 27.

When the user generates selection information after identifying an avatar UI displayed on the display unit 27, the avatar UI manager 360 is notified of an associated UI. The avatar UI manager 360 delivers the user feedback information to the agent controller 130.

The agent controller 130 with the structure as illustrated in FIG. 7 stores the user feedback information in the blackboard 330 and operates a specialist operating an associated UI. At this time, the user feedback information is an item selected by the user according to avatar UI text for the occurred event. For example, when contact information is not present after a message is received/transmitted in a message event, avatar UI text recommends that the user add contact information. Accordingly, response (yes/no) information made by the user is the user feedback information. When the user feedback information is generated as described above, the agent controller 130 delivers the user's feedback information to the specialist such that the specialist can process the feedback information. The avatar quotient can be changed through the specialist.

FIGS. 11 to 18 are flowcharts illustrating operation procedures of an avatar agent system of the wireless terminal with the structures as illustrated in FIGS. 4 to 10.

Figure 11:
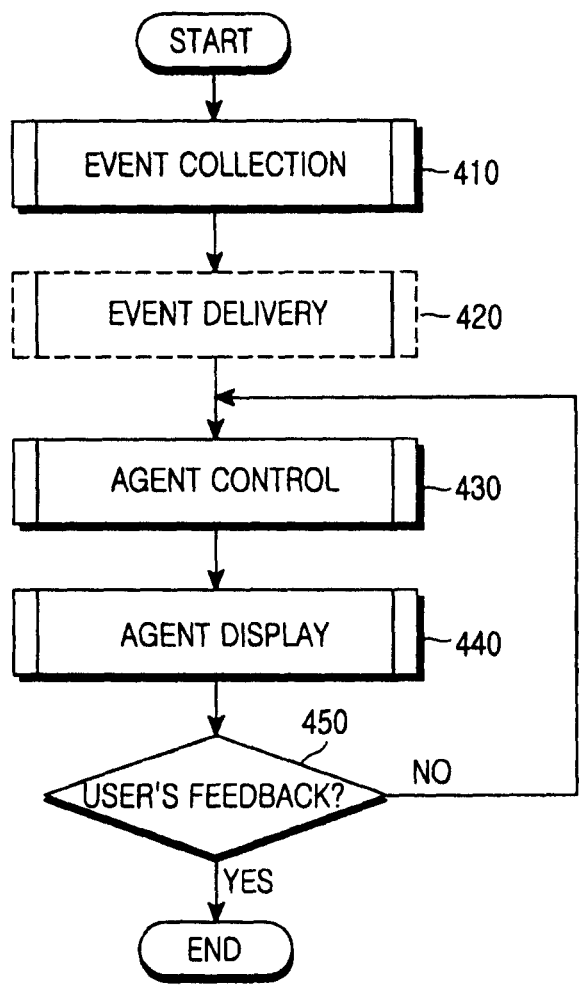
FIG. 11 is a flowchart illustrating a procedure for implementing an agent in accordance with an embodiment of the present invention.

FIG. 11 is a flowchart illustrating a procedure for analyzing an event occurring in the avatar agent system as illustrated in FIG. 4 and operating the avatar agent system.

Referring to FIG. 11, the controller 100 collects an event and generates an event message when the event occurs in step 410. At this time, the generated event message has the structure as shown in Table 1. Then, the controller 100 delivers the occurred event to a device for processing the event in step 420. When the agent system has the structure as illustrated in FIG. 4, the device for processing the event may be the agent controller 130. When the device in which the event occurs is implemented only in the event collector 110, the event delivery server 120 can be omitted. In this case, the event can be directly delivered from the event collector 110 to the agent controller 130. Then, the controller 100 receives and analyzes the generated event message, selects a specialist for processing the event message from selected specialists, and sets a UI ID of the selected specialist in step 430. Then, the controller 100 selects an avatar UI mapped to the set UI ID from the avatar memory of the memory 23 and displays the selected avatar UI on the display unit 27 in step 440.

The displayed avatar UI may have a function for requesting the user's selection. Then, when the wireless terminal user selects an associated function, the controller 100 detects the selection in step 450 and then returns to step 430 to perform an agent control operation. At this time, the controller 100 repeats the above-described operation according to the user feedback information in step 430.

As described above, the wireless terminal can select an avatar UI mapped to the occurred event and display the event occurrence in the avatar agent function.

Figure 12:
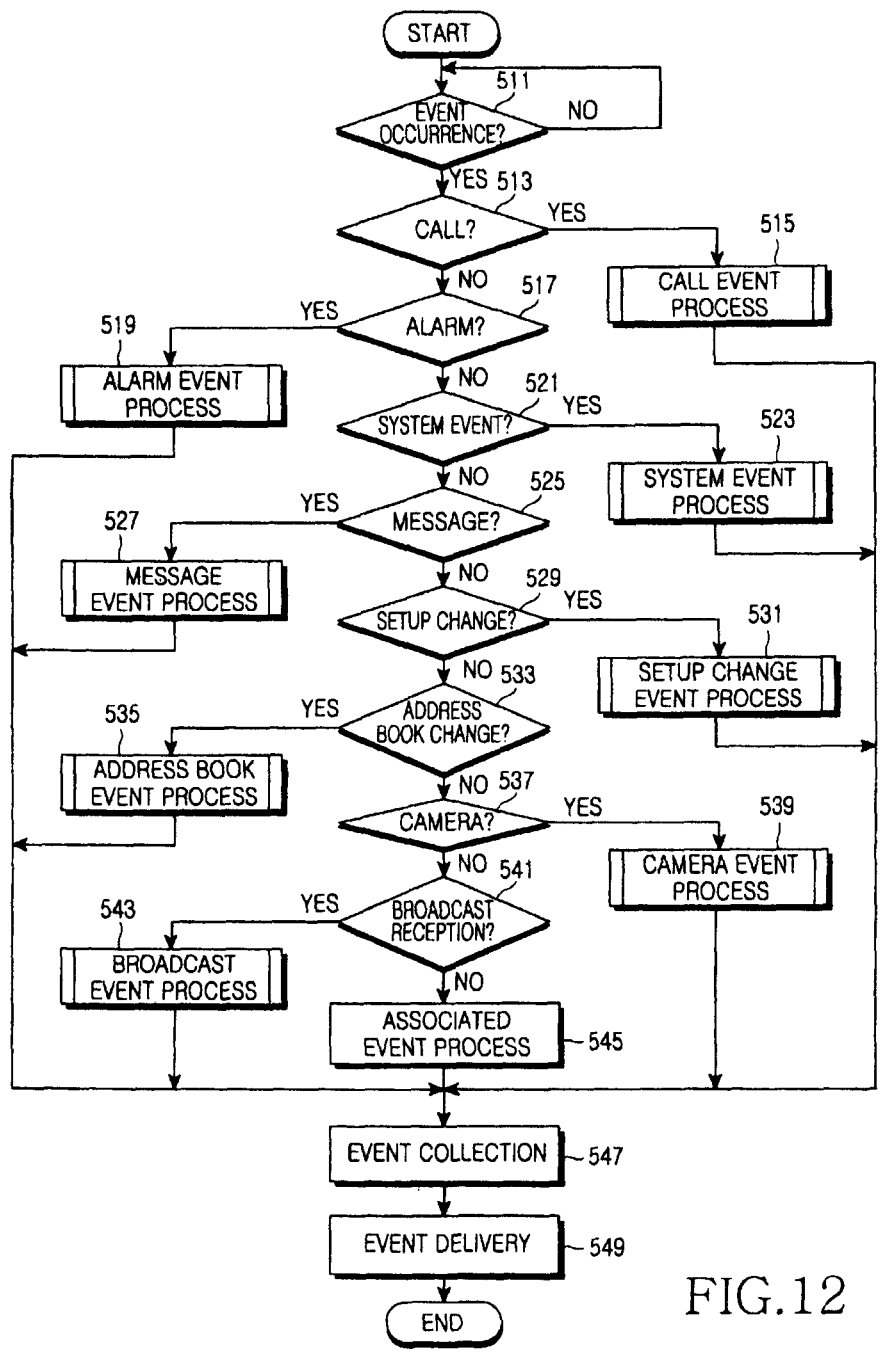
FIG. 12 is a flowchart illustrating a procedure for collecting events in FIG. 11.

FIG. 12 is a flowchart illustrating an operation procedure of the event collector 110 in the agent system.

Referring to FIG. 12, the event collector 110 detects an event when the event occurs and processes the occurred event in step 511.

First, when a call event occurs, the event collector 110 detects the occurred call event in step 513 and processes the occurred call event in step 515. At this time, the call event detector 236 processes the call event. When the call event is detected, the event collector 110 processes the call event according to the procedure of FIG. 13.

Figure 13:
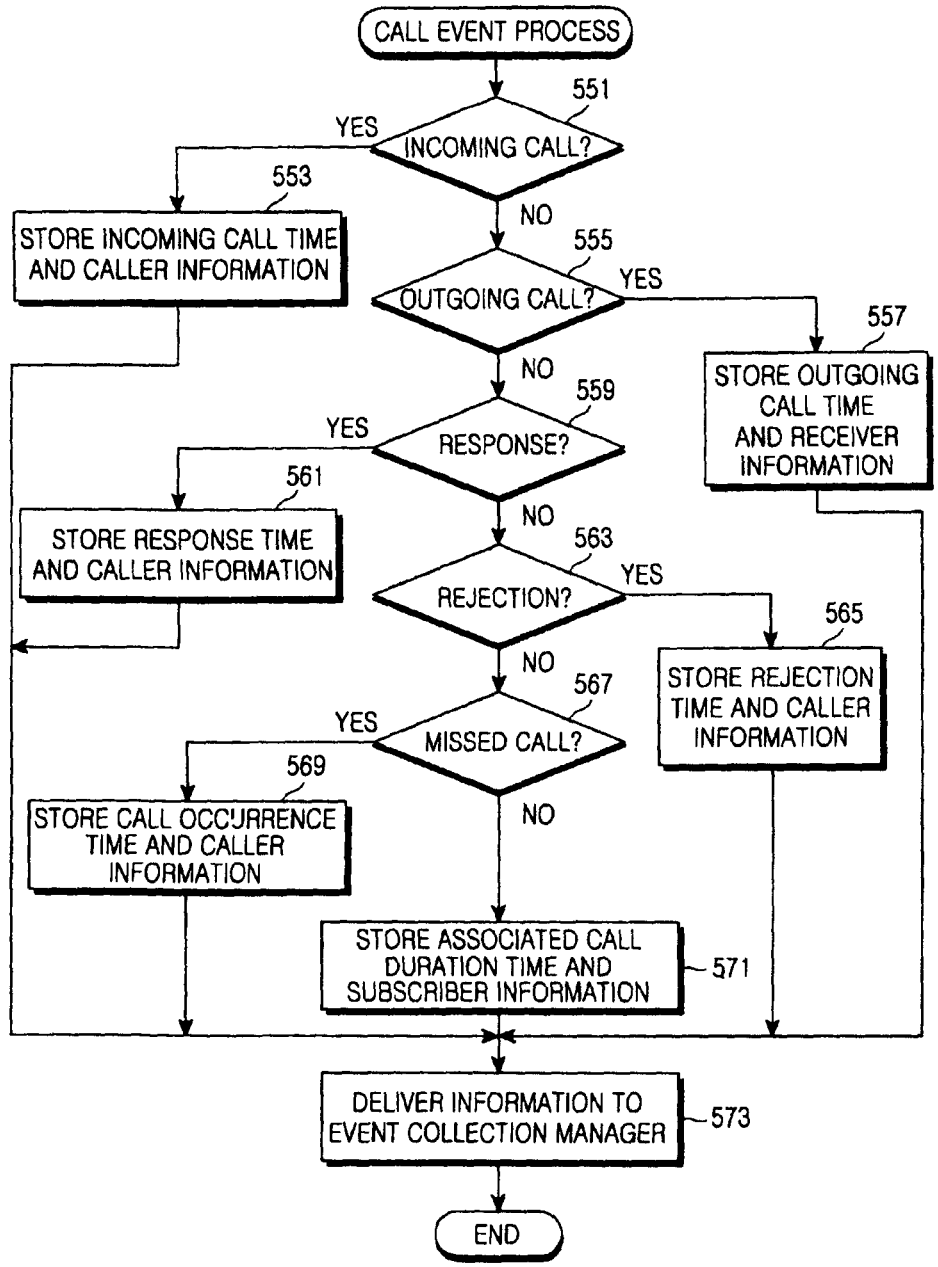
FIG. 13 is a flowchart illustrating a procedure for collecting a call event in FIG. 12.

Referring to FIG. 13, types of the call event may be an incoming call, an outgoing call, an answering call, a rejected call, a missed call, and so on. When the call event type is the incoming call, the event collector 110 stores incoming call information according to an incoming call time, a calling person, and so on in steps 551 and 553. When the call event type is the outgoing call, the event collector 110 stores outgoing call information according to an outgoing call time, a called person, and so on in steps 555 and 557. When the call event type is the answering call, the event collector 110 stores answering call information according to an answering time, a calling person, and so on in steps 559 and 561. When the call event type is the rejected call, the event collector 110 stores incoming call information according to a rejection time, a calling person, and so on in steps 563 and 565. When the call event type is the missed call, the event collector 110 stores missed call information according to a missed call time, a calling person, and so on in steps 551 and 553. When the event is not the above-described call event, the event collector 110 stores call duration time and subscriber information according to an associated call event in step 571. Then, the event collector 110 collects information according to a call event and generates an event message in step 573. Accordingly, when the call event detector 236 processes the procedure of FIG. 13, information of the detected call event is delivered to the event collection manager 210, such that an event message can be generated.

Figure 14:
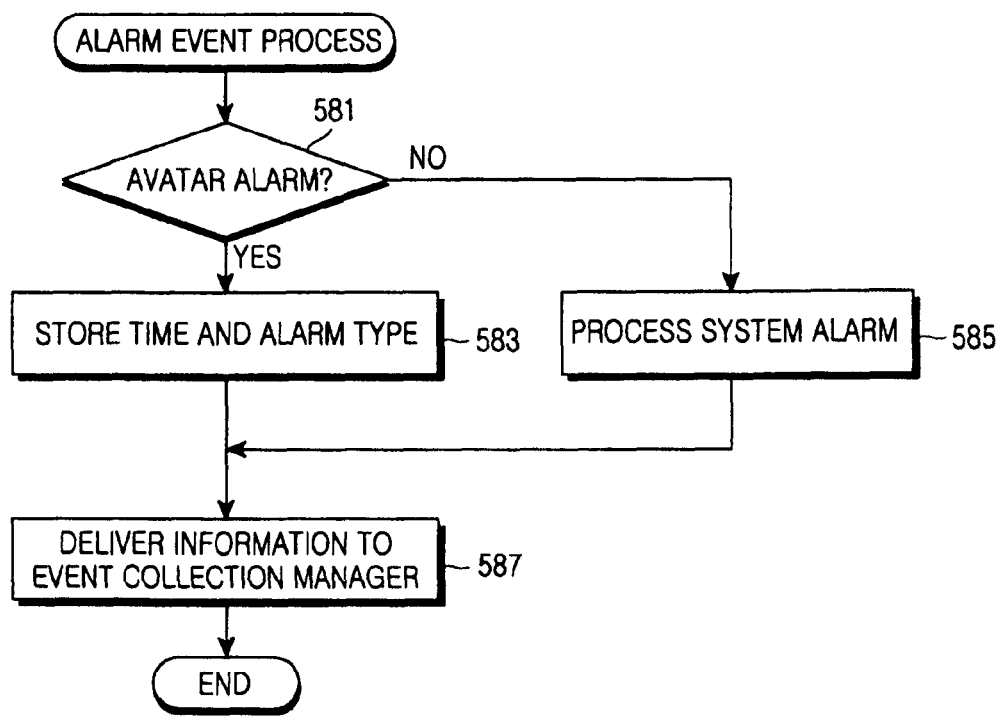
FIG. 14 is a flowchart illustrating a procedure for collecting an alarm event in FIG. 12.

Second, when an alarm event occurs, the event collector 110 detects the occurred alarm event in step 517 and processes the occurred alarm event in step 519. At this time, the alarm event is processed in the schedule change event detector 230. When a schedule change event is detected, the event collector 110 processes the schedule change event according to the procedure of FIG. 14. Here, the term "schedule change event" includes a schedule, a schedule change, an alarm, and so on. In FIG. 14, the schedule change event will be described as the alarm event.

Referring to FIG. 14, the event collector 110 determines if the alarm event is an avatar alarm event when the alarm event occurs in step 581. If the alarm event is the avatar alarm event, the event collector 110 detects the avatar alarm event in step 581, stores alarm event information such as a type, time, and so on of the occurred alarm event in step 583, and collects information based on the avatar alarm event to generate an event message in step 587. However, if the alarm event is not the avatar alarm event in step 581, general alarm event information such as an alarm event type and time is stored and an event message is generated while steps 585 and 587 are performed. Accordingly, when the procedure of FIG. 14 is processed in the schedule change event detector 230, the detected alarm event information is delivered to the event collection manager 210, such that an event message can be generated.

Third, when a message event occurs, the event collector 110 detects the occurred message event in step 525 and processes the occurred message event in step 527. At this time, the message event is processed in the message event detector 228. When the message event is detected, the event collector 110 processes the message event according to the procedure of FIG. 15.

Figure 15:
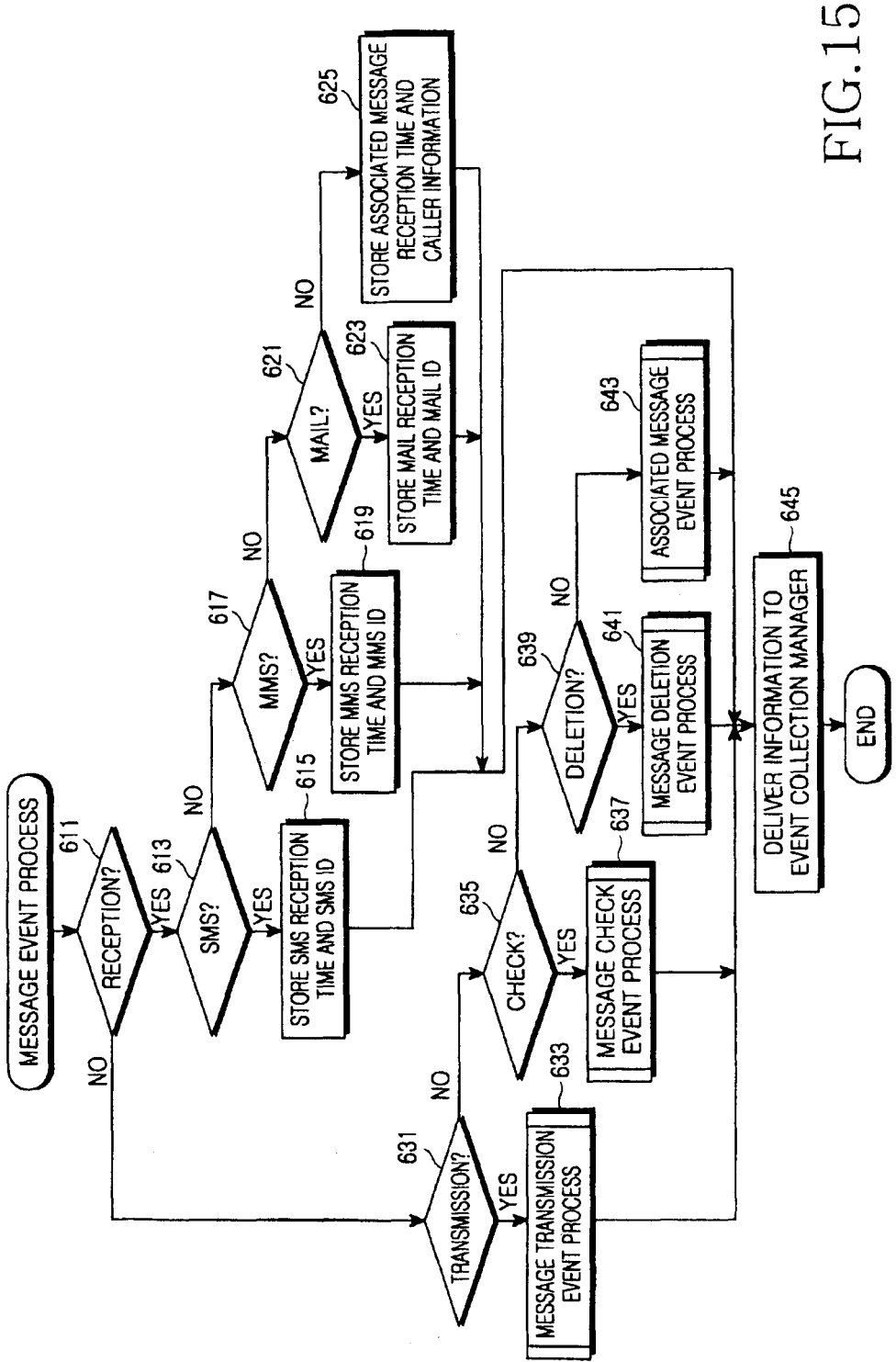
FIG. 15 is a flowchart illustrating a procedure for collecting a message event in FIG. 12.

Referring to FIG. 15, message events are message reception, transmission, check, deletion, and so on. The above-described message events can occur in a short message service (SMS), multimedia messaging service (MMS), e-mail, and so on. When the message reception event occurs, the event collector 110 determines if the occurred message reception event is the SMS, extended message service (EMS), MMS, or e-mail event and stores a reception time and a message (e-mail) ID for the occurred event while performing steps 613 to 625. That is, when the message reception event occurs, the event collector 110 determines if the message reception event is the SMS, MMS, or e-mail event and stores a reception time and message (e-mail) ID of an analyzed message. The types of message events have been described as the SMS, EMS, MMS and e-mail in FIG. 15, but other messages as well as the three types of messages can be processed. In case of a type of a message event undefined in FIG. 15, an associated message event can be processed in step 625.

Then, the event collector 110 collects information of the message reception event such that an event message can be generated using the information in step 645. When the above-described procedure is processed in the message event detector 228, the detected message event information is delivered to the event collection manager 210 in step 645, such that the event message can be generated.

When the message transmission event occurs, the event collector 110 detects the occurred message transmission event in step 631 and determines if the message transmission event is the SMS, MMS, or e-mail event and stores a transmission time and message (e-mail) ID of an analyzed message in step 633. When the message check event occurs, the event collector 110 detects the occurred message check event in step 635 and determines if the message check event is the SMS, MMS, or e-mail event and stores a check time and subscriber information of an analyzed message in step 639. When the message deletion event occurs, the event collector 110 detects the occurred message deletion event in step 639 and determines if the message deletion event is the SMS, MMS, or e-mail event and stores a deletion time and message (e-mail) of an analyzed message in step 641. After the above-described operations are performed, the event collector 110 collects information of the message event such that an event message can be generated using the information in step 645. When the procedure of FIG. 15 is processed in the message event detector 228, the detected message event information is delivered to the event collection manager 210 in step 645, such that an event message can be generated.

Fourth, when an address book change event occurs, the event collector 110 detects the occurred address book change event in step 533 and processes the occurred address book change event in step 535. At this time, the address book change event is processed in the address book change event detector 228. When the address book change event is detected, the event collector 110 processes the address book change event according to the procedure of FIG. 16. Here, addresses may be a phone number, an address, an e-mail ID, and so on.

Figure 16:
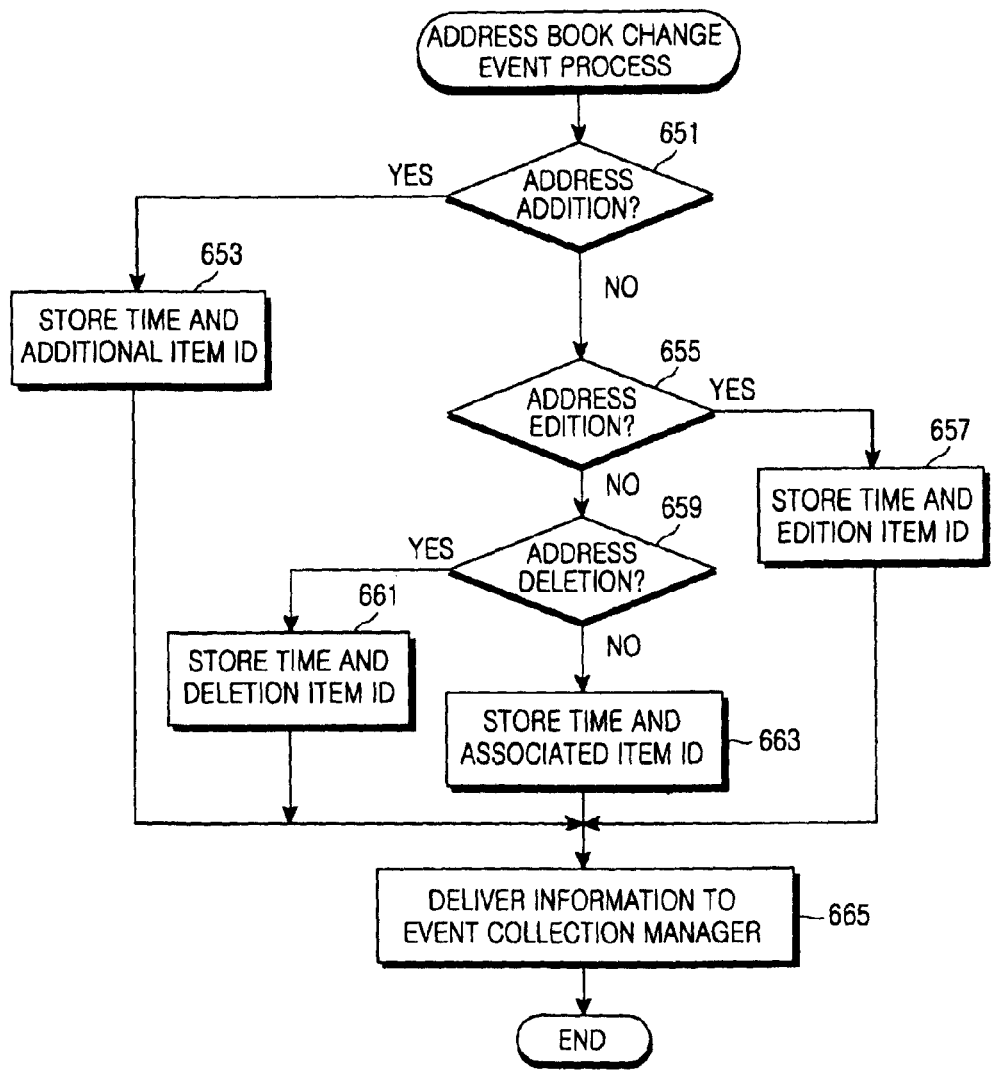
FIG. 16 is a flowchart illustrating a procedure for collecting an address book change event in FIG. 12.

Referring to FIG. 16, the event collector 110 analyzes a type of the address book change event and stores an occurrence time and an address book change event item according to the analyzed type of the address book change event while performing steps 651 to 665 when the address book change event occurs. Here, the types of address book change events may be address addition, address edition, address deletion, and so on. According to the above-described address change event type, event information (of a time and item ID) is stored. The types of address book change events have been described as the address addition, address edition, address deletion, and so on in FIG. 15, but other address book changes as well as the three types of address book changes can exist. When a different address book change event rather than the three types of address book changes occurs, the event collector 110 stores information of an associated address book change event in step 663. After the above-described operations are performed, the event collector 110 collects information of the address book change event such that an event message can be generated using the information in step 665. When the procedure of FIG. 16 is processed in the address book event detector 224, the detected address book event information is delivered to the event collection manager 210 in step 665, such that an event message can be generated.

In the above-described method, other events such as a system event, a setup change event, a camera event, and a broadcast event are processed. After the events are processed, the event collector 110 generates an event message using information of the processed event in step 547. At this time, the event message has the structure as shown in Table 1. The generated event message is delivered to the event delivery server 120 or the agent controller 130 in step 549.

Figure 17:
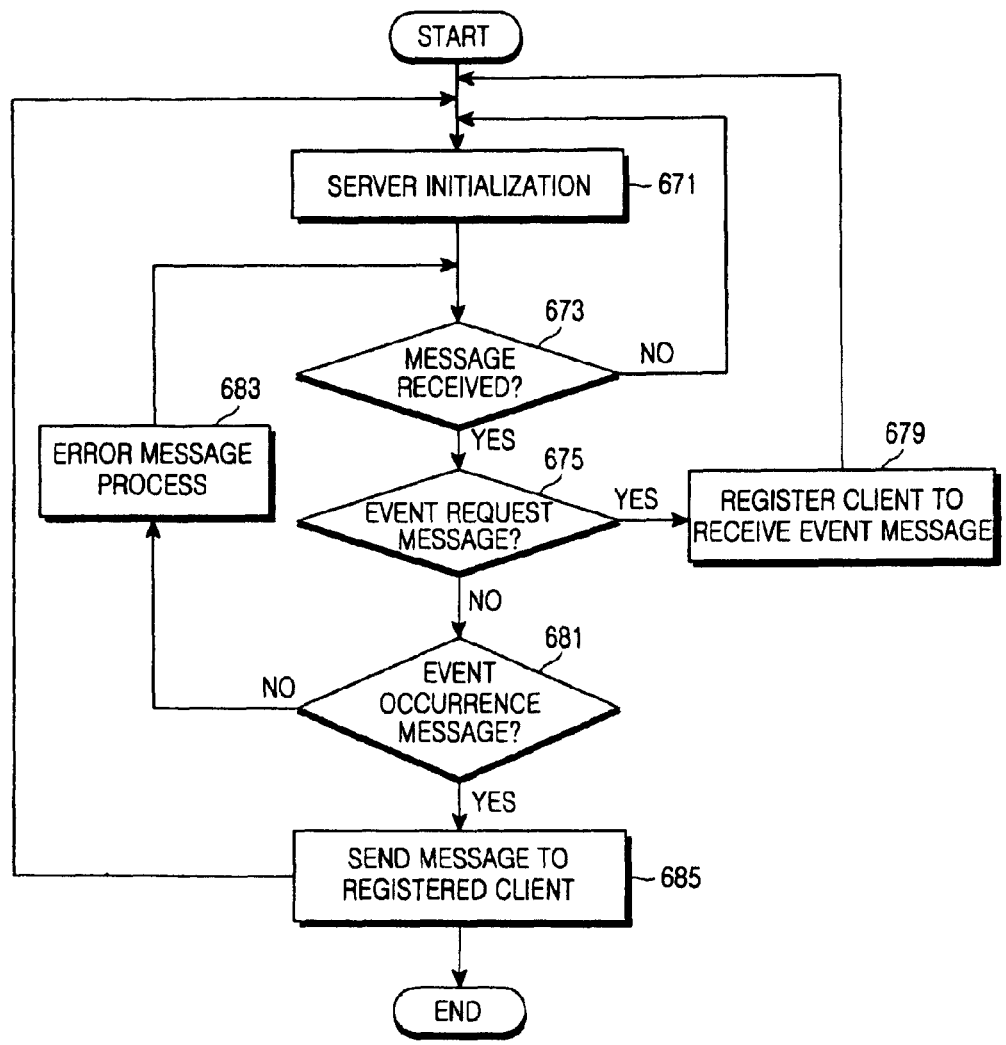
FIG. 17 is a flowchart illustrating a procedure for delivering the collected events in FIG. 11.

FIG. 17 is a flowchart illustrating a procedure for delivering a received event from the event delivery server 120 of the agent system.

Referring to FIG. 17, the event delivery server 120 performs an initialization operation in step 671. When a message is received, the event delivery server 120 detects the received message in step 673 and determines if the message is a message for requesting event message delivery or a generated event message in steps 675 and 681. Here, the message for requesting event message delivery is generated from the agent controller 130, and the event message is generated from the event collector 110. When the message is the event delivery request message, the event delivery server 120 detects the request message in step 675 and registers a client connector (i.e., the second client connector 254 in accordance with an embodiment of the present invention) for delivering the event message in step 679. That is, the second client connector 254 is registered such that the received event message can be delivered to the agent controller 130. When the received message is the event message, the event delivery server 120 detects the received event message in step 681 and delivers the received event message (i.e., the event message generated from the event collector 100 or the application message) through the client connector (i.e., the second client connector 254) requesting the event delivery. When a message is not the event request or received event message, an associated message is processed as an error in step 683.

As described above, the event delivery server 120 performs a function for delivering event messages generated from the event collector 110 and other application events to the agent controller 130 making an event delivery request. When an agent control operation is not performed for the application events, the event delivery server 120 can be omitted.

Figure 18:
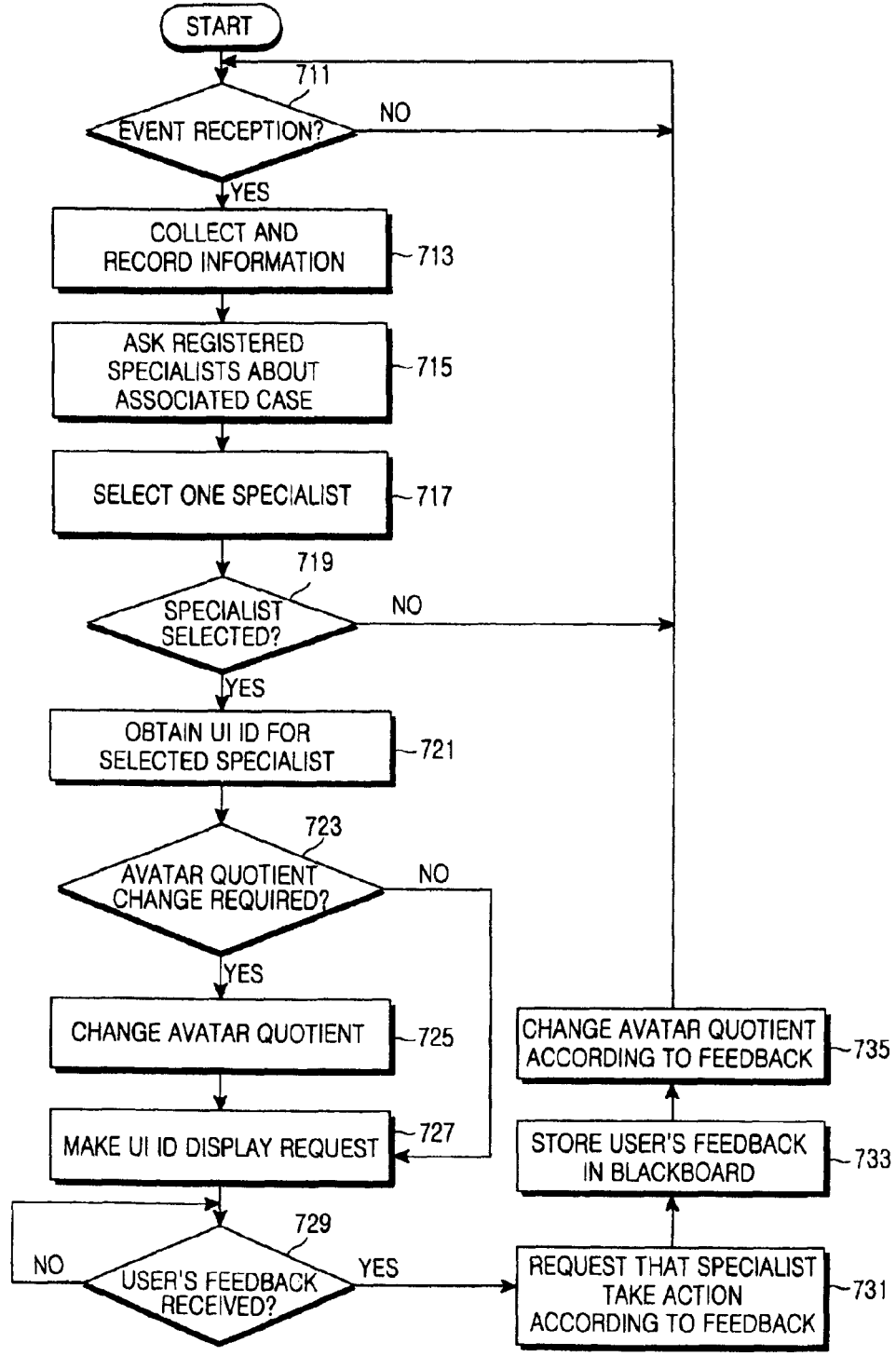
FIG. 18 is a flowchart illustrating a procedure for controlling the agent according to an event in FIG. 11.
Figure 19:
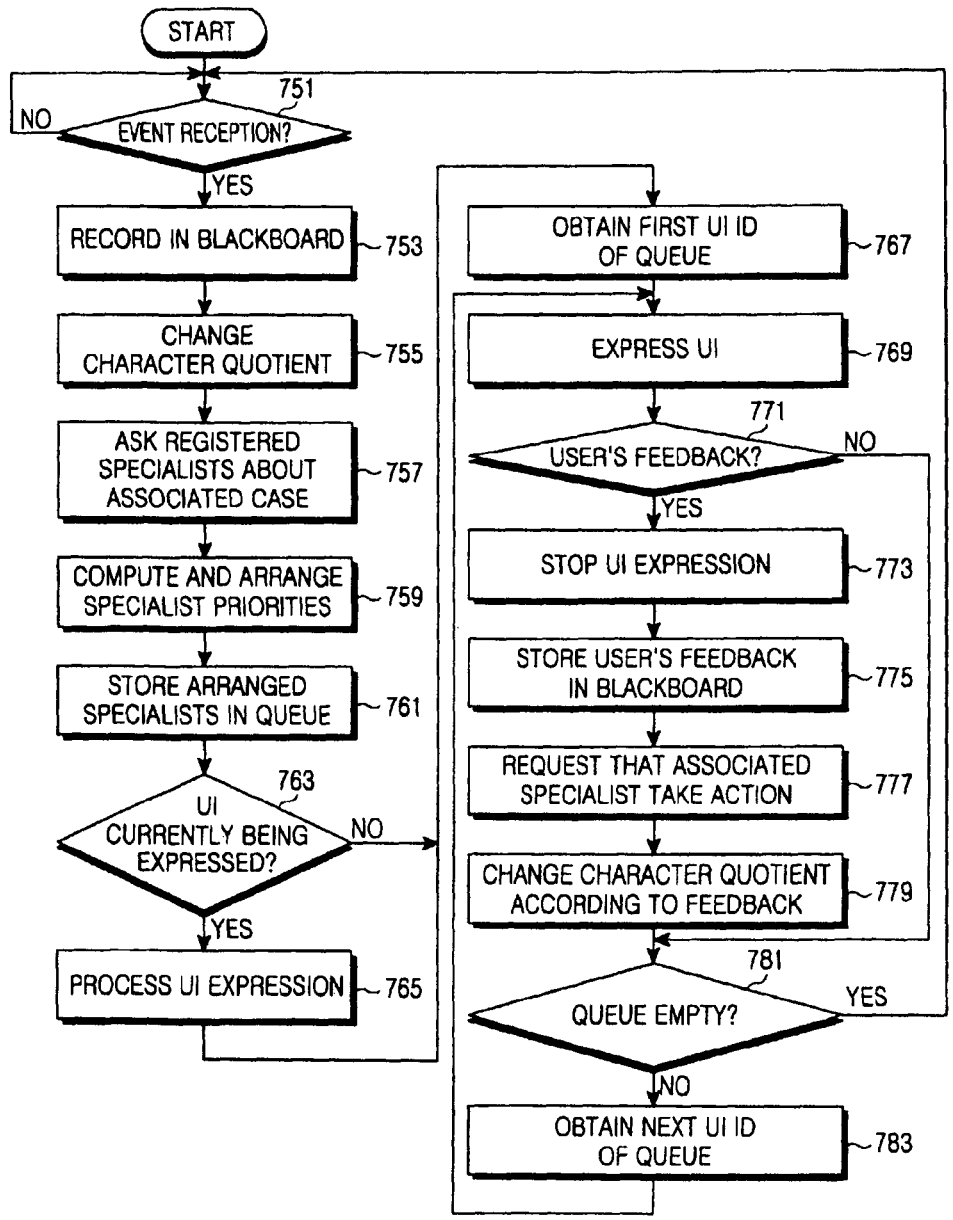
FIG. 19 is a flowchart illustrating another procedure for controlling the agent according to an event in FIG. 11.

FIGS. 18 and 19 are flowcharts illustrating an agent control procedure according to an event message delivered from the agent controller 13 of the agent system. Here, FIG. 18 illustrates the procedure for identifying specialists expressing character UIs for an occurred event when the event occurs, selecting a specialist with the highest designated priority and user preference from the specialists, and expressing a UI ID of the selected specialist. Also, FIG. 19 illustrates the procedure for identifying specialists expressing character UIs for an occurred event when the event occurs, identifying designated priorities and user preferences for the specialists, setting and arranging UI expression priorities in order of specialists with high UI expression priorities and user preferences, and expressing UI IDs of associated specialists according to the arranged UI expression priorities.

First, referring to FIG. 18, the agent controller 130 waits an event message to be received in step 711. When the event message is received, necessary information according to the received event is collected and stored in the blackboard 330. At this time, the event information stored in the blackboard 330 can have the format of Table 1. After the event information is stored in the blackboard 330, the agent controller 130 identifies specialists registered in an event-by-event specialist list associated with the occurred event and asks the identified specialists about the presence of an associated case in step 715. That is, the agent controller 130 selects specialists for processing the occurred event, and asks the selected specialists about an associated case for the occurred event among use cases as shown in Table 4. When at least two specialists are present for the occurred event case, the agent controller 130 allows the supervisor 350 to select the most suitable specialist from the specialists associated with the event. When selecting a specialist mapped to the occurred event, the supervisor 350 analyzes content of the blackboard, a designated priority, and a user preference and selects the specialist in step 717. When the supervisor 350 selects one specialist, the agent controller 130 detects the selected specialist in step 719 and then obtains an avatar UI ID of the selected specialist in step 721.

In this process, associated specialists can suitably change an avatar quotient. The avatar quotient is preset which is mapped to each event. When the avatar quotient mapped to each event must be changed, an associated specialist changes the avatar quotient through the avatar quotient memory 340.

Then, the agent controller 130 delivers an avatar UI ID obtained from the selected specialist to the agent UI expression part 140 and then waits the user feedback information to be received in step 721. Then, the agent UI expression part 140 operates a UI mapped to the avatar UI ID and performs avatar agent expression according to the occurred event. At this time, the UI is provided with an avatar according to avatar growth mode of each event and a step in the growth mode and avatar information set for the avatar quotient. This avatar information is displayed on the display unit 27. The avatar information displayed on the display unit 27 may be an image and text for the avatar UI. Then, the user can make a response while viewing the image and text based on the avatar UI displayed on the display unit 27. Response information of the user is user feedback information. The agent UI expression part 140 delivers the user feedback information to the agent controller 130.

When the user feedback information is received from the agent UI expression part 140, the agent controller 130 delivers the user feedback information to an associated specialist and requests that the specialist perform an operation according to the user feedback information. The associated specialist can suitably change an avatar quotient according to the feedback information. The agent controller 130 stores the user feedback information in the blackboard 330 in step 733. Then, the event control procedure proceeds to step 711.

Second, referring to FIG. 19, the agent controller 130 waits an event message to be received in step 751. When the event message is received, necessary information according to the received event is collected and stored in the blackboard 330 in step 753. At this time, the event information stored in the blackboard 330 can have the format of Table 1. After the event information is stored in the blackboard 330, the agent controller 130 identifies a character quotient of the occurred event and then changes the character quotient stored in the avatar quotient memory 340 in step 755. Then, the agent controller 130 asks specialists, registered in an event-by-event specialist list of the specialist manager 310, about an associated case for the occurred event in step 757. Then, the agent controller 130 computes UI expression priorities of specialist candidates for character UI expression according to a result of the asking through the supervisor 350, arranges suitable specialist candidates while considering UI expression priorities according to a result of the computation, excludes unsuitable specialist candidates, and stores and queues the specialists for performing the character UI expression in the priority queue as illustrated in FIG. 9 in step 761. The principle and method for setting a UI expression priority of the specialist in the supervisor 350 has been described above.

Then, the agent controller 130 determines if a character UI currently being displayed on the display unit 27 is present in step 763. If the character UI is currently being displayed, processing can be made according to a priority of a specialist stored in the priority queue. As described above, the character UI expression of a specialist with UI Expression Priority 0 is immediately performed regardless of the current display state. The specialists of UI Expression Priorities 1 and 2 wait for character expression while the character expression of a different specialist is performed. When the specialist of UI Expression Priority 0 is present among the specialists stored in the priority queue, the agent controller 130 stops the current character UI expression in step 765. However, when the specialist of UI Expression Priority 0 is not present among the specialists stored in the priority queue, the agent controller 130 can wait until the current character UI expression is completed in step 765. When a new event occurs and specialists for performing character expression are set, the agent controller 130 can stop the character UI expression currently being displayed and express character UIs of the specialists set by the event. In this case, the agent controller 130 can stop the current character UI expression in step 765.

When a character UI currently being expressed is absent in step 763 or after step 765 is performed, the agent controller 130 accesses a UI ID of a specialist with the highest UI expression priority among the specialists stored in the priority queue in step 767 and performs a control operation such that a character UI of an associated specialist is expressed through the agent UI expression part 140 in step 769. The specialist having expressed the character UI is removed from the queue. Then, a character UI of an associated specialist is displayed on the display unit 27. At this time, the displayed character UI may and may not require the user's feedback. When the user issues a feedback command in a state in which the character UI requiring the user's feedback is expressed, the agent UI expression part 140 delivers the feedback command to the agent controller 130. The agent controller 130 detects the feedback command in step 771, controls the character UI currently being expressed to be stopped in step 773, stores user feedback information in the blackboard 330 in step 775, and requests that the specialist expressing the character UI act according to a result of the user feedback in step 777. At this time, the specialist is provided with a UI ID for taking action according to the result of the user's feedback (i.e., the result of the positive or negative feedback). The agent controller 130 delivers the UI ID mapped to the action of the specialist to the agent UI expression part 140 and performs a control operation such that a character UI is expressed. The agent controller 130 identifies a character quotient according to the feedback result, and performs a control operation such that an associated character quotient is updated in the avatar quotient memory 340 in step 779.

However, if the UI does not require the user feedback or the user feedback is not received within the set time in step 771, or after step 779 is performed, the agent controller 130 determines if specialists waiting in the priority queue are present in step 781. If the specialists waiting in the priority queue are present, the agent controller 130 accesses a UI ID of a specialist with the next UI expression priority among the specialists waiting in the queue in step 783 and then proceeds to step 769 to express a character UI according to the above-described procedure. As described above, the specialist having expressed the character UI is removed from the priority queue.

When the above-described operation is repeated, character UIs of the specialists waiting in the priority queue can be sequentially expressed according to UI expression priorities. When character UI expressions of all the specialists waiting in the priority queue are completed, the agent controller 130 detects the expression completion, stops the procedure for controlling the character UI expression operation, and waits the next event to be received in step 781.

When an event occurs as described above, the agent controller 130 asks the specialists, registered in a list of event-by-event specialists, about the expression possibility of a character UI, and can perform a process in two methods when at least specialists can express character UIs. That is, one specialist capable of expressing the most suitable character UI is selected from many specialists through the supervisor 350 as illustrated in FIG. 18, such that the character UI can be expressed. Alternatively, as illustrated in FIG. 19, multiple specialists capable of expressing characters through the supervisor 350 are selected, character UI expression priorities of the selected specialists are set, and character UIs can be sequentially expressed according to the UI expression priorities. When the character UI is expressed, a character quotient mapped to the occurred event is changed. When the specialist expresses a user feedback UI, a character quotient is changed according to the user's feedback. Here, the character quotient can be used for character growth and/or state expression.

The above-described agent system uses a timer in a method for operating a specialist. That is, types of occurred events are an event in which an avatar UI must be immediately expressed and an event in which an avatar UI must be expressed at a specific time. For example, when an event associated with a call, a message and so on occurs and an avatar UI is expressed, the selected specialist is operated at an event occurrence time. However, when an event must be operated at a specific time as in an alarm event and so on, the specialist must be operated at the specific time. The specialist to be operated at a specific time requests that the specialist manager 310 wake it up at the specific time. When the specific time is reached, the specialist manager 310 operates an associated specialist. At this time, the agent controller 130 uses the single timer processor 370 to reduce the system load. The specialist manager 310 stores a request for what is a sequence number of a specialist to be woke up at a time (year, month, hour, minute, second, etc.) in the blackboard 330, and performs a setup operation only for the earliest request of stored requests in the timer processor 370. When the set time is reached, an associated event is processed. After an associated request is deleted from the blackboard 330, a time for the next earliest request is set in the timer processor 370. The specialist synthetically considers the blackboard 330 and many situations even when a time is reached, determines whether to operate, and notifies the specialist manager 310 of a result of the determination. When an associated specialist determines to operate, it performs the remaining processes like specialists for other events (i.e., specialists operating at an event occurrence time). When a time set in the timer processor 370 is deleted or changed, the specialists are responsible for these operations. That is, when a function of the timer processor 370 is unnecessary in state in which the function is reserved to process an event, an associated specialist must perform an operation for deleting or changing a reservation time to use the timer processor 370.

Table 5 shows concrete cases in accordance with an embodiment of the present invention. Table 5 shows event use cases, case classification, event determination times, action (processing) times of specialists, the number of occurrences, times, event parameters (necessary information), conditions, UI text, user options, and so on. Other cases can be added to the above cases or some cases can be deleted.

When an agent alarm service is performed, it can be divided into various types according to a use case of an event. As shown in the class item of Table 5, a message, mail, digital broadcasting, GPS, camera multimedia, system, avatar, schedule, call, call/message event, To Do, and application events can be classified and provided. The use cases as shown in Table 5 are referred to according to characteristics of the events and four types of use cases can be classified and provided. Now, the four types of the use cases will be described. An operation for processing an event message according to the event classification of Table 5 will be described in more detail. The types will be described on the basis of Case IDs 1 to 50, and a description of other types is omitted.

First, Case IDs 1 to 50 of Table 5 classified according to the four types, i.e., A to D types, will be described.

First, A-type cases are of Case IDs 12, 14, 46, 47, 25, 11, 13, 29 and 30 in Table 5. A procedure for processing the A-type cases will be described. First, when an event occurs, an associated detector of the event collector 110 detects the occurred event and the event collector 110 generates an event message mapped to the occurred event and sends the generated event message to the event delivery server 120. Then, the specialist manager 310 of the event controller 130 stores the event message in the blackboard 330, refers to a specialist list mapped to the event, and delivers the event to associated specialists. Then, the specialists check an associated condition. Then, if the condition is satisfied, the specialists sends a timer setup request to the specialist manager 310.

When a timer event occurs after the above-described operation is performed, the agent controller 130 calls a specialist ID for the timer event and therefore the specialist re-checks the condition. When the condition is not satisfied, the operation ends. When the condition is satisfied, the agent controller 130 sends the ID to the supervisor 350 and performs a control operation such that agent event expression can be performed.

Second, B-type cases are of Case IDs 15, 16, 50, 17, 18, 31, 32, 35, 36, 37, 2, 3, 9, 4, 5, 6, 38, and 41 in Table 5. A procedure for processing the B-type cases will be described. First, when an event occurs, an associated detector of the event collector 110 detects the occurred event and the event collector 110 generates an event message mapped to the occurred event and sends the generated event message to the event delivery server 120. Then, the specialist manager 310 of the event controller 130 stores the event message in the blackboard 330, refers to a specialist list mapped to the event, and delivers the event to associated specialists. Then, the specialists check an associated condition. If the condition is not satisfied, the specialists end the operation without making any response or with returning NO. If the condition is satisfied, the specialists make a response or return YES.

After the above-described operation is performed, specialists for performing character UI expression are selected through competition (based on a designated priority, and a blackboard avatar state (or a user preference)) between the specialists making a response (or returning YES), such that UIs of the selected specialists are expressed. Here, the specialists for expressing the character UIs can be selected using the above-described two methods. That is, the supervisor 350 of the agent controller 130 analyzes the specialists making the response and selects a specialist that has the highest relation to the occurred event as illustrated in FIG. 18. The specialist manager 310 obtains a UI ID of the specialist selected by the supervisor 350 and outputs the obtained UI ID to the agent UI expression part 140. As illustrated in FIG. 19, the supervisor 350 analyzes designated priorities and user preferences for the specialists making the response, sets and arranges UI expression priorities of the specialists according to a result of the analysis, sequentially obtains UI IDs of associated specialists according to the arranged UI expression priorities, and outputs the obtained UI IDs to the agent UI expression part 140. Then, the agent UI expression part 140 selects a UI mapped to a UI ID and displays an avatar UI.

Third, C-type cases are of Case IDs 1, 42, 43, 48, 50, 7, 8, 10, 33, 34, 44, 45, 21, 27, 28, 49, 39, and 40 in Table 5. The C-type specialist ID repeats every N days. Here, Case IDs 1, 42, 43, 48, 50, 7, 8, 10, 33, 34, 44, and 45 require a condition, while Case IDs 21, 27, 28, 49, 39 and 40 do require a condition.

Accordingly, when a preset timer event occurs after N days are elapsed, the agent controller 130 calls a specialist of an alarm event mapped to each event ID. An associated specialist determines if a condition is satisfied. If the condition is satisfied, a specialist UI is delivered to the agent UI expression part 140, such that agent event expression is performed. However, if the condition is not satisfied, the operation ends.

Fourth, D-type cases are of Case IDs 19, 20, 23, 24, and 26 in Table 5. When a holiday is first added, an anniversary is added to a calendar, or a meeting schedule is registered, a timer is set. The timer registration for a holiday and an anniversary may occur before one week and before one day. In case of the meeting, a timer can be set for meeting schedule start and end times, etc.

When a D-type case occurs, the agent controller 130 calls a specialist of the timer event mapped to each case ID. An associated specialist checks a condition (or a time set for a holiday, anniversary, and meeting). If the condition is not satisfied, the operation ends. However, if the condition is satisfied, the agent controller 130 delivers a UI of an associated specialist to the agent UI expression part 140 and performs a control operation such that agent event expression can be performed.

In accordance with the above-described embodiment of the present invention, events are classified on a use case-by-use case basis and a timer is registered. When the timer occurs, a specialist mapped to an associated timer is operated. In an embodiment of the present invention, the first type (A type) is the type for processing events not requiring the user feedback. When an alarm event is set for event occurrence in a specific state of the wireless terminal and an associated state occurs, an event is processed in an avatar agent alarm. Second, the second type (B type) is the type for processing events requiring the user feedback. When an event occurs, specialists satisfying the condition among specialists associated with the event make a response. A specialist of the highest priority is selected from the specialists making the response, and an avatar UI of the selected specialist is expressed. Third, the third type (C type) is associated with events repeating in a predetermined period. Set alarm information is identified and avatar agent expression is performed on a set day. Fourth, the fourth type (D type) is associated with alarm events according to a schedule set by the user. When a set date or time is reached, an avatar agent is expressed.

Second, an operation according to the type of Table 5 will be concretely described. Here, mail, system, schedule, call, call/message, and application events will be concretely described. In the following description, FIGS. 20 to 25 illustrate procedures for processing occurred events according to use cases in an embodiment of the present invention. FIGS. 26A to 32 illustrate examples of displaying character UIs according to a set UI ID while processing the procedures of FIGS. 20 to 25. In the following description, an example in which a specialist with the highest UI expression priority is selected from the specialists associated with each event in the supervisor 350 of the agent controller 130 and character UI expression is performed will be described. When multiple specialists perform the character UI expression according to an event as illustrated in FIG. 19, the supervisor 350 sets UI expression priorities of the specialists for expressing character UIs, waits after arranging the specialists according to the set UI expression priorities, and sequentially identifies UI IDs of the specialists according to the UI expression priorities, and allows a character UI to be displayed.

Figure 20:
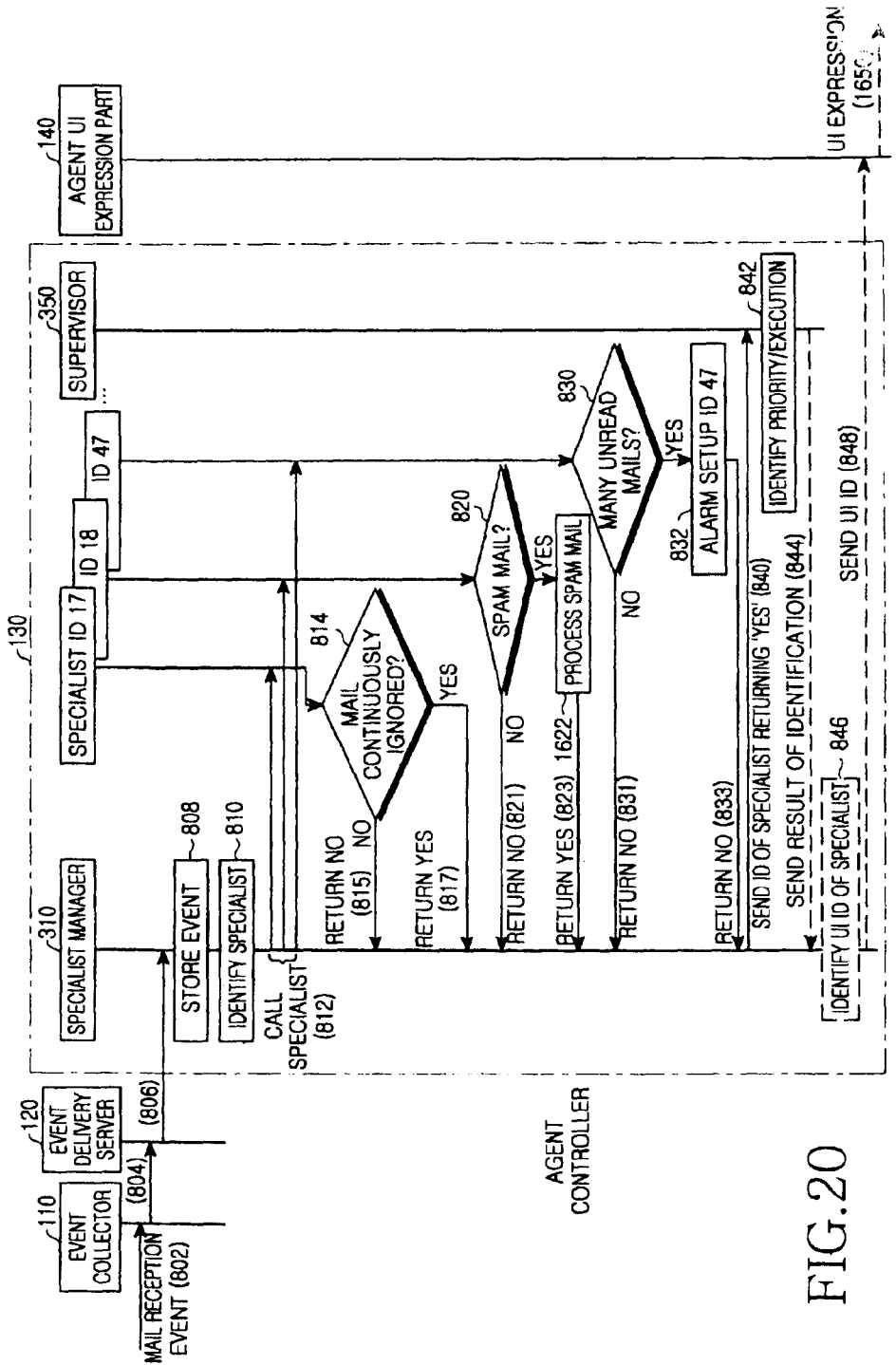
FIG. 20 illustrates a procedure for processing an e-mail related event in the wireless terminal in accordance with an embodiment of the present invention.

Processing order when the e-mail event occurs will be described. FIG. 20 illustrates a procedure for processing an e-mail reception event.

Referring to FIG. 20, the event collector 110 collects an e-mail reception event if the event occurs at the time of receiving e-mail in step 802 and provides the collected event to the event delivery server 120 in step 804. The event delivery server 120 delivers the event to the specialist manager 310 of the agent controller 130 in step 806. Then, the specialist manager 310 stores the received e-mail reception event in the blackboard 330 in step 808, identifies specialists to be called from a list of event-by-event specialists of the specialist manager 310 in step 810, and calls specialists associated with the e-mail reception event in step 812. As shown in Table 5, specialists associated with an e-mail event are of IDs 17, 18, and 47 to process the event. In FIG. 20, it is assumed that the specialists of IDs 17, 18, and 47 are called.

Among the called specialists, a use case of ID 17 is associated with an event of a case capable of being ignored or deleted when a received e-mail is not read. Accordingly, the specialist of ID 17 determines if the received e-mail has been continuously ignored in step 814. The determination as to whether the received e-mail has been continuously ignored is made by comparing the name, address, title, or e-mail content of an e-mail sender with associated items of a previously stored received e-mail. When an identical item is present, the received e-mail is regarded as the e-mail capable of being ignored or deleted. When an identical e-mail has been successively ignored or deleted a user set number of times or more (e.g., three or more times), it is regarded that an associated e-mail has been continuously ignored. When the associated e-mail has not been continuously ignored as a result of the determination, the specialist (of ID 17) proceeds to step 815 to return 'NO' to the specialist manager 310. On the other hand, when the associated e-mail has been continuously ignored, the specialist of D17 proceeds to step 816 to return 'YES' to the specialist manager 310.

Among the called specialists, the specialist of ID 18 determines if a received e-mail is a spam mail in step 820. A criterion of the determination as to whether the received e-mail is the spam depends on a conventional spam mail designation method. When the sender name, address, title or e-mail content of a received e-mail among received e-mails is equal to that of an e-mail classified as the spam mail according to a setup operation of the user, the received e-mail can be regarded as the spam mail. When a specific sentence or word set by the user to detect the spam mail is contained in the sender name, address, title, or e-mail content of a received e-mail, the received e-mail can be regarded as the spam mail. When the received e-mail is not the spam mail in the above-described method, the specialist of ID 18 proceeds to step 821 to return 'NO' to the specialist manager 310. On the other hand, when the associated e-mail is the spam mail, the specialist of D18 proceeds to step 822 to classify the associated e-mail as the spam mail and then proceeds to step 823 to return 'YES' to the specialist manager 310.

Among the called specialists, the specialist of ID 47 determines if the number of unread e-mails of an inbox is equal to or more than a preset reference value and determines if there are many unread e-mails in step 830. If there are not many unread e-mails as a result of the determination, the specialist of ID 47 proceeds to step 831 to return 'NO' to the specialist manager 310. On the other hand, if there are many unread e-mails, the specialist of ID 47 proceeds to step 832 to set a suitable alarm (of Alarm ID 47 for convenience) and then proceeds to step 833 to return 'NO' to the specialist manager 310.

When the called specialists (e.g., the specialists of IDs 17, 18, and 47) make the return, the specialist manager 310 provides the supervisor 350 with specialist IDs returning 'YES' (e.g., Specialist IDs 17 and 18 of FIG. 20) in step 840. Then, the supervisor 350 identifies UI expression priorities of associated specialists (e.g., specialists of IDs 17 and 18) or identifies the execution of an associated specialist to set the specialist of the highest UI expression priority when the number of specialists returning 'YES' is one in step 842. In step 844, the supervisor 350 sends, to the specialist manager 310, a result of the identification for the highest priority specialist or the execution of the associated specialist. Then, the specialist manager 310 identifies a preset UI ID according to each ID of the highest priority specialist or the specialist to be executed in step 846 and sends the identified UI ID to the agent UI expression part 140 in step 848. In step 850, the agent UI expression part 140 expresses an associated UI on the display unit 27 and reproduces an associated audio signal through the audio processor 29 if needed.

The UI expression of the agent UI expression part 140 displays text mapped to an associated UI ID as shown in text examples of Table 5 as well as an avatar image mapped to a UI ID of the set specialist. For example, when the UI expression mapped to the specialist of ID 17 is made, content asking if a received e-mail previously ignored must be again ignored can be included. When the UI expression mapped to the specialist of ID 18 is made, content asking if a received spam mail must be deleted can be included. Then, when the user identifies the UI image and text displayed on the display unit 27 and makes a response (e.g., YES or NO), the agent UI expression part 140 provides user feedback information to the agent controller 130. The agent controller 130 operates the specialist of an associated ID according to the user feedback information and delivers a UI ID to the agent UI expression part 140 such that a UI can be expressed according to the user feedback information. Accordingly, the agent UI expression part 140 displays the UI image and text based on the user's feedback on the display unit 27.

Figure 26A:
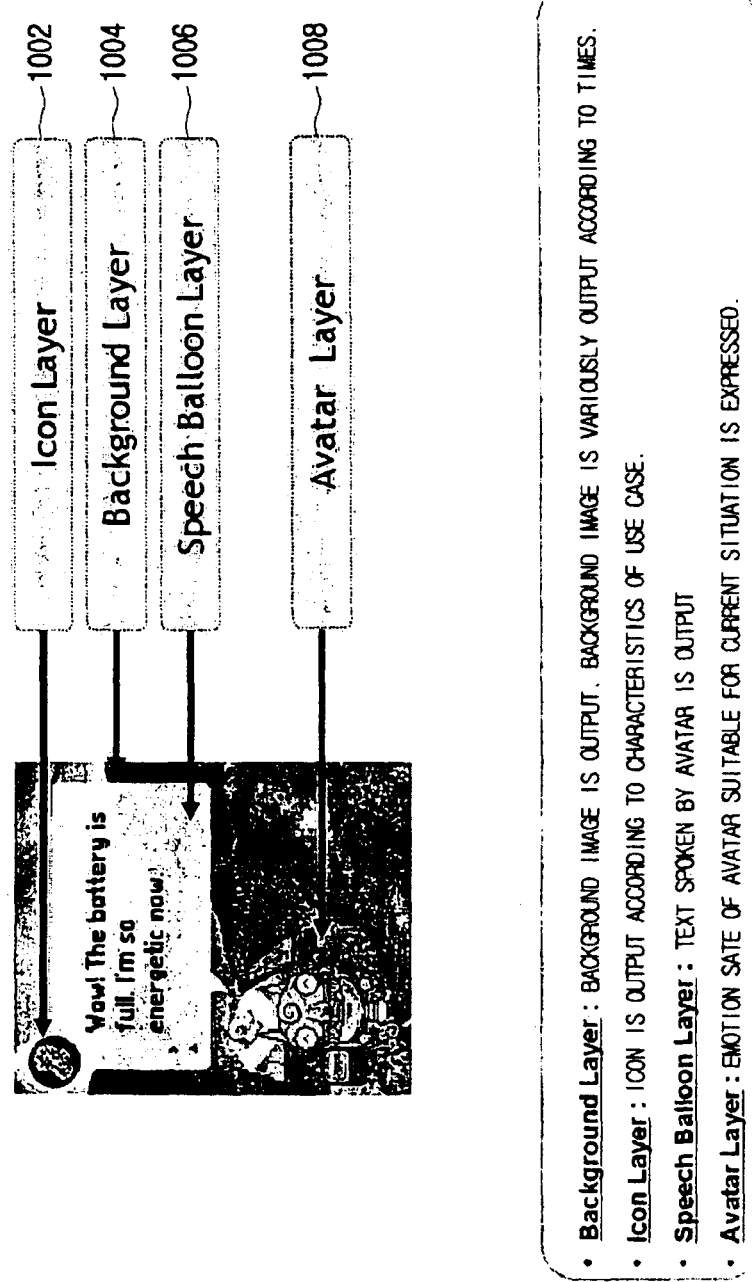
FIGS. 26A and 26B illustrate an example of displaying user interface (UI) data in the wireless terminal in accordance with an embodiment of the present invention.
Figure 26B:
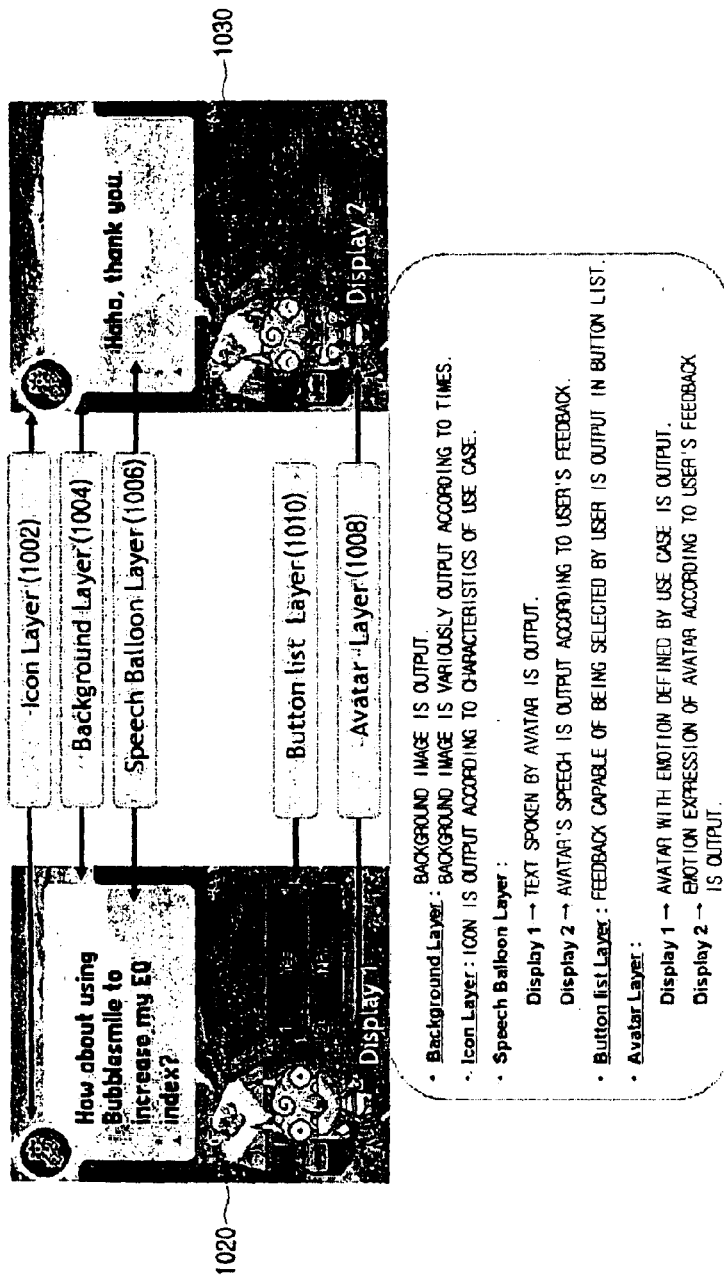

FIGS. 26A and 26B illustrate examples of displaying a UI on the display unit 27 in accordance with an embodiment of the present invention. FIG. 26A illustrates an example of displaying a UI without the user's feedback among the use cases as shown in Table 5. FIG. 26B illustrates an example of displaying feedback expression according to the user's feedback among the use cases as shown in Table 5.

Referring to FIG. 26A, an icon layer 1002 is a layer for displaying an icon according to a type of a use case and displays content of 'Type' of Table 5 in the form of an icon. A background layer 1004 is a layer for displaying a background image. The background image can be variously output according to times (e.g., morning, afternoon, evening, night, and so on). A speech balloon layer 1006 displays text spoken by an avatar, and can be used as a layer for displaying UI text of Table 5. An avatar layer 1008 is a layer for displaying an avatar image suitable for the current situation, and can express an emotion state according to a type of a use case.

FIG. 26B expresses a use case of an occurred event and includes a first screen 1020 for waiting the user to make a feedback and a second screen 1030 serving as a reaction screen of an avatar according to the user's feedback. The icon layer 1002 of the screens 1020 and 1030 expresses an icon according to characteristics of a use case as described above. The background layer 1004 of the first and second screens 1020 and 1030 outputs a background image as described above. The background image can be variously output according to time. A button list layer 1010 of the first screen 1020 is a layer for displaying a button list for a feedback function capable of being selected by the user. The second screen 1030 is set according to a button selected by the user from the button list displayed on the button list layer 1010. The speech balloon layer 1006 of the first screen 1020 displays text spoken by an avatar according to a use case of an occurred event, and the speech balloon layer 1006 of the second screen 1030 displays text spoken by an avatar according to the user's feedback. The avatar layer 1008 of the first screen 1020 displays an avatar with an emotion defined by each use case, and the avatar layer 1008 of the second screen 1030 displays an emotion expression state according to the user's feedback.

Figure 27A:
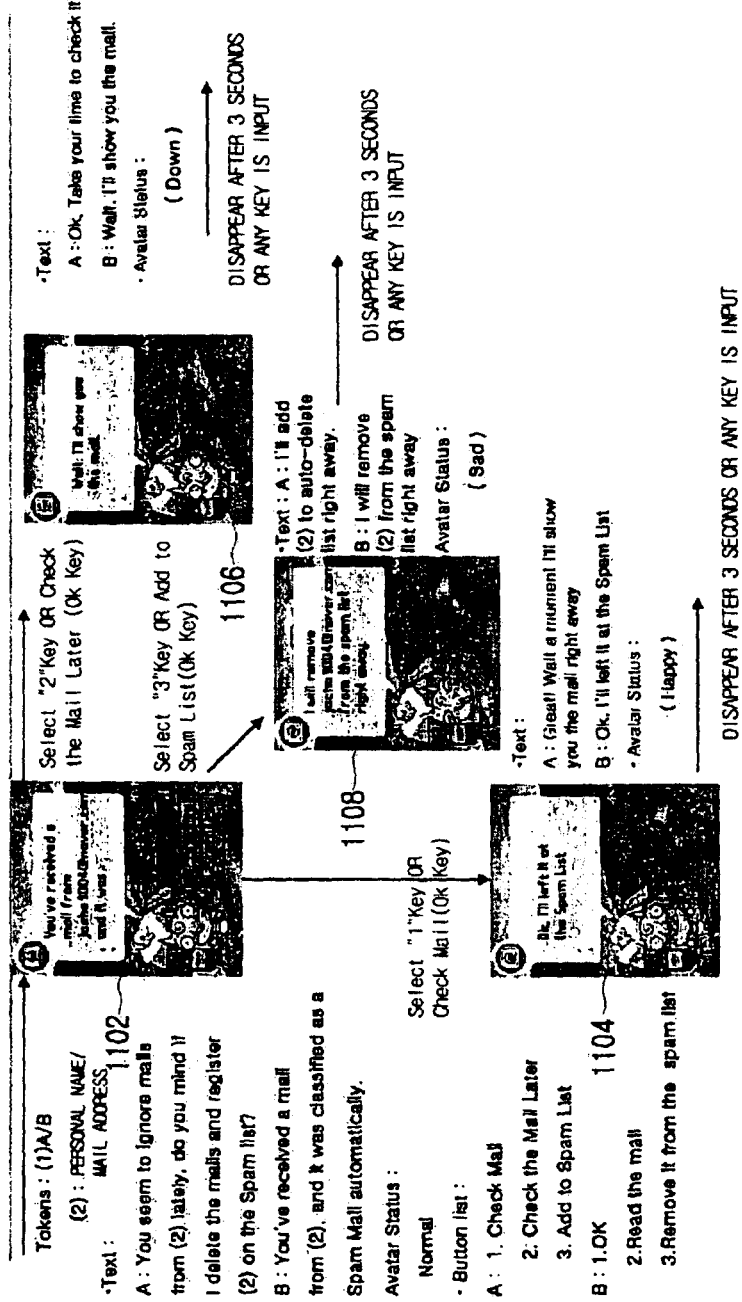
FIGS. 27A, 27B and 27C illustrate an example of displaying UI data based on an e-mail related event in the wireless terminal in accordance with an embodiment of the present invention.
Figure 27B:
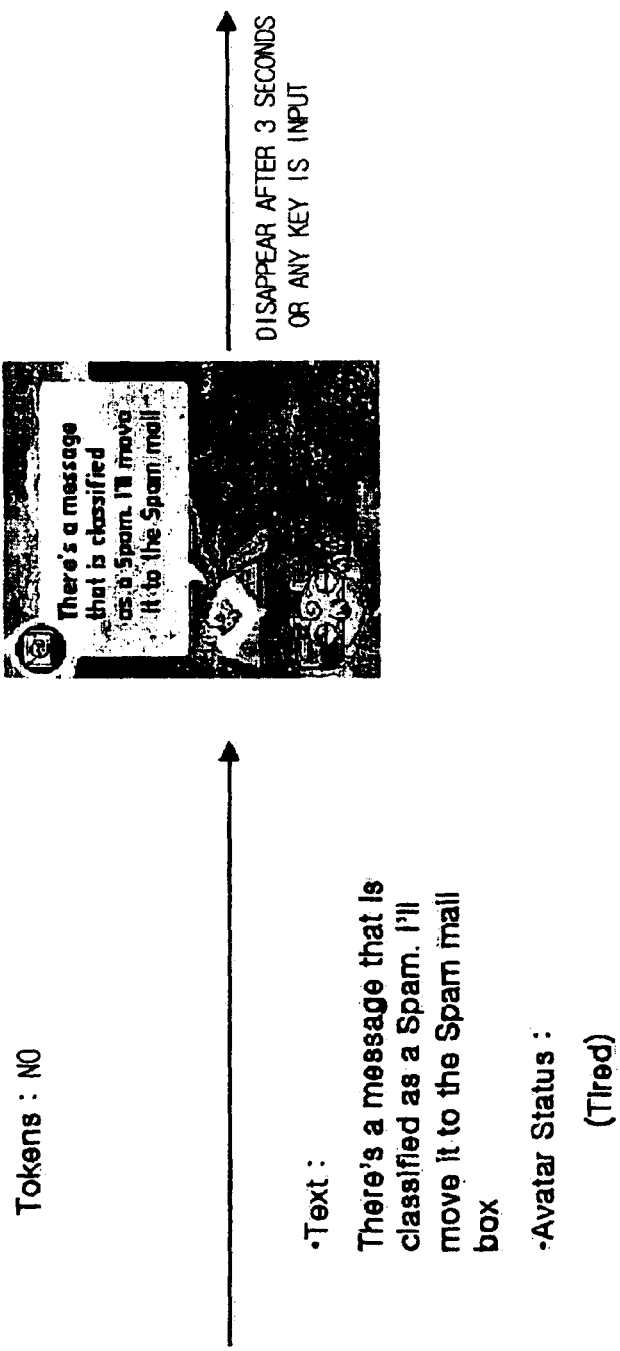

Data displayed on the icon layer 1002 and the background layer 1004 in the example of the first and second screens 1020 and 1030 of FIG. 27B is the same as that of FIG. 27A. The speech balloon layer 1006 outputs text data for a recommendation in the first screen 1020. When the text data is displayed on the speech balloon layer 1006, a parameter (or token) is analyzed, such that text is completed. The speech balloon layer 1006 of the second screen 1030 outputs avatar answer text according to the user's feedback and differently makes an expression according to the user's feedback. The avatar layer 1008 can express avatar animation with an emotion defined by each ID of a use case (or a set specialist UI ID) in the first screen 1020. The avatar layer 1008 displays avatar animation for expressing an emotion according to the user's feedback in the second screen 1030. Here, emotion expressions are Cheer, Happy, Down, Sad, Angry, etc. The button layer 1010 displays the button list for receiving the user's feedback according to each specialist UI ID, and can use a number shortcut button, and so on.

Figure 27C:
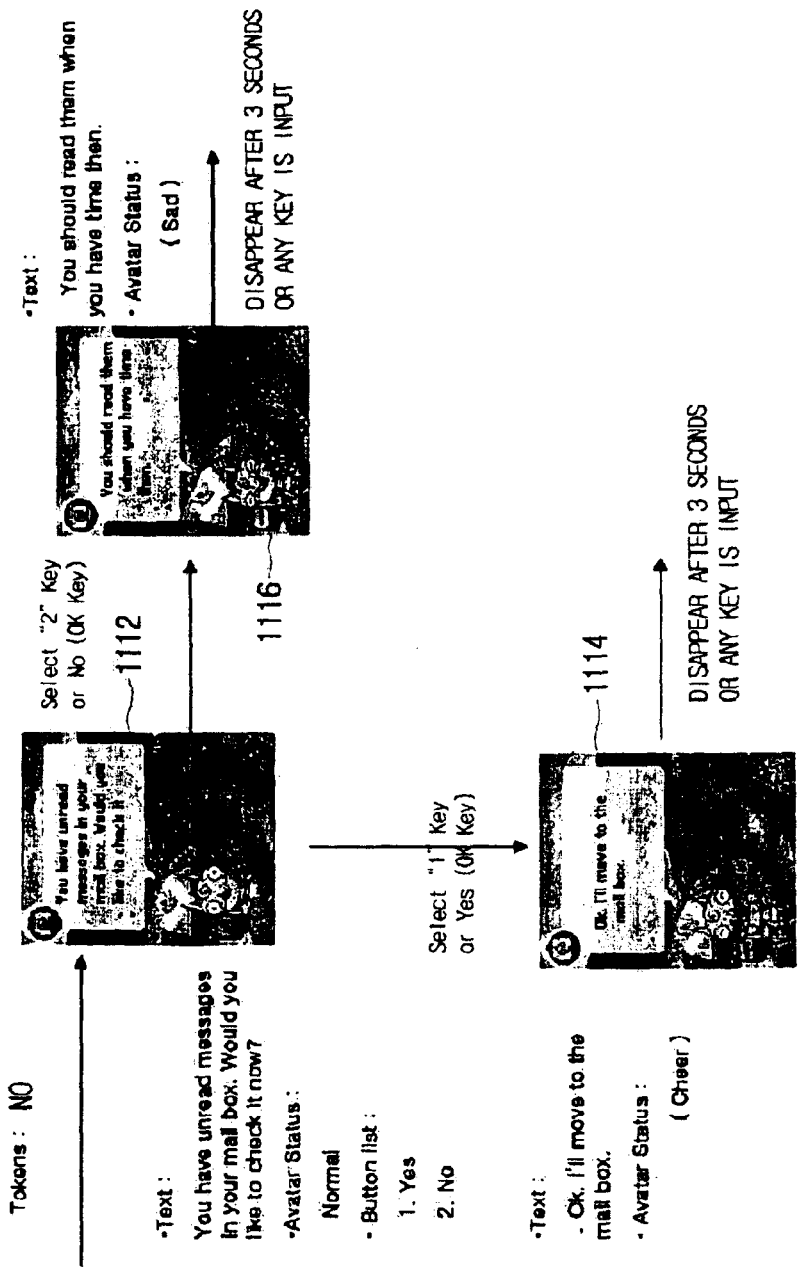

FIGS. 27A to 27C illustrate procedures for displaying a set UI on the display unit 27 when an e-mail event is processed in the process of FIG. 20.

FIG. 27A illustrates a use case when the specialist manager 310 of the agent controller 130 sets a specialist of ID 17. Referring to FIG. 27A, the specialist manager 310 sends UI ID 17 to the agent UI expression part 140 in step 848 when the specialist of ID 17 is set in step 846. Then, the agent UI expression part 140 displays an avatar image of UI ID 17 on the display unit 27 as indicated by reference numeral 1102. Here, ID 17 is associated with an event for making a recommendation for registering a received mail in a spam mail list when the received e-mail is not continuously checked, and requires user feedback information. Accordingly, the agent UI expression part 140 identifies UI information of UI ID 17, and displays a screen as indicated by reference numeral 1102 of FIG. 27A. The screen as indicated by reference numeral 1102 of FIG. 27A may be the first screen 1020 of FIG. 26B.

In case of UI ID 17, parameters (or tokens) are "(1)" and "(2) as illustrated in FIG. 27A. The parameter "(1)" is configured by A/B, and the parameter "(2)" is configured by Personal Name/Mail Address. Accordingly, A/B text of the parameter "(1)" includes A and B. In case of A, the avatar status is normal and the button list includes "1. Check mail, 2. Check the mail later, and 3. Add to spam list". In case of B, the button list includes "1. OK, 2. Read the mail, and 3. Remove it from the spam list". When A of the parameter "(1)" is selected, the first screen is displayed as indicated by reference numeral 1102. The speech balloon layer displays the text B "You've received a mail from a mail address, and it was classified as a Spam Mail automatically", and the button layer displays "1. OK, 2. Read the mail, and 3. Remove it from the spam list". The avatar emotion status is expressed as a normal emotion.

In a state in which the first screen as indicated by reference numeral 1102 is displayed, the user can generate feedback information. Here, the user feedback information can be selected by pressing a desired item of the button layer or pressing a shortcut key. When "OK" of the button layer or the shortcut key "1" is selected, the agent UI expression part 140 displays the screen as indicated by reference numeral 1104, and delivers a result of the feedback to the agent controller 130. Then, the agent controller 130 requests that the specialist of D 17 take action according to a result of the feedback, and stores the feedback result in the blackboard 330 such that it can be referred to in the next event occurrence. The agent controller 130 changes an avatar quotient according to the feedback result and stores the changed avatar quotient in the avatar quotient memory 340.

FIG. 27B illustrates a use case when the special manager 310 of the agent controller 130 sets a specialist of ID 18. Referring to FIG. 27B, the specialist manager 310 sends UI ID 18 to the agent UI expression part 140 in step 848 when the specialist manager 310 sets the specialist of ID 18 in step 846. Then, the agent UI expression part 140 displays an avatar image on the display unit 27 as illustrated in FIG. 27B. Here, ID 18 is associated with an event when an e-mail classified as a spam mail according to a mail classification criterion is received, and does not require the user feedback information. Accordingly, the agent UI expression part 140 identifies UI ID 18 and displays the screen as illustrated in FIG. 27B. Here, the screen of FIG. 27B may be the screen of FIG. 26A.

In case of UI ID 18, a parameter (or token) as illustrated in FIG. 27B is absent. Accordingly, a screen displayed on the display unit 27 displays a mail icon in the icon layer 1002, displays text indicating that a received e-mail is an e-mail classified as a spam mail in the speech balloon layer 1006, and displays an image indicating an avatar emotion status of Tired in the avatar layer 1008.

FIG. 27C illustrates a use case when the specialist manager 310 of the agent controller 130 sets a specialist of ID 47. Referring to FIG. 27C, the specialist manager 310 sends UI ID 47 to the agent UI expression part 140 in step 848 when setting the specialist of ID 47 in step 846. Then, the agent UI expression part 140 displays an avatar image on the display unit 27 as indicated by reference numeral 1112 of FIG. 27C. Here, ID 48 is associated with an event for recommending that the user arrange or check e-mails when there are many unread (or unopened) e-mails, and requires the user feedback information. Accordingly, the agent UI expression part 140 identifies UI ID 47 and displays the screen as indicated by reference numeral 1112 of FIG. 27C. This may be the first screen of FIG. 26B.

In case of UI ID 48, a parameter (or token) as illustrated in FIG. 27B is absent. Accordingly, the screen displayed on the display unit 27 displays a mail icon in the icon layer 1002 as indicated by reference numeral 1112, displays text for recommending that the user arrange or check unopened mails in the speech balloon layer 1006, and displays a button list in the button layer 1010. According to the user's feedback, a screen as indicated by reference number 1114 or 1116 of FIG. 27C is displayed. A result of the feedback is fed back to the agent controller 130. The agent controller 130 stores the user feedback result in the blackboard 330 and the avatar quotient memory 340.

When a mail related event occurs as described above, the agent controller 130 analyzes a received mail related event, sets a specialist with the highest priority, and delivers a UI ID of the set specialist to the agent UI expression part 140. Then, the agent UI expression part 140 displays information associated with a UI ID of the set specialist on the display unit 27 and waits the user to make a feedback. When the user's feedback is generated, the agent UI expression part 140 feeds back a result of the feedback to the agent controller 130. The agent controller 130 stores the feedback result and simultaneously changes an avatar emotion quotient. The agent UI expression part 140 displays the feedback result on the display unit 27.

Figure 21:
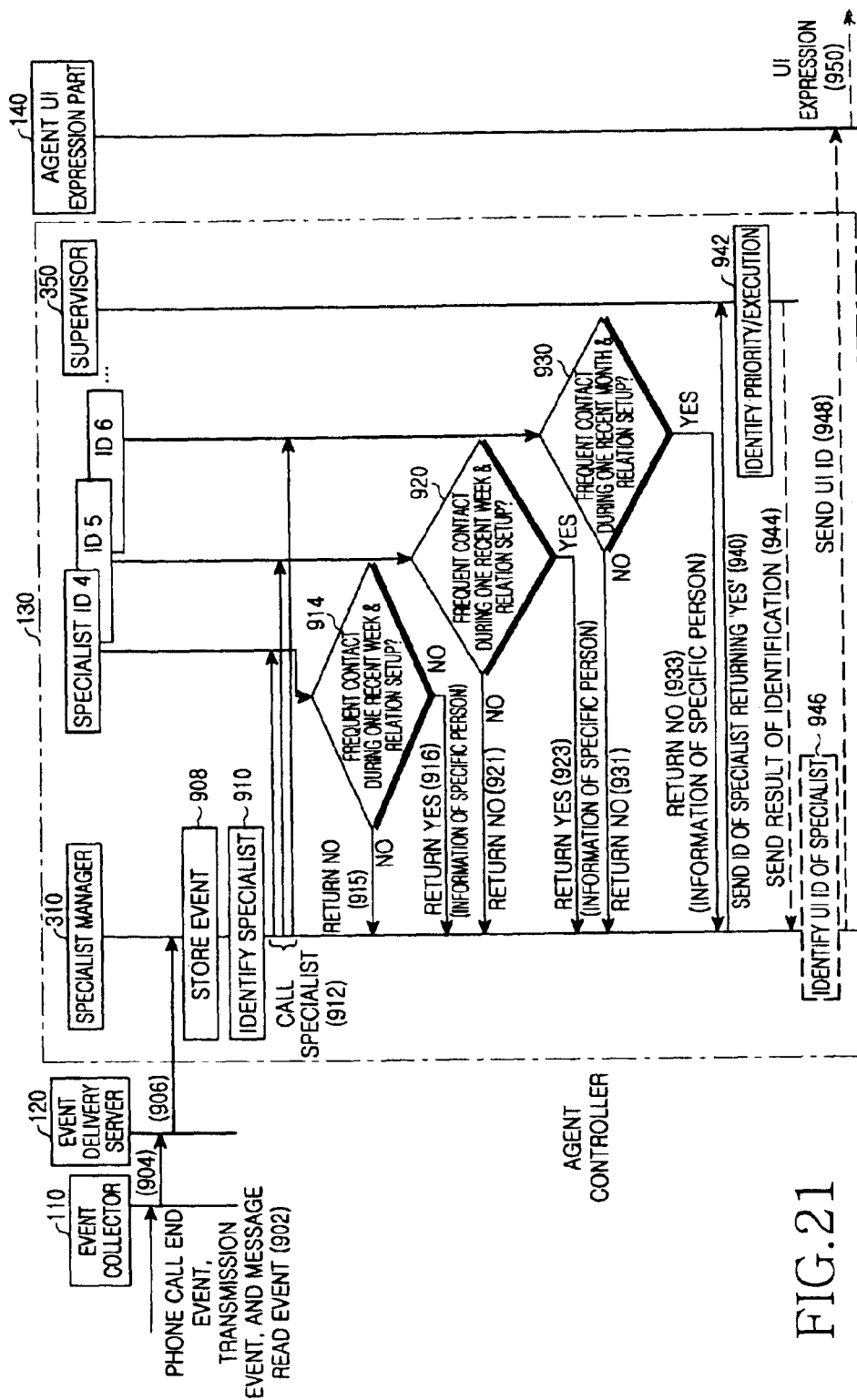
FIG. 21 illustrates a procedure for processing a call/message related event in the wireless terminal in accordance with an embodiment of the present invention.

FIG. 21 illustrates an operation procedure at the time of processing a call/message event in accordance with an embodiment of the present invention. FIG. 21 is a flowchart illustrating a procedure for processing call end, transmission, and message read events among call events.

Referring to FIG. 21, the event collector 110 collects an event when the event occurs in step 902 and provides the collected event to the event delivery server 120. The event delivery server 120 provides the event to the specialist manager 310 of the agent controller 130 in step 906. Then, the specialist manager 310 stores the received event in the blackboard 330 in step 908, identifies specialists to be called according to the event from an internal specialist list in step 910, and calls the identified specialists in step 912. It is assumed that the specialists of IDs 4, 5, and 6 as shown in Table 5 are registered in the internal specialist list of the specialist manager 310 such that they are called when the event occurs.

Among the called specialists, the specialist of ID 4 makes a recommendation for setting a relation to a specific person frequently making contact with the user during several recent days when the relation is not set. The specialist of ID 4 identifies an event stored in the blackboard 330 and identifies a communicator ending a call, a receiver of a sent message, or a sender reading the message. The specialist determines if the user has communicated with a communicator (i.e., a sender/receiver) a preset number of times or more (e.g., five or more times for call or message transmission and reception) during one recent week. The specialist determines if a relation is set to a specific person (i.e., a communicator/sender/receiver) often making contact with the user. If the relation is set as a result of the determination, the specialist of ID 4 proceeds to step 915 to return 'NO' to the specialist manager 310. If the relation is set as a result of the determination, the specialist proceeds to step 916 to return 'YES' to the specialist manager 310. When 'YES' is returned in step 916, the specialist of ID 4 can send information about a specific person of the event to the specialist manager 310.

Among the called specialists, the specialist of ID 5 is a specialist for making the praise if the relation to the specific person is set. The specialist of ID 5 identifies information stored in the blackboard 330 and identifies a communicator ending a call, a receiver of a sent message, or a sender reading the message in step 920. Then, the specialist of ID 5 determines if the user has made contact with a communicator (i.e., a sender/receiver) a preset number of times or more (e.g., five or more times for call or message transmission and reception) during one recent week. The specialist determines if a relation is set to a specific person (i.e., a communicator/sender/receiver) often making contact with the user. If the relation is not set as a result of the determination, the specialist of ID 5 proceeds to step 921 to return 'NO' to the specialist manager 310. If the relation is set as a result of the determination, the specialist proceeds to step 923 to return 'YES' to the specialist manager 310. When 'YES' is returned in step 923, the specialist of ID 5 can send information about a specific person of the event to the specialist manager 310.

Among the called specialists, the specialist of ID 6 is a specialist for making a relation setup recommendation if a relation is not set to a specific person continuously making contact with the user during several recent weeks. The specialist of ID 6 identifies event information stored in the blackboard 330 and identifies a communicator ending a call, a receiver of a sent message, or a sender reading the message in step 930. Then, the specialist of ID 6 determines if the user has continuously made contact with an associated communicator (i.e., a sender/receiver) during one recent month. The determination as to whether continuous contact during one month has been made can be made by determining if the user communicated with the specific person (through a phone call/message exchange) three or four weeks ago and again communicated with the specific person one week ago. The specialist determines if the relation is set to the specific person with whom the user has made continuous contact. If the relation is set as a result of the determination, the specialist proceeds to step 931 to return 'NO' to the specialist manager 310. If the relation is set as a result of the determination, the specialist proceeds to step 933 to return 'YES' to the specialist manager 310. When 'YES' is returned in step 933, the specialist of ID 6 can send information about a specific person of the event to the specialist manager 310.

When the called specialists make the return, the specialist manager 310 provides the supervisor 350 with the ID (e.g., ID 4, 5, or 6 in FIG. 21) of a specialist returning 'YES' in step 940. Then, the supervisor 350 identifies UI expression priorities of associated specialists (e.g., specialists of IDs 17 and 18) or identifies the execution of an associated specialist to set the specialist of the highest UI expression priority when the number of specialists returning 'YES' is one in step 942. In step 944, the supervisor 350 sends, to the specialist manager 310, a result of the identification for the highest priority specialist or the execution of the associated specialist. Then, the specialist manager 310 identifies a preset UI ID according to each ID of the highest priority specialist or the specialist to be executed in step 946 and sends the identified UI ID to the agent UI expression part 140 in step 948. In step 950, the agent UI expression part 140 expresses an associated UI on the display unit 27 and reproduces an associated audio signal through the audio processor 27 if needed.

The UI expression of the agent UI expression part 140 displays text mapped to an associated UI ID as shown in text examples of Table 5 as well as an avatar image mapped to a UI ID of the set specialist.

At this time, the specialist manager 310 sends information about a specific person when sending a UI ID associated with the specialist of ID 4 or 6 to the agent UI expression part 140, such that the agent UI expression part 140 expresses content for recommending the relation setup as well as information about the specific person when making the UI expression. The information about the specific person is sent simultaneously when the UI ID associated with Specialist ID 5 is sent, such that the agent UI expression part 140 expresses content for making the praise when the number of calls/messages is large as well as the information about the specific person at the time of the UI expression.

When a UI for recommending the relation setup is expressed, the display unit 27 can include content for asking if the user wants to set up the relation. Then, the user identifies a UI image and text displayed on the display unit 27. When the user makes a response (e.g., YES or NO), the agent UI expression part 140 provides the user feedback information to the agent controller 130. Then, the agent controller 130 operates the specialist of an associated ID according to user feedback information and delivers a UI ID to the agent UI expression part 140 such that a UI can be expressed according to the user feedback information. Accordingly, the agent UI expression part 140 displays the UI image and text based on the user's feedback on the display unit 27.

As described above, the event collector 110 collects events occurring in the wireless terminal. The agent controller 130 selects an optimal or highest priority specialist associated with the collected event and provides a UI ID of the selected specialist to the agent UI expression part 140. The agent UI expression part 140 displays a character image and/or text data mapped to the provided UI ID on the display unit 27. A UI displayed on the display unit 27 may be data requiring the user feedback information. When the user feedback information is generated, the agent UI expression part 140 provides the feedback information to the agent controller 130. Then, the agent controller 130 sets a UI ID according to the provided feedback information and then provides the set UI ID to the agent UI expression part 140. The provided UI ID may be a UI ID for expressing a result of processing according to the user feedback information. Then, the agent UI expression part 140 displays the UI ID provided from the agent controller 130 in the character image and/or text, and expresses the processing result according to the user's feedback.

Figure 28A:
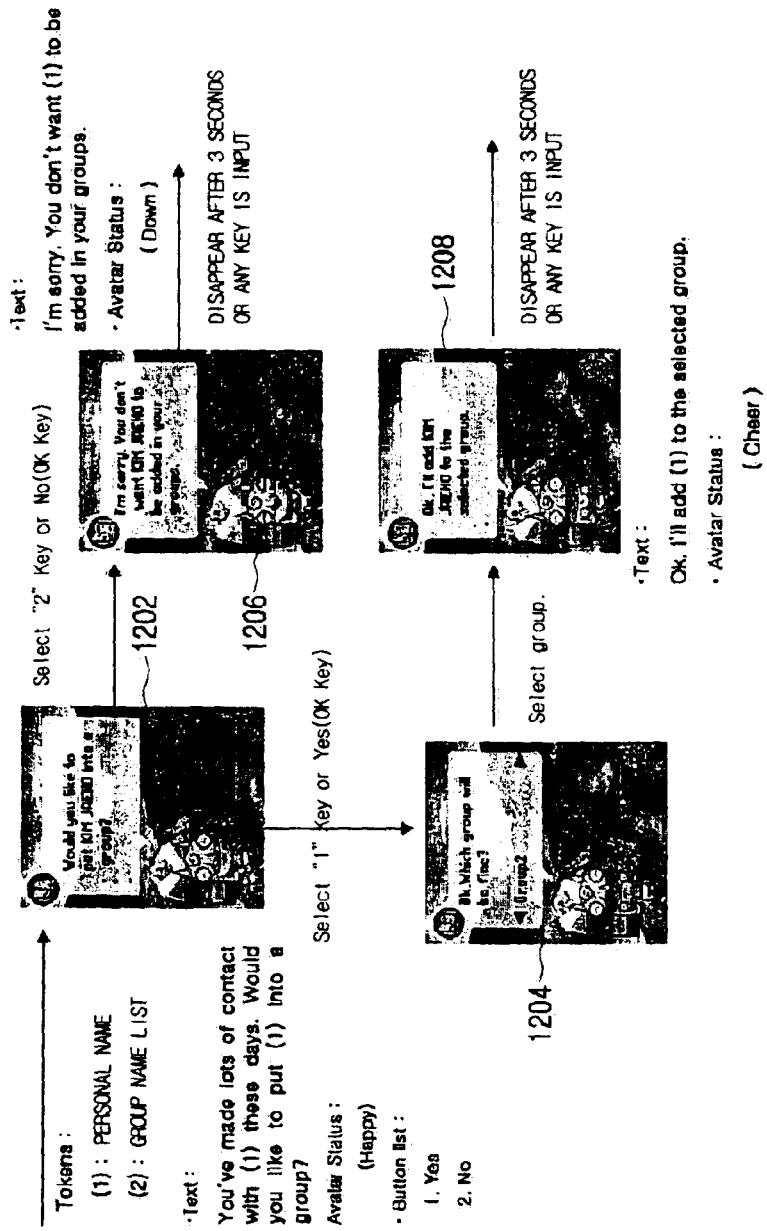
FIGS. 28A, 28B and 28C illustrate an example of displaying UI data based on a call/message related event in the wireless terminal in accordance with an embodiment of the present invention.
Figure 28B:
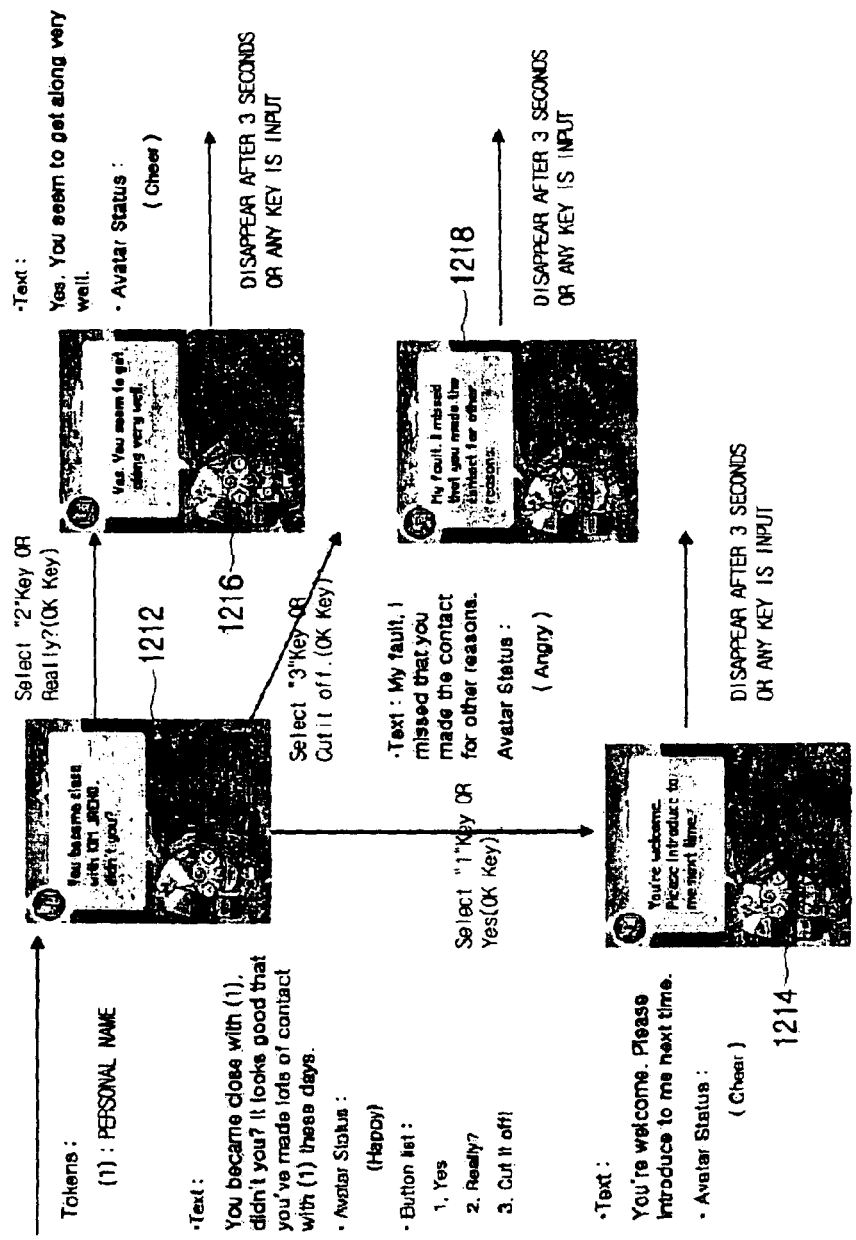
Figure 28C:
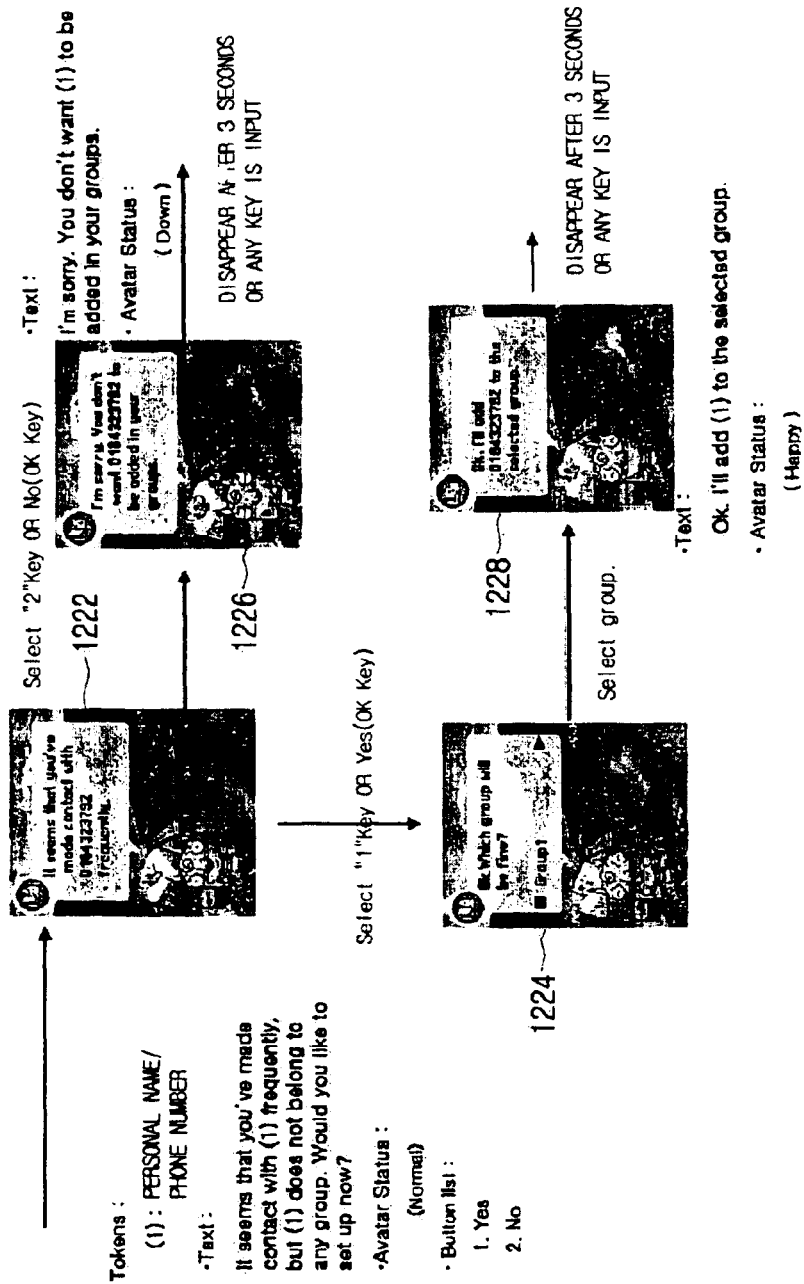
Figure 29A:
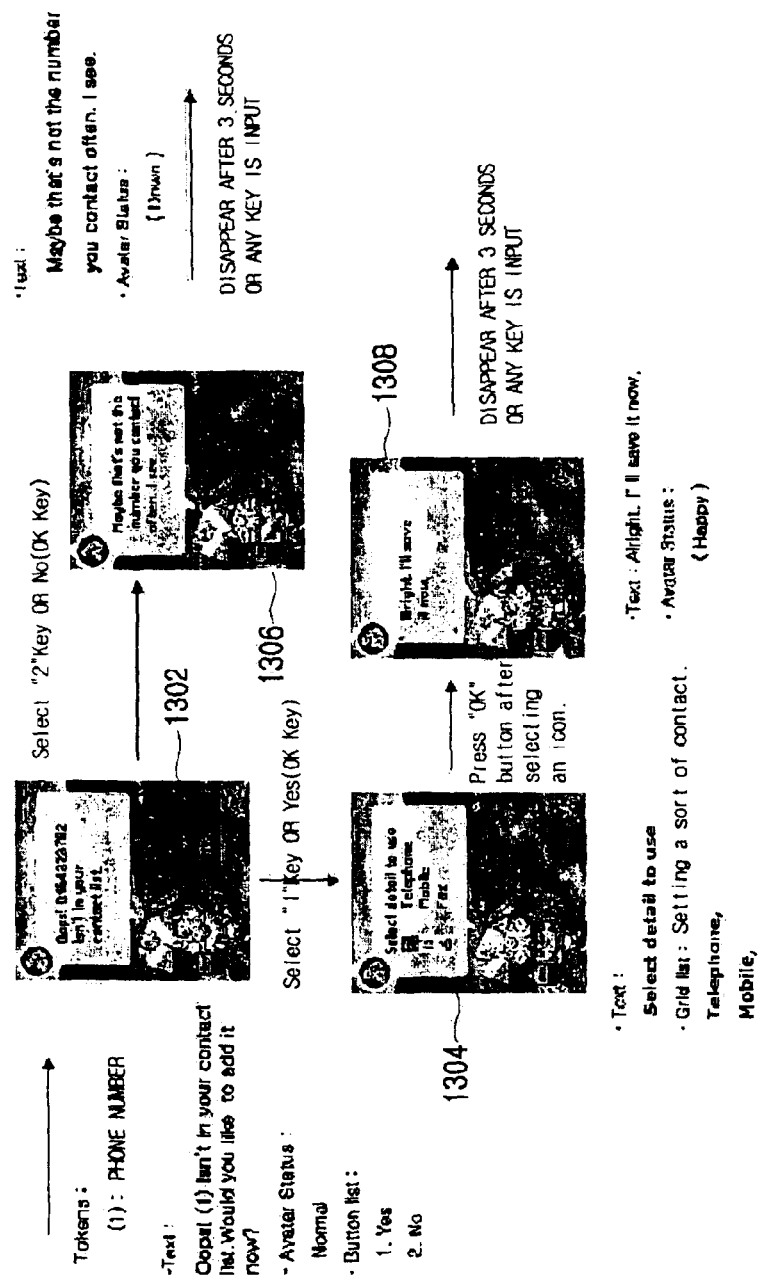
FIGS. 29A, 29B and 29C illustrate an example of displaying UI data based on a call related event in the wireless terminal in accordance with an embodiment of the present invention.
Figure 29B:
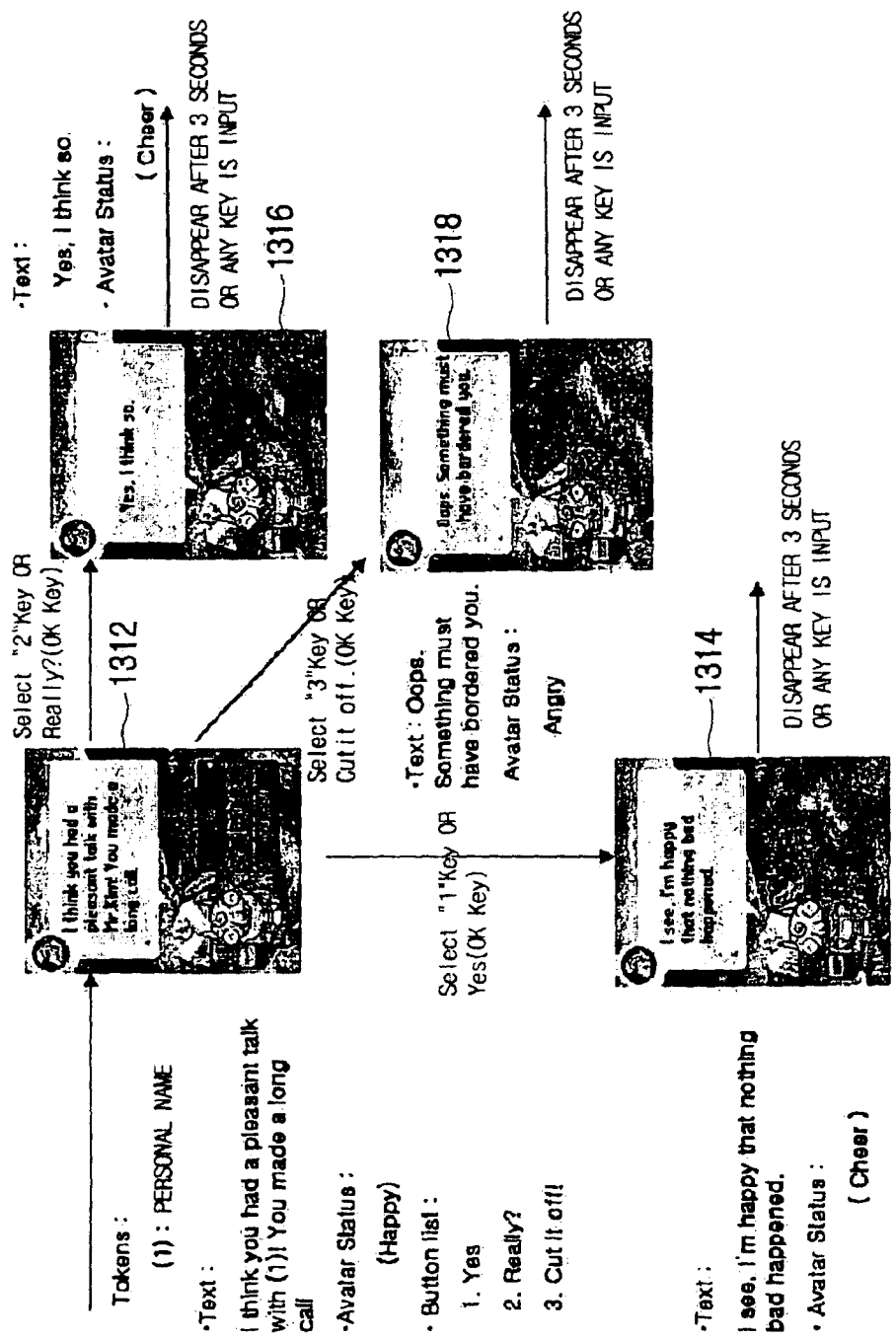
Figure 29C:
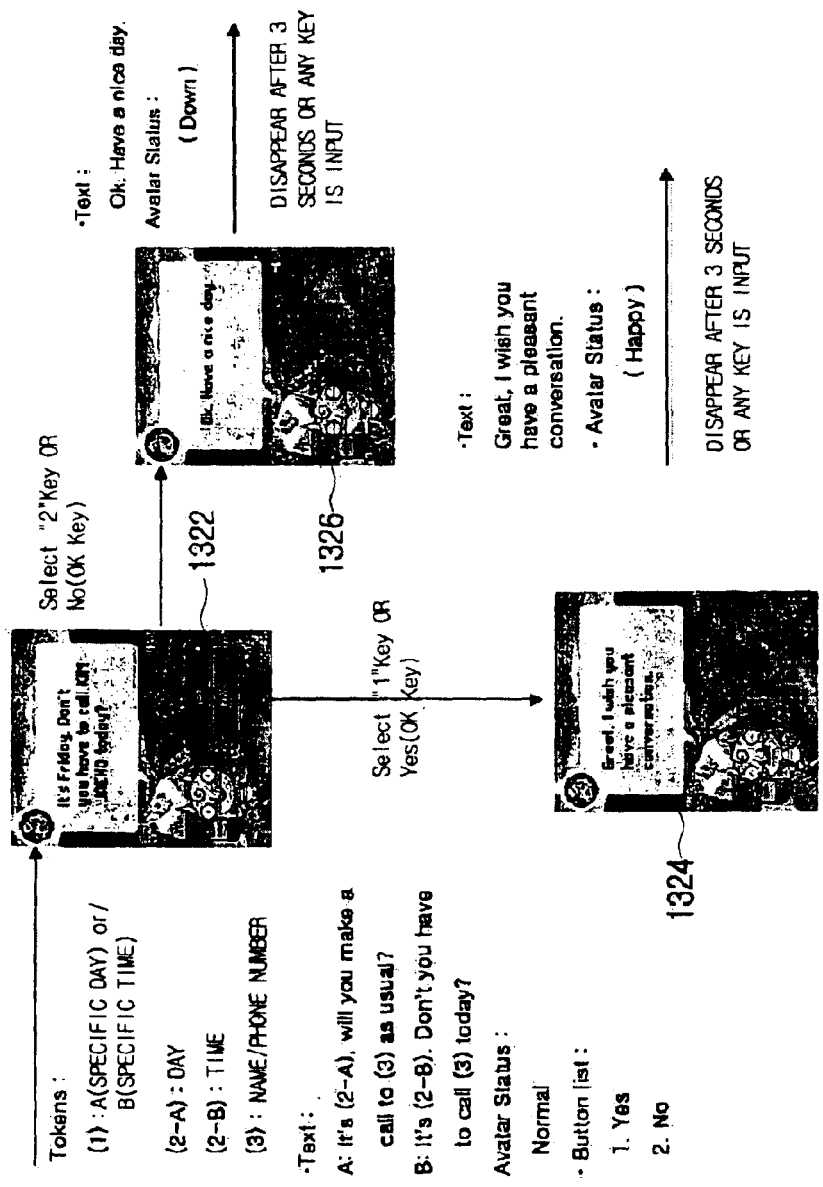
Figure 30A:
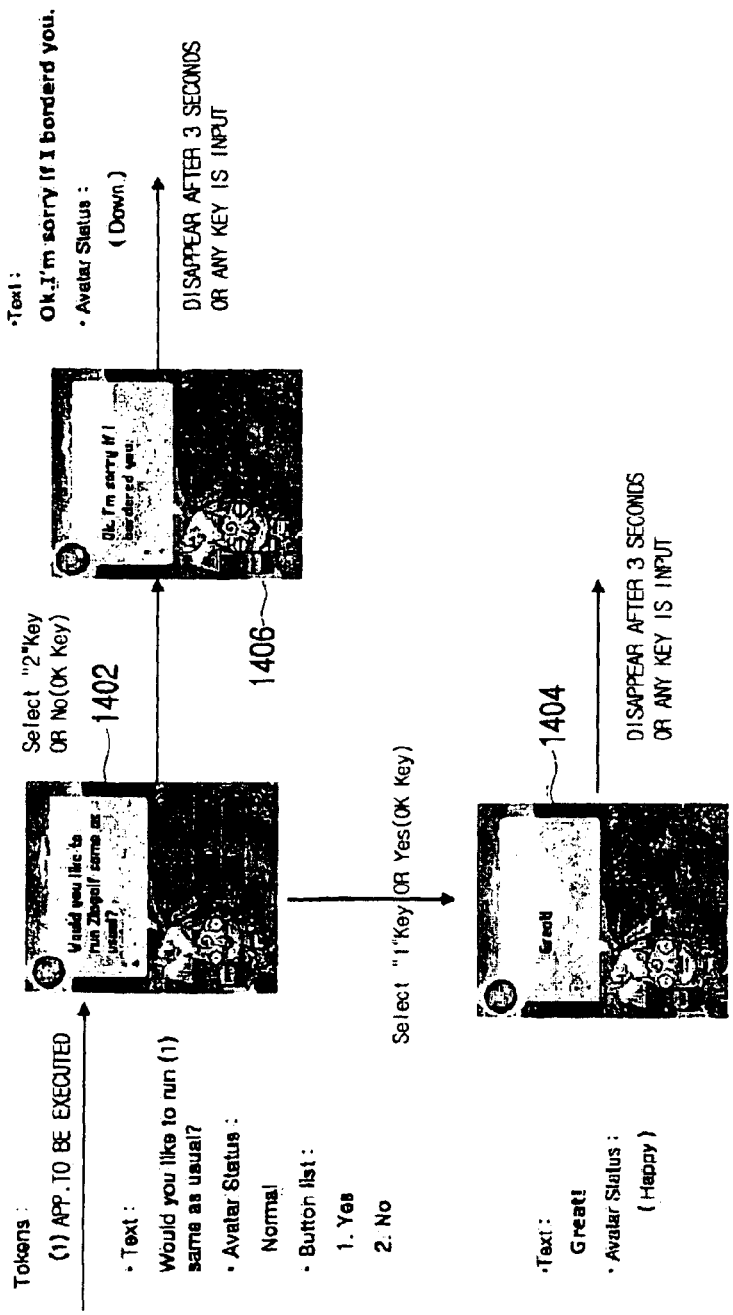
FIGS. 30A, 30B and 30C illustrate an example of displaying UI data based on an application program related event in the wireless terminal in accordance with an embodiment of the present invention.
Figure 30B:
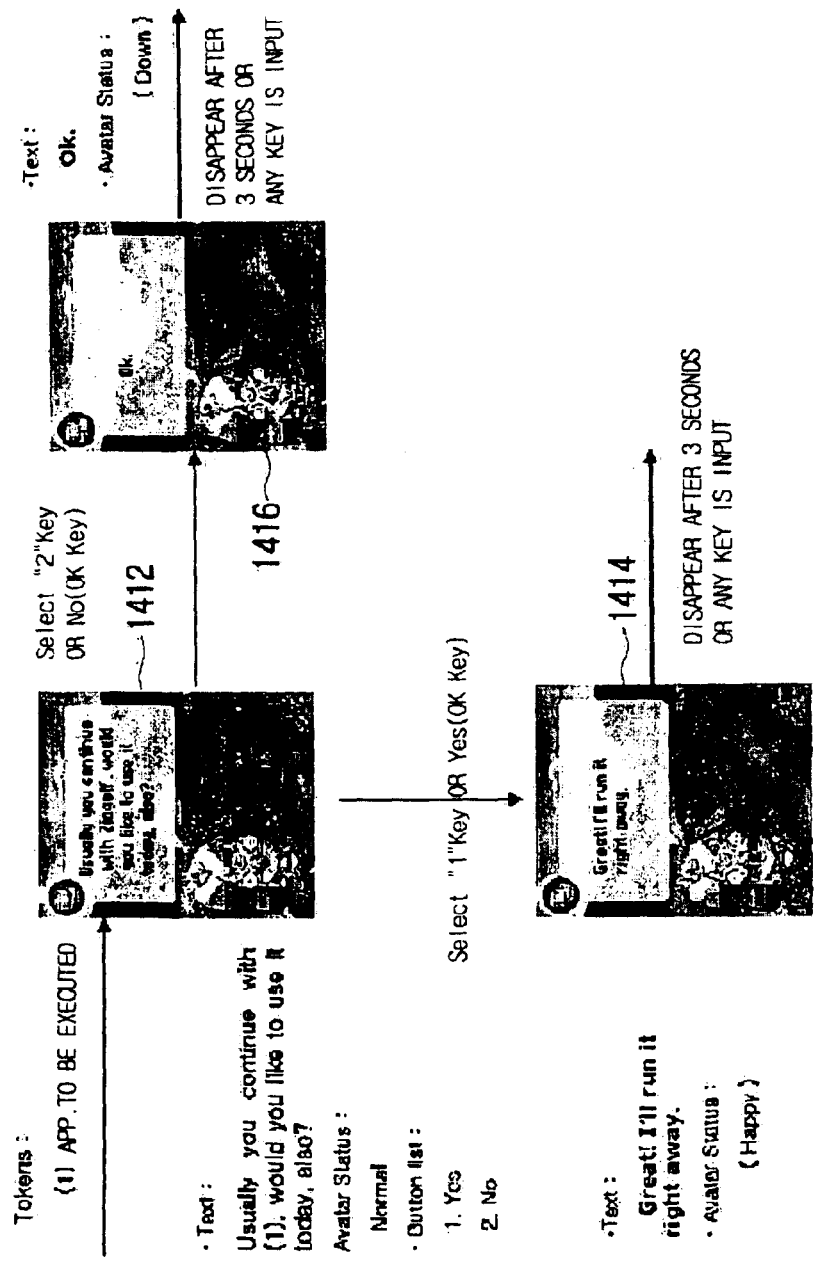
Figure 30C:
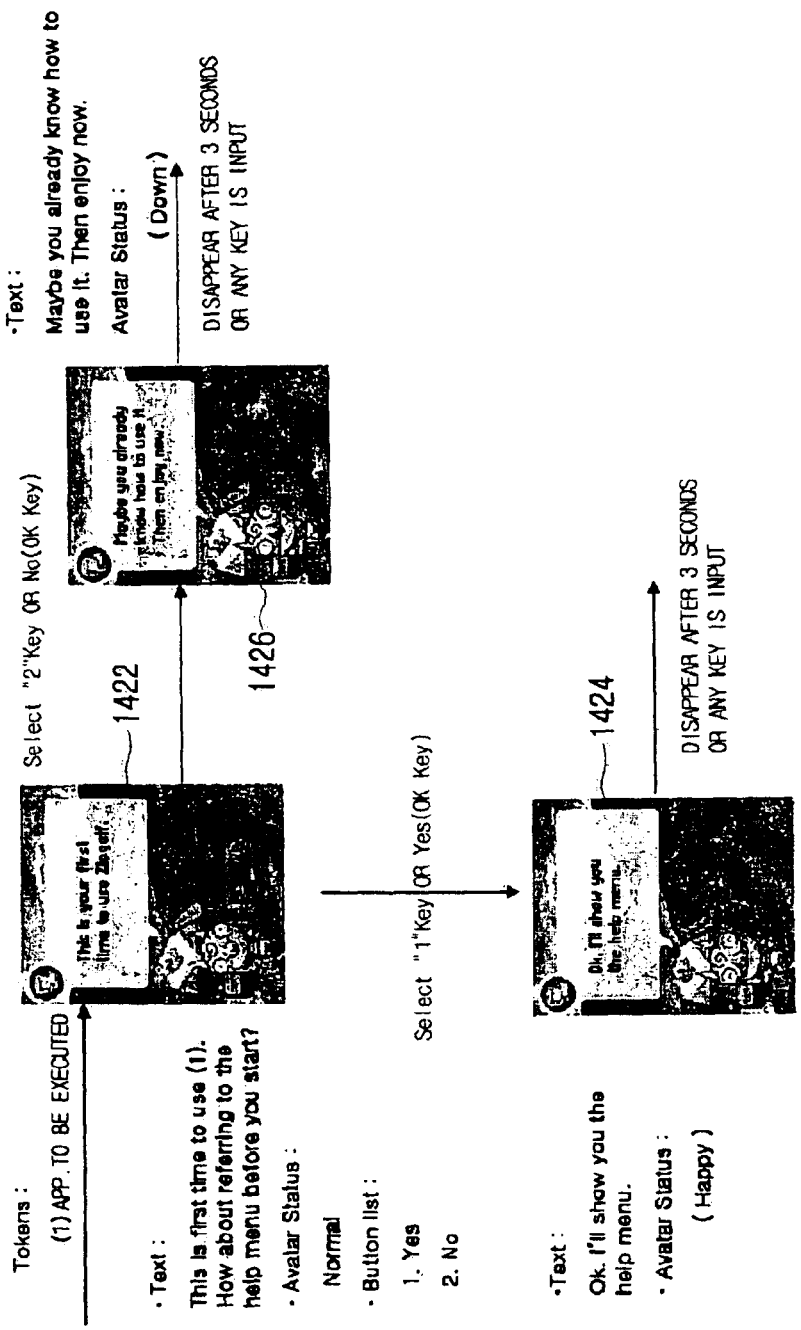
Figure 31A:
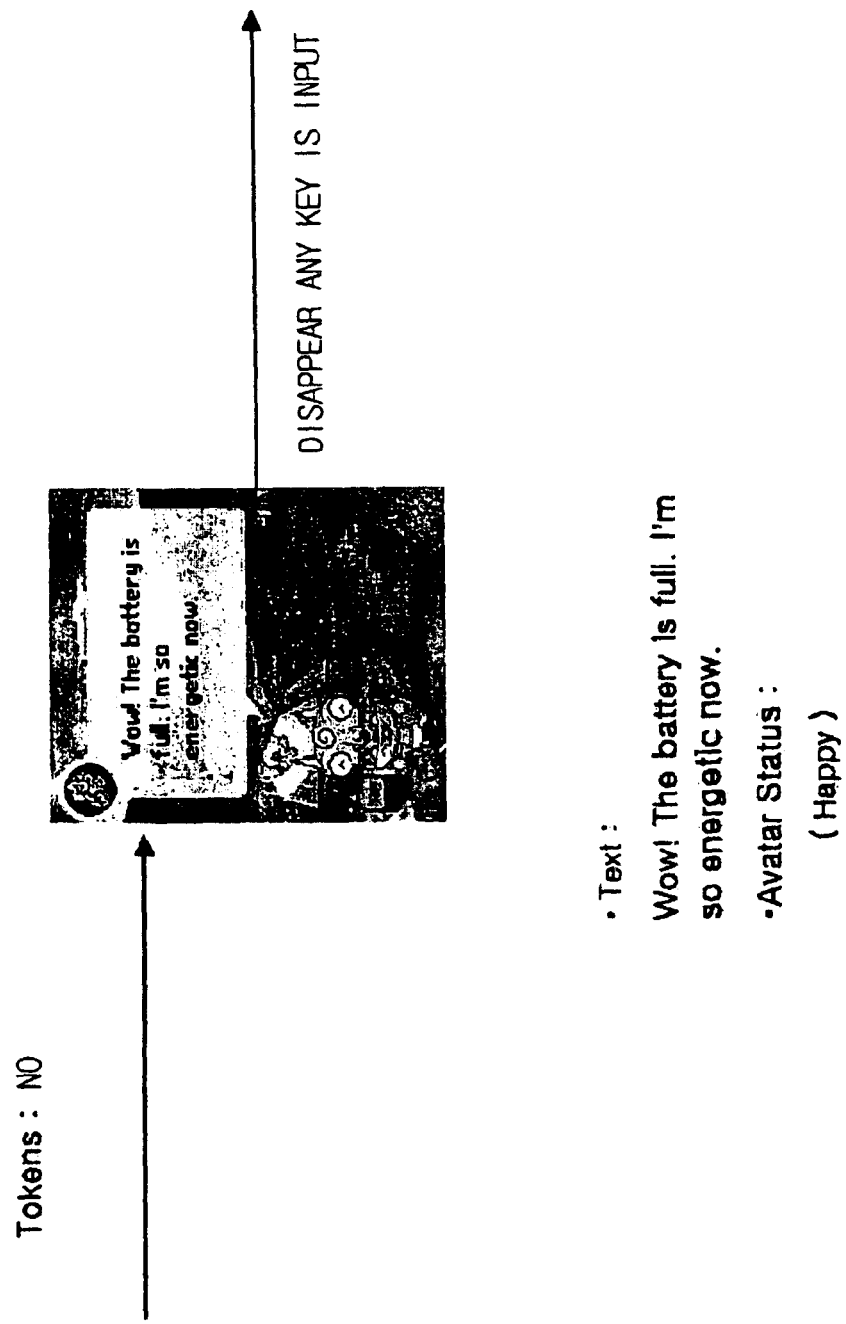
FIGS. 31A and 31B illustrate an example of displaying UI data based on a system related event in the wireless terminal in accordance with an embodiment of the present invention.
Figure 31B:
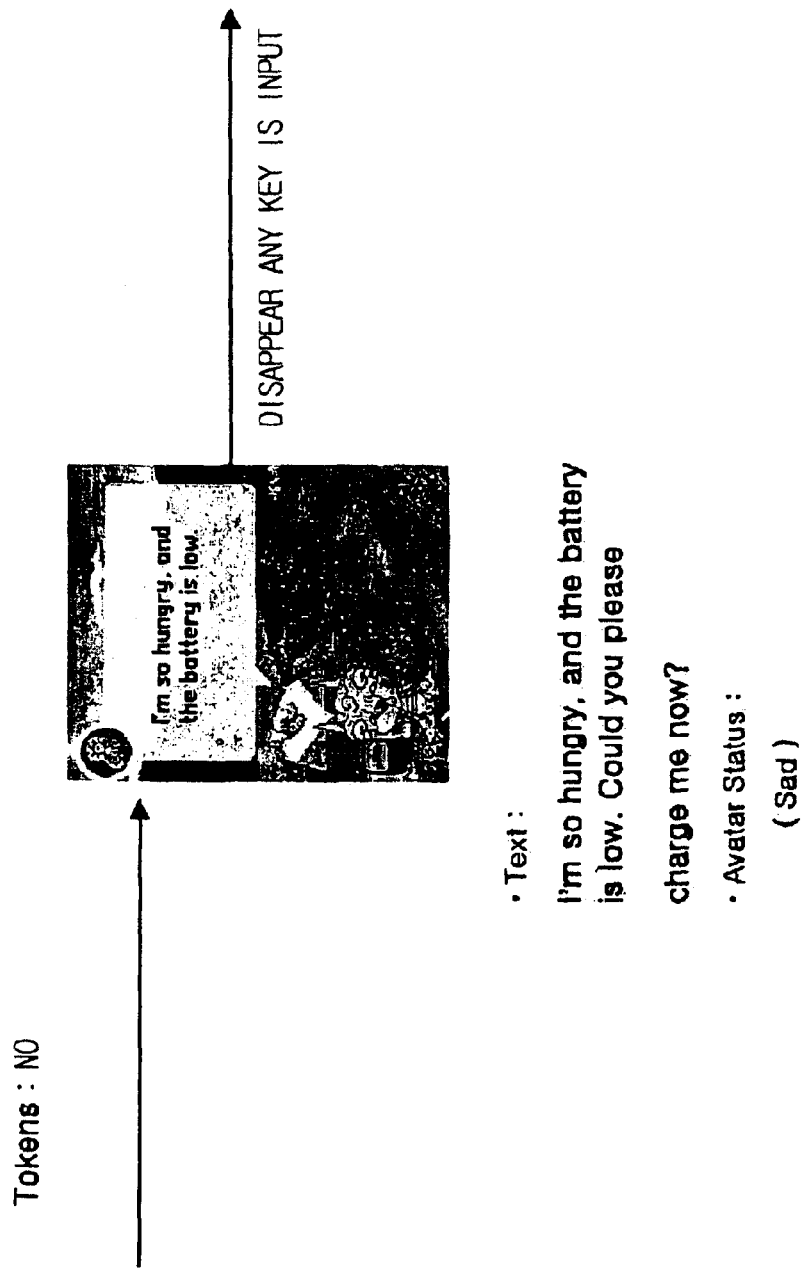
Figure 32:
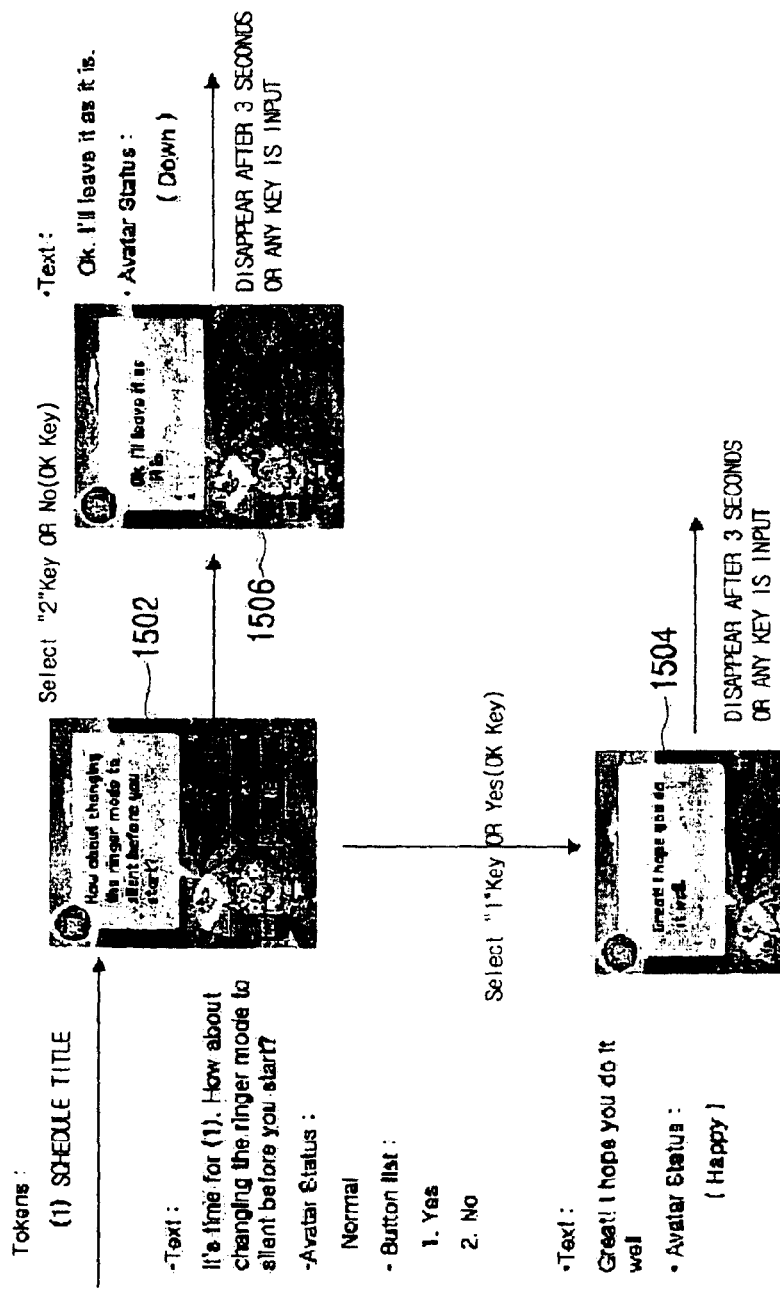
FIG. 32 illustrates an example of displaying UI data based on a schedule related event in the wireless terminal in accordance with an embodiment of the present invention.

FIGS. 28A to 28C illustrate procedures for displaying a set UI on the display unit 27 when a call/message related event is processed in a process of FIG. 21.

FIG. 28A illustrates a use case when the specialist manager 310 of the agent controller 130 sets the specialist of ID 4. Referring to FIG. 28A, the specialist sends UI ID 4 to the agent UI expression part 140 in step 948 when setting the specialist of ID 4 in step 946. Then, the agent UI expression part 140 displays an avatar image on the display unit 27 as indicated by reference numeral 1202. Here, ID 17 is associated with an event for recommending the relation setup as well as the praise when the recent number of calls and messages associated with a specific person is large, and requires the user feedback information. Accordingly, the agent UI expression part 140 identifies UI ID 4 and UI information and displays the screen as indicated by reference numeral 1202 of FIG. 28A. The screen 1202 of FIG. 28A may be the first screen 1020 of FIG. 26B.

In case of UI ID 4, parameters (or tokens) as illustrated in FIG. 28A are "(1)" and "(2). The parameter "(1)" is a personal name and the parameter "(2)" is a group name list. There is provided one text for the parameters. The personal name and the group name list within the text depend on the parameters. The avatar status is Normal, and the button list includes "1. YES and 2. NO".

In a state in which the first screen as indicated by reference numeral 1202 is displayed, the user can generate feedback information. Here, the user feedback information can be selected by pressing a desired item of the button layer or pressing a shortcut key. When "YES" of the button layer or the shortcut key "1" is selected, the agent UI expression part 140 displays the screen as indicated by reference numeral 1204 on the display unit 27. Here, the screen 1204 is the screen for recommending group selection. If a group is selected using a direction key, a message indicating that the group has been selected and additional registration has been made in the selected group is displayed as indicated by reference numeral 1208. When "NO" of the button layer is selected or the shortcut key "2" is selected, the agent UI expression part 140 displays the screen as indicated by reference number 1206 on the display unit 27. The agent UI expression part 140 delivers a result of the user's feedback to the agent controller 130. Then, the agent controller 130 requests that the specialist of ID 17 takes action according to the feedback result, and stores the feedback result in the blackboard 330 such that the feedback result can be referred to at the time of the next event occurrence. Then, the agent controller 130 changes an avatar quotient according to the feedback result and stores the changed avatar quotient in the avatar quotient memory 340.

FIG. 28B illustrates a UI displayed when an event set for the specialist of ID 5 occurs. ID 5 is associated with an event for making the praise when the recent number of calls or messages is large. FIG. 28C illustrates a UI displayed when an event set for the specialist of ID 6 occurs. ID 6 is associated with an event for recommending relation setup in relation to a number when contact is continuously made but the relation setup is not made. Events to be processed in the procedures of FIGS. 28B and 28C are the events requiring the feedback as illustrated in FIG. 28A. A processing procedure is performed like the procedure of FIG. 28A.

FIGS. 22 to 25 illustrate other processing examples for events in the above-described procedure.

Figure 22:
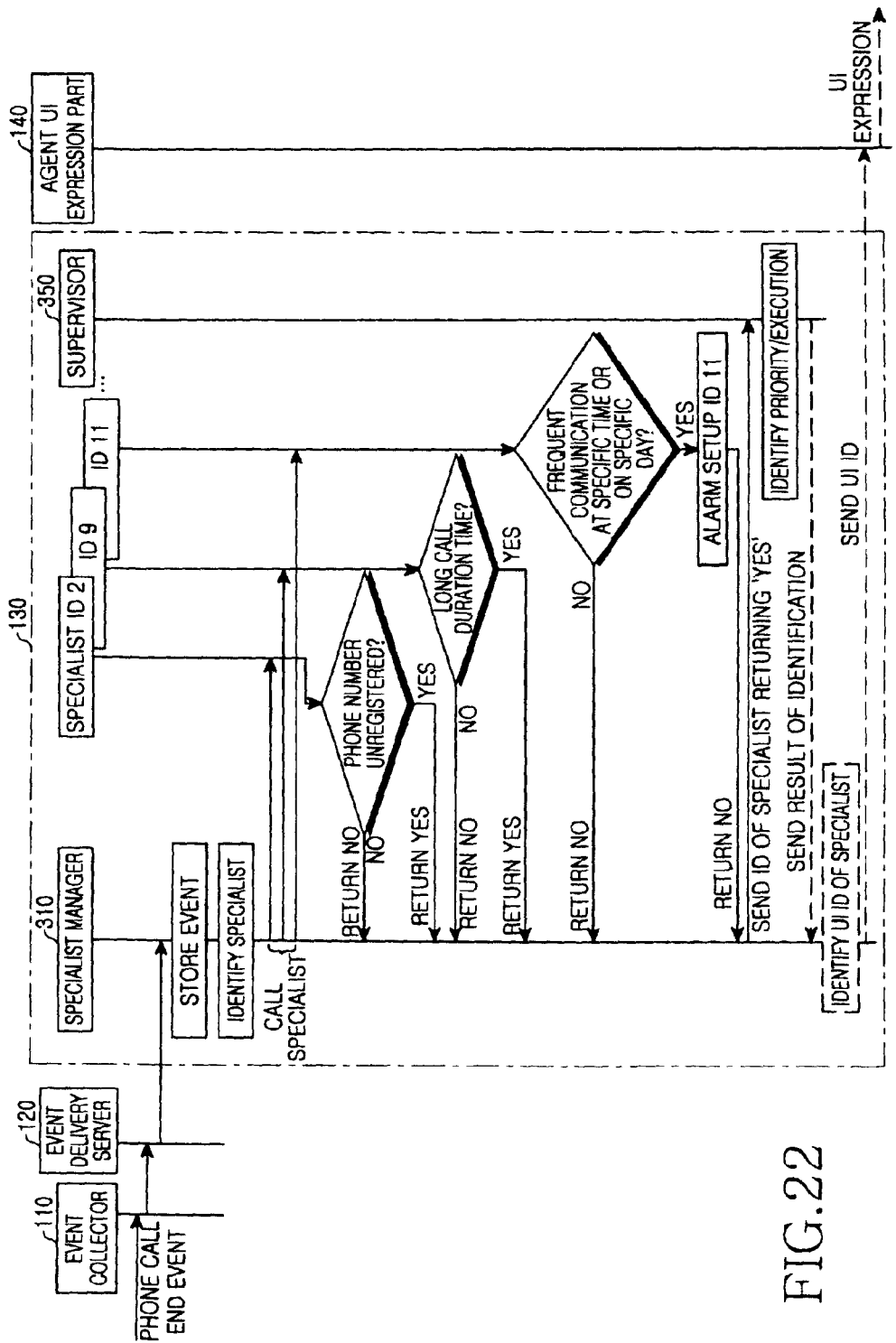
FIG. 22 illustrates a procedure for processing a call related event in the wireless terminal in accordance with an embodiment of the present invention.

FIG. 22 illustrates a procedure for processing an event of a type of a call in Table 5. FIG. 22 is a flowchart illustrating a processing procedure when a call end event of call events occurs. When the call end event occurs, the specialist manger 310 of the agent controller 130 identifies specialists associated with the call end event from a list of event-by-event specialists. It is assumed that the specialists associated with the call event in FIG. 22 are the specialists of IDs 2, 3, 9, and 11. FIG. 22 illustrates an example in which the specialist manager 310 calls the specialists of IDs 2, 9, and 11. As shown in Table 5, the specialist of ID 2 is a specialist for recommending registration when the call event for which a phone number is not registered occurs, the specialist of ID 9 is a specialist for making the praise when phone call duration is long, and the specialist of ID 11 is a specialist for recommending that the user call a person, often talking over the phone, at a specific time or on a specific day. After a return result associated with the currently occurred event is received from the specialists, the specialist manager 310 sends, to the supervisor 350, IDs of the specialists making a response of "YES", such that UI expression priorities are set and execution is identified. After the most suitable specialist is set according to return information of the supervisor 350, a UI ID of an associated specialist is sent to the agent UI expression part 140. The agent UI expression part 140 displays a character image according to the received UI ID of the specialist on the display unit 27. When the user generates feedback information, the agent UI expression part 140 provides the feedback information to the agent controller 130. Then, the agent controller 130 sets a UI ID according to the provided feedback information and then provides the set UI ID to the agent UI expression part 140. At this time, the provided UI ID may be a UI ID for expressing a result of processing according to the user feedback information. Then, the agent UI expression part 140 displays a UI ID provided from the agent controller 130 in a character image and/or text on the display unit 27 and expresses the processing result according to the user's feedback. When an event not requiring the feedback information occurs, the agent UI expression part 140 displays the occurred event on the display unit 27 but does not generate the feedback information.

Figure 23:
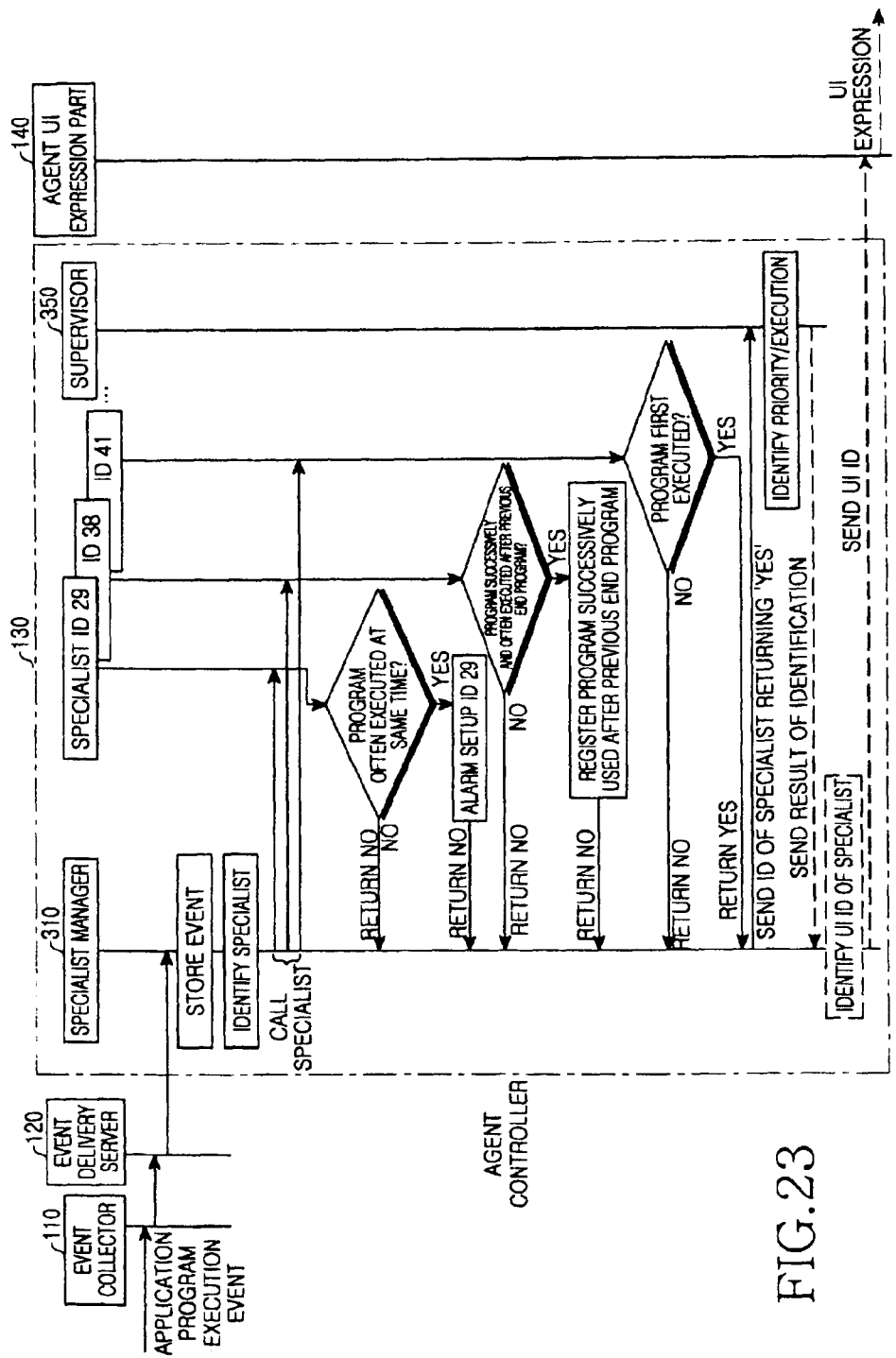
FIG. 23 illustrates a procedure for processing an application program related event in the wireless terminal in accordance with an embodiment of the present invention.

FIG. 23 illustrates a procedure for processing an application event in Table 5. In FIG. 23, the specialist manager 310 of the agent controller 130 identifies specialists associated with the application event from a list of event-by-event specialists when the application event occurs. Here, when the application event is an application program execution event, the specialists of IDs 29, 38, and 41 as shown in Table 5 can be called. FIG. 23 illustrates an example in which the specialist manager 310 calls the specialists of IDs 29, 38, and 41. As shown in Table 5, the specialist of ID 29 is a specialist for recommending the execution of an associated program when it is predicted that the associated program will be executed as an operation for executing a specific program is repeated at a specific time. The specialist of ID 38 is a specialist for a query associated with the execution when the next program to be executed is predicted after an application program ends. The specialist of ID 41 is a specialist for recommending use of a help function when an application program is first used. As described above, the specialist manager 310 identifies and sets a specialist through the supervisor 350. The agent UI expression part 140 displays a character according to a UI ID of the set specialist on the display unit 27. When the user feedback information is generated, the agent UI expression part 140 feeds back the generated feedback information to the agent controller 130. The agent controller 130 delivers a UI ID of the specialist according to the user feedback information to the agent UI expression part 140. The agent UI expression part 140 displays the user feedback information. When an event not requiring the feedback information occurs, the agent UI expression part 140 displays the occurred event on the display unit 27 but does not generate the feedback information.

Figure 24:
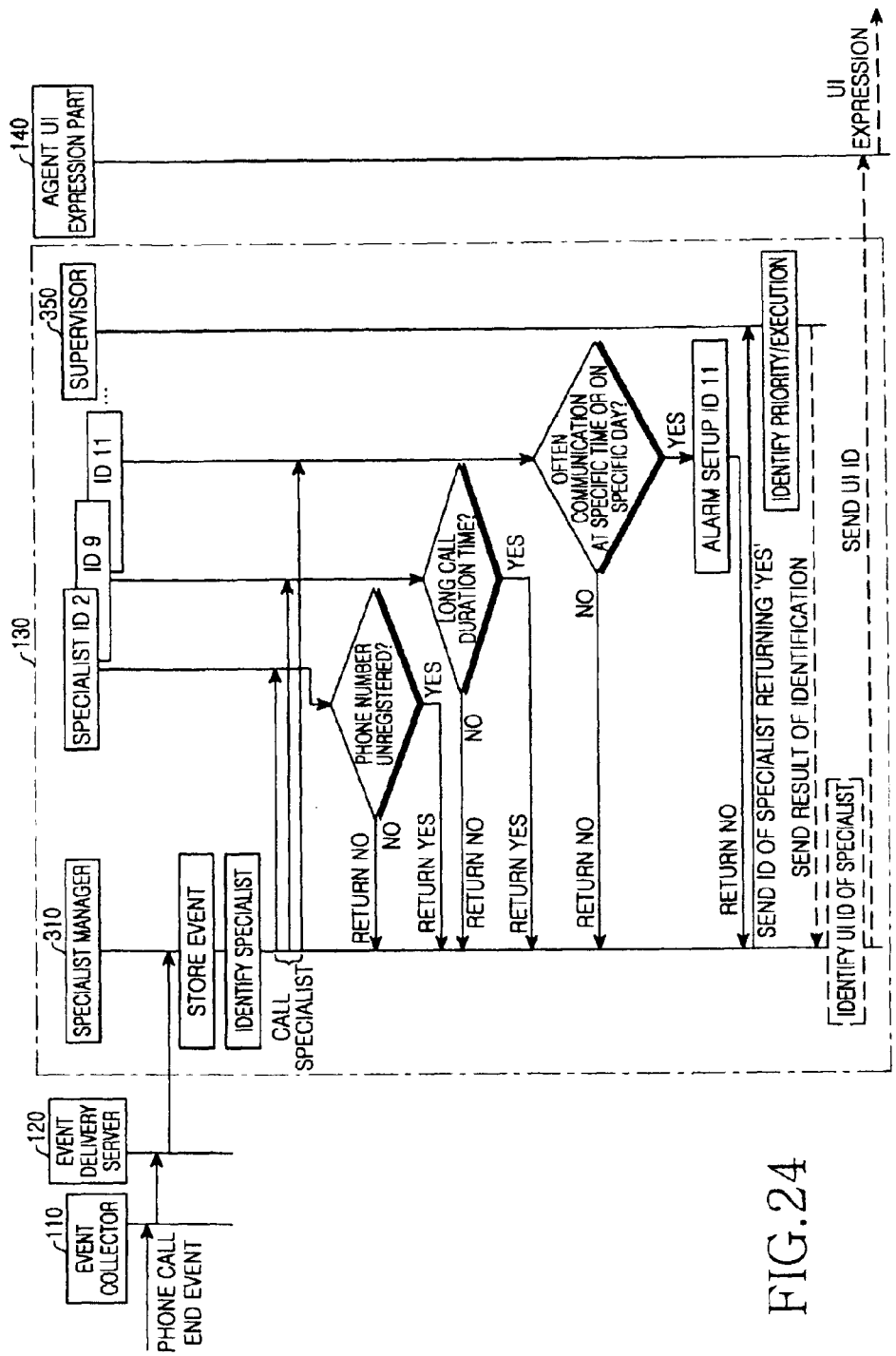
FIG. 24 illustrates a procedure for processing a system related event in the wireless terminal in accordance with an embodiment of the present invention.

FIG. 24 illustrates a procedure for processing a system event in Table 5. In FIG. 24, the specialist manager 310 of the agent controller 130 identifies specialists associated with the occurred system event from a list of event-by-event specialists when the system related event occurs. Here, when the occurred system event is an event for changing a battery state, the specialists of IDs 31 and 32 as shown in Table 5 can be called. FIG. 24 illustrates an example in which the specialist manager 310 calls the specialists of IDs 31 and 32. As shown in Table 5, the specialist of ID 31 is a specialist for displaying an avatar when the battery is full, and the specialist of ID 32 is a specialist for indicating a remaining amount of batter power when it is small. As described above, the specialist manager 310 identifies and sets a specialist through the supervisor 350. The agent UI expression part 140 displays a character according to a UI ID of the set specialist on the display unit 27. When the user feedback information is generated, the agent UI expression part 140 feeds back the generated feedback information to the agent controller 130. The agent controller 130 delivers a UI ID of the specialist according to the user feedback information to the agent UI expression part 140. The agent UI expression part 140 displays the user feedback information. When an event not requiring the feedback information occurs, the agent UI expression part 140 displays the occurred event on the display unit 27 but does not generate the feedback information.

Figure 25:
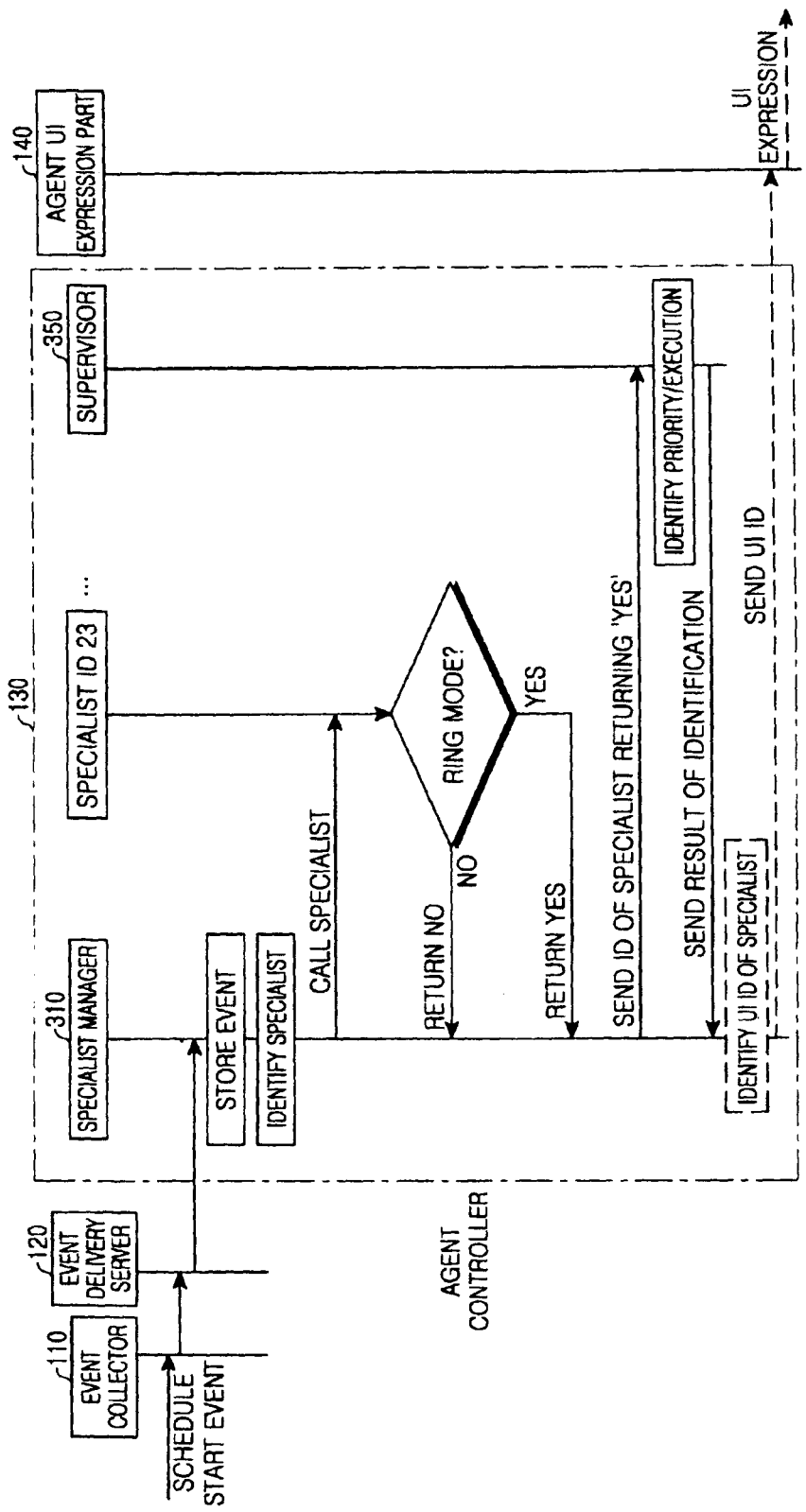
FIG. 25 illustrates a procedure for processing a schedule related event in the wireless terminal in accordance with an embodiment of the present invention.

FIG. 25 illustrates a procedure for processing a schedule event in Table 5. In FIG. 25, the specialist manager 310 of the agent controller 130 identifies specialists associated with the occurred schedule related event from a list of event-by-event specialists when the schedule related event occurs. Here, when the occurred system event is a schedule start event, the specialist of ID 23 as shown in Table 5 can be called. FIG. 25 illustrates an example in which the specialist manager 310 calls the specialist of ID 23. As shown in Table 5, the specialist of ID 23 is a specialist for recommending a change to a vibration state or a suitable state when the schedule starts. As described above, the specialist manager 310 identifies and sets a specialist through the supervisor 350. The agent UI expression part 140 displays a character according to a UI ID of the set specialist on the display unit 27. When the user feedback information is generated, the agent UI expression part 140 feeds back the generated feedback information to the agent controller 130. The agent controller 130 delivers a UI ID of the specialist according to the user feedback information to the agent UI expression part 140. The agent UI expression part 140 displays the user feedback information. When an event not requiring the feedback information occurs, the agent UI expression part 140 displays the occurred event on the display unit 27 but does not generate the feedback information.

FIGS. 29A to 32 illustrates examples of displaying UIs of specialist UI IDs associated with an occurred event in the agent UI expression part 140 when specialists illustrated in FIGS. 23 to 28C are set. As illustrated in FIGS. 29A to 32, the UI IDs include a UI ID requiring feedback information and a UI ID not requiring a feedback. In case of the UI ID requiring the feedback, the first screen based on a UI ID of the set specialist is displayed. Here, the first screen is the screen as indicated by reference numeral 1020 of FIG. 26B and is provided with the button layer 1010. A UI based on the user's selection is displayed on the second screen as indicated by reference numeral 103 of FIG. 26B. A result of the user's selection is generated as feedback information and is accumulatively stored in the agent controller 130. This information is used as information for processing an event occurring later and simultaneously allows an avatar emotion quotient to be updated. In case of the UI ID not requiring the feedback, a display operation as illustrated in FIG. 26A is performed once. In this case, the feedback information is not generated.

As described above, displayed information can display an icon for displaying a type of an occurred event, a speech balloon layer for displaying UI text, and an emotion state of an avatar for an associated event.

In accordance with an embodiment of the present invention as described above, a wireless terminal implements an artificial intelligence agent system. When an event occurs in the wireless terminal, a user interface (UI) of the agent system with the highest priority for an associated event is set. Therefore, there is an advantage in that the event occurrence can be visually displayed. Moreover, when the agent system displays events of the wireless terminal, it sets the highest priority UI for an event and recommends a user's feedback while displaying the set UI. The agent system displays a UI based on a result of the user's feedback and simultaneously stores the UI such that it can be used for the next event occurring later. Therefore, there is an advantage in that UI efficiency of the wireless terminal can be improved.

The invention claimed is:

1. A method comprising:
in response to detecting an event including at least one token, selecting a task processor to perform a task for the event from one or more task processors based at least on priority information associated with the one or more task processors;
selecting and displaying a user interface (UI) including a character for the selected task processor based at least on a value assigned to the character, the UI further including a feedback request and at least one selectable response at least partially generated from the at least one token; and
updating the value in response to a user input received via the UI.

2. The method of claim 1, further comprising:
displaying the character as at least partially modified based on the updated value.

3. The method of claim 1, wherein the UI further comprises: a prompt requesting a user to provide feedback responsive to the UI.

4. The method of claim 1, further comprising:
selecting another task processor associated with another task based at least in part on the user input.

5. The method of claim 1, wherein the displaying comprises:
determining the UI based at least in part on the value.

6. The method of claim 1, wherein the displaying comprises:
selecting a different image for the character according to the value.

7. The method of claim 1, the selecting comprises:
selecting the task processor based at least in part on determining that at least one event associated with a wireless device has occurred.

8. The method of claim 7, wherein the updating comprises:
updating the value further based on the at least one event.

9. The method of claim 1, further comprising:
determining the priority information based on at least one of specified priority information associated with the one or more task processors or user preference information.

10. The method of claim 9, further comprising:
determining the user preference information based at least in part on prior user feedback associated with the one or more task processors.

11. A system comprising:
a display unit; and
a controller configured to:
in response to detecting an event including an indication of at least one token, select a task processor to perform a task for the event from one or more task processors based at least on priority information associated with the one or more task processors,
select and display a user interface (UI) on the display unit including a character for the selected task processor based at least on a value assigned to the character, the UI further including a feedback request and at least one selectable response at least partially generated from the at least one token, and
update the value in response to a user input received via the UI.

12. The system of claim 11, wherein the controller is further configured to:
determine, based on the updated value, the character for display via the display unit as at least partially modified.

13. The system of claim 11, wherein the UI further includes text.

14. The system of claim 11, wherein the UI further comprises:
a prompt requesting a user to provide feedback responsive to the UI.

15. The system of claim 11, wherein the processor is further configured to:
select another task processor associated with another task based at least in part on the user input.

16. The system of claim 11, wherein the controller is configured to:
determine the UI further based at least in part on the value.

17. The system of claim 11, wherein the controller is configured to:
select the task processor further based at least in part on determining that at least one event associated with a wireless device has occurred.

18. The system of claim 11, wherein the controller is further configured to:
determine the priority information based on at least one of specified priority information associated with the one or more task processors or user preference information.

19. The system of claim 18, wherein the controller is further configured to:
determine the user preference information based at least in part on prior user feedback associated with the one or more task processors.

20. A non-transitory computer-readable storage medium storing instructions executable by one or more processors to perform operations comprising:
- in response to detecting an event including an indication of at least one token, selecting a task processor to perform a task for the event from one or more task processors based at least on priority information associated with the one or more task processors;
- selecting and displaying a user interface (UI) including a character for the selected task processor based at least on a value assigned to the character, the UI further including a feedback request and at least one selectable response at least partially generated from the at least one token; and
- updating the value in response to a user input received via the UI.

* * * * *